United States Patent [19]
Balling et al.

[11] Patent Number: 5,701,536
[45] Date of Patent: *Dec. 23, 1997

[54] CAMERA WITH FILM METERING RESPONSIVE SHUTTER RELEASE

[75] Inventors: Edward Norman Balling, Rochester; David Clinton Smart, Fairport; Thomas Edgar Dussinger, Henrietta; Dennis Roland Zander, Penfield, all of N.Y.

[73] Assignee: Eastman Kodak Company, Rochester, N.Y.

[*] Notice: The term of this patent shall not extend beyond the expiration date of Pat. No. 5,

[21] Appl. No.: 577,785

[22] Filed: Dec. 22, 1995

[51] Int. Cl.⁶ .............. G03B 1/04; G03B 17/04; G03B 17/42
[52] U.S. Cl. .............. 396/396; 396/348; 396/389; 396/502
[58] Field of Search .............. 354/206, 207, 354/208, 213, 266; 396/395, 396, 397, 398, 399, 400, 411, 348, 443, 389, 502, 503

[56] References Cited

U.S. PATENT DOCUMENTS

| | | |
|---|---|---|
| 2,169,548 | 8/1939 | Zapp . |
| 2,544,879 | 3/1951 | Harvey et al. . |
| 2,829,573 | 4/1958 | Jackobson .............. 354/207 |
| 2,847,920 | 8/1958 | Polhemus . |
| 3,577,900 | 5/1971 | Peterson et al. .............. 354/207 |
| 3,696,723 | 10/1972 | Ernisse . |
| 3,736,854 | 6/1973 | Beach .............. 354/207 |
| 3,938,170 | 2/1976 | Winkler et al. . |
| 3,968,509 | 7/1976 | Winkler et al. . |
| 3,999,199 | 12/1976 | Beach . |
| 4,032,940 | 6/1977 | Chan . |
| 4,104,664 | 8/1978 | Winkler et al. . |
| 4,107,715 | 8/1978 | Tanaka . |
| 4,115,792 | 9/1978 | Engelsmann et al. . |
| 4,154,519 | 5/1979 | Waaske . |
| 4,948,063 | 8/1990 | Niedospial, Jr. . |
| 5,003,330 | 3/1991 | Kotani et al. . |
| 5,005,035 | 4/1991 | Pagano . |
| 5,031,853 | 7/1991 | Jensen . |
| 5,151,727 | 9/1992 | Sasaki . |
| 5,248,108 | 9/1993 | Zander . |
| 5,357,302 | 10/1994 | Kawmaura et al. . |
| 5,394,214 | 2/1995 | Petruchik . |
| 5,400,098 | 3/1995 | Rydelek . |

FOREIGN PATENT DOCUMENTS 6-347950 12/1994 Japan .

*Primary Examiner*—A. A. Mathews
*Attorney, Agent, or Firm*—Peter J. Bilinski; Robert Luke Walker

[57] ABSTRACT

A camera includes a depressible shutter relase button; and a film metering mechanism for metering a filmstrip in the camera. The shutter release button is positioned on one side of a pivotable trigger which raises a release element when the shutter release button is depressed. The release element, coupled to the film metering mechanism, remains in a raised position until the film metering mechanism has metered the filmstrip. Preferably, the shutter release can be used in a pump-action camera, the shutter release remaining hidden until a succeeding exposure frame has been advanced and metered.

19 Claims, 46 Drawing Sheets

CAMERA WITH FILM METERING RESPONSIVE SHUTTER RELEASE

CROSS-REFERENCE TO RELATED APPLICATION(S)

Reference is made to commonly assigned co-pending U.S. patent applications Ser. No. 08/577,285, entitled: PUMP CAMERA, and filed in the names of Dennis R. Zander, David C. Smart, Thomas Dussinger, and Edward N. Balling, Ser. No. 08/577,288, entitled: FILM METERING MECHANISM and filed in the names of Thomas Dussinger, Dennis R. Zander, David C. Smart, and Edward N. Balling, Ser. No. 08/577,289, entitled: FILM ADVANCE IN A PUMP CAMERA, and filed in the name of Edward N. Balling, David C. Smart, Dennis R. Zander, and Thomas Dussinger, and Ser. No. 08/580,095, entitled: CAMERA WITH FILM METERING RESPONSIVE SHUTTER RELEASE, and filed in the names of Edward N. Balling and David C. Smart, each of which are assigned to the assignee of this application.

FIELD OF THE INVENTION

The invention relates generally to the field of photography. More specifically, the invention relates to a film advancing system for a camera including a shutter release which cooperates with a film metering mechanism.

BACKGROUND OF THE INVENTION

In the production of single-use cameras, the traditional method of film advance has been the classic thumbwheel design. This system is used due to the low cost and ease of customer use.

Conventionally, a thumbwheel is used which drives a sprocket which engages the perforations of a filmstrip contained within the camera to advance the filmstrip in a frame by frame manner across the exposure gate. The rotation of the sprocket also cocks the high energy lever. When the trigger is fired, the high energy lever is released and the shutter blade is tripped. At the end of the stroke, the high energy lever also releases the thumbwheel lock and film sprocket.

A timing problem occurs in that the above sequence produces a race which is created between the closing of the shutter blade and the release of the film sprocket, which releases the thumbwheel and the filmstrip for advance. If the film sprocket is released before the closing of the shutter blade, then film motion may blur the image, producing undesirable results.

Additionally, the use of a thumbwheel film advance system requires several rotations of the wheel in order to advance a frame sized portion of the filmstrip into and out of the exposure gate.

There is a need then to provide a simple efficient and economical film advance system which advances an exposure frame in a single movement, and in which the functions between film metering and image capture are uniquely separable.

SUMMARY OF THE INVENTION

The present invention is directed to overcoming one or more of the problems set forth above. Briefly summarized, according to one aspect of the present invention, there is provided a camera comprising:

a depressible shutter release button; and film metering means for metering a filmstrip in said camera, which is characterized by:

means coupled to said shutter release button and said film metering means for retaining the shutter release button depressed until the film metering means has metered the filmstrip.

An advantageous feature of the invention is that with the shutter release button being hidden after each picture is taken, there is a decreased chance for double exposures to be taken.

A further advantageous feature of the present invention is that a camera having the present invention can include a pump cover which can be opened and closed without prematurely advancing the film and with no resulting damage to the film advance mechanism until the shutter release has been popped indicating that another image can be captured.

A still further advantageous feature of the present invention is that operation of a camera made in accordance with the present invention is simple, reliable, and efficient and includes separable image capture, and film advancing mechanisms, virtually eleiminating the possibility of film chatter.

These and other aspects, objects, features and advantages of the present invention will be more clearly understood and appreciated from a review of the following Detailed Description of the Preferred Embodiments and appended Claims, and by reference to the accompanying drawings.

BRIEF DESCRIPTION OF THE DRAWINGS

FIGS. 8(a)-8(c) are rear perspective views of the film drive components of the camera of FIGS. 1-6; in which FIG. 8(a) is partially cut-away and FIGS. 8(b) and 8(c) are taken partially in section;

FIG. 40 is a top perspective view of the opened pump cover;

DETAILED DESCRIPTION OF THE INVENTION

First Embodiment

A first embodiment of the present invention is herein described with reference to FIGS. 1–20 with certain modifications effected and described with reference to FIGS. 50–57. Throughout the course of the discussion, terminology such as "top", "bottom", "clockwise", "counterclockwise", etc, are used relating to the particular FIGS. These conventions, however, should not be considered limiting to the concept of the present invention, but are intended only to provide a frame of reference for descriptive discussion.

Figure 1:
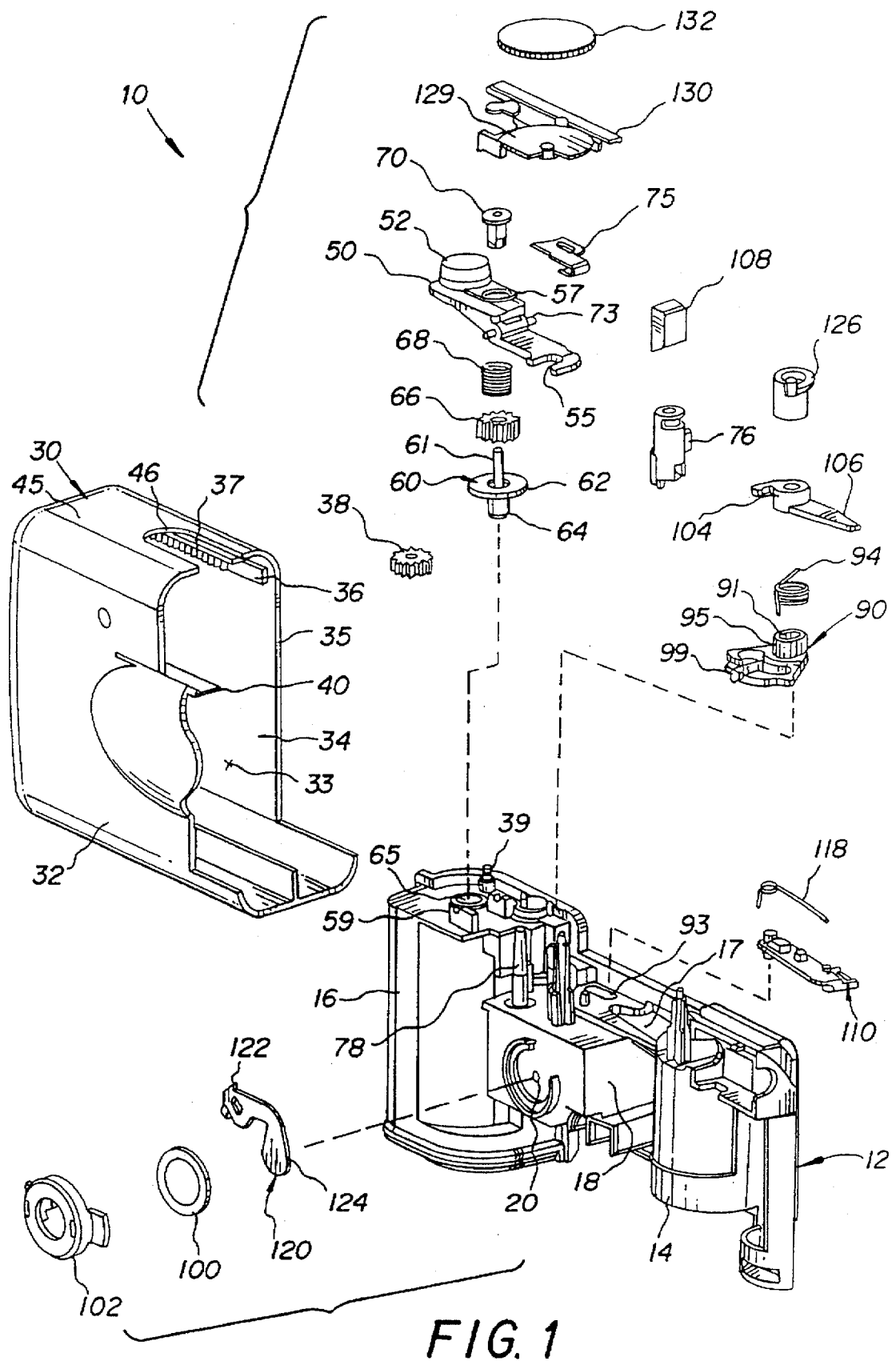
FIG. 1 is an exploded front perspective view of a camera having a film advance system in accordance with a preferred embodiment according to the present invention.
Figure 30:
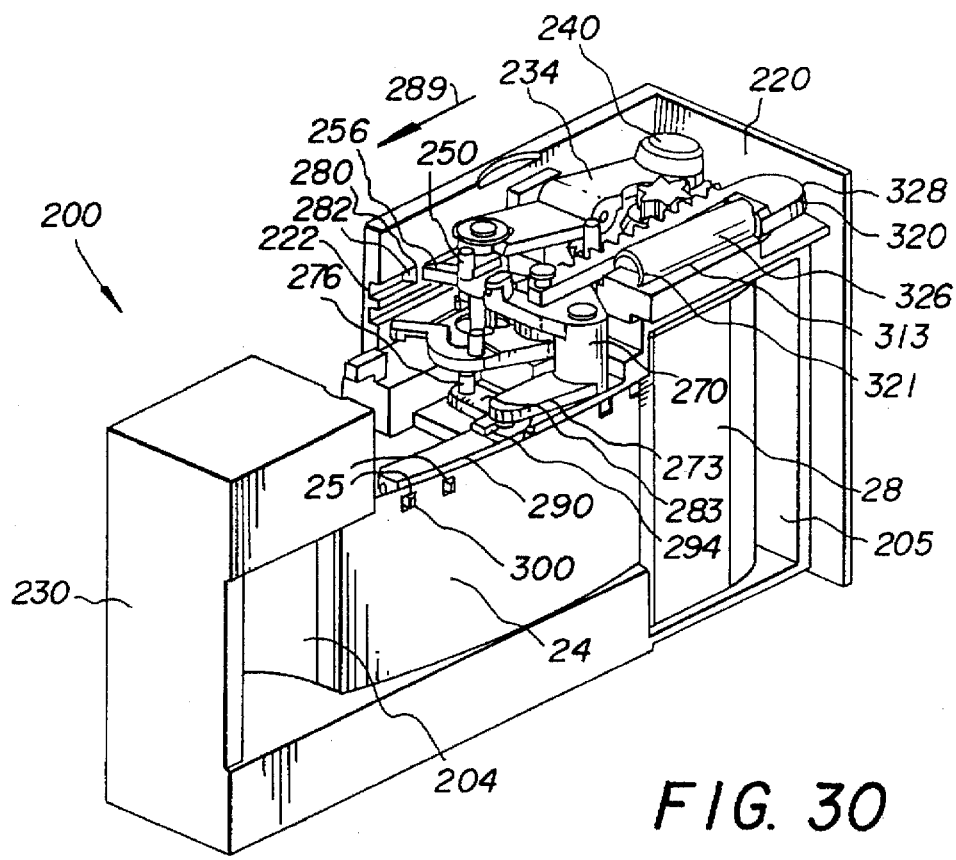
FIG. 30 is a rear view of the camera of FIG. 29.

Beginning with FIG. 1, an exploded view is provided for a camera 10 having a plastic frame portion 12 including molded-in features which define a film supply chamber 14 for containing an unexposed film roll (not shown), a film cartridge chamber 16 for containing a film cartridge 28, shown partially in FIG. 30, and an exposure chamber 18 situated between the film supply chamber 14 and the film cartridge chamber 16 through which ambient light enters the camera 10 through a front opening 20. In addition, the frame portion 12 serves to support several of the major photographic components of the camera 10, as herein described. The film cartridge 28, FIG. 30, for purposes of the foregoing discussion is a conventional lighttight film magazine which is commonly known in the field having a rotatably engageable spool end. Other film cartridges having engageable film spool ends can be used, such as the so-called "thrusting-type" film cartridges described in U.S. Pat. Nos. 4,948,063, 5,031,853, and 5,248,108, among others. The workings of the cartridges themselves is known and does not form a part of the present invention, except where indicated. That is, a spool having means for supporting a filmstrip and having engageable means for winding the filmstrip thereon could be utilized.

Figure 2:
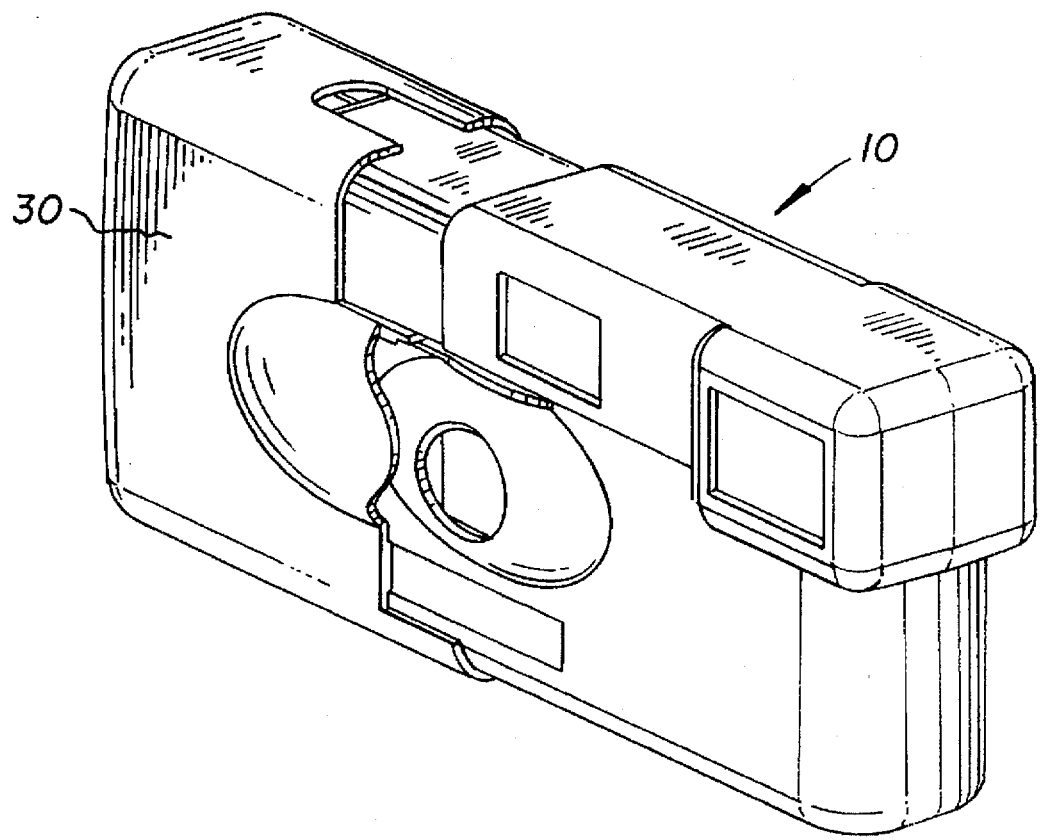
FIG. 2 is the front perspective view of the camera of FIG. 1, showing the pump cover in a fully opened position.
Figure 3:
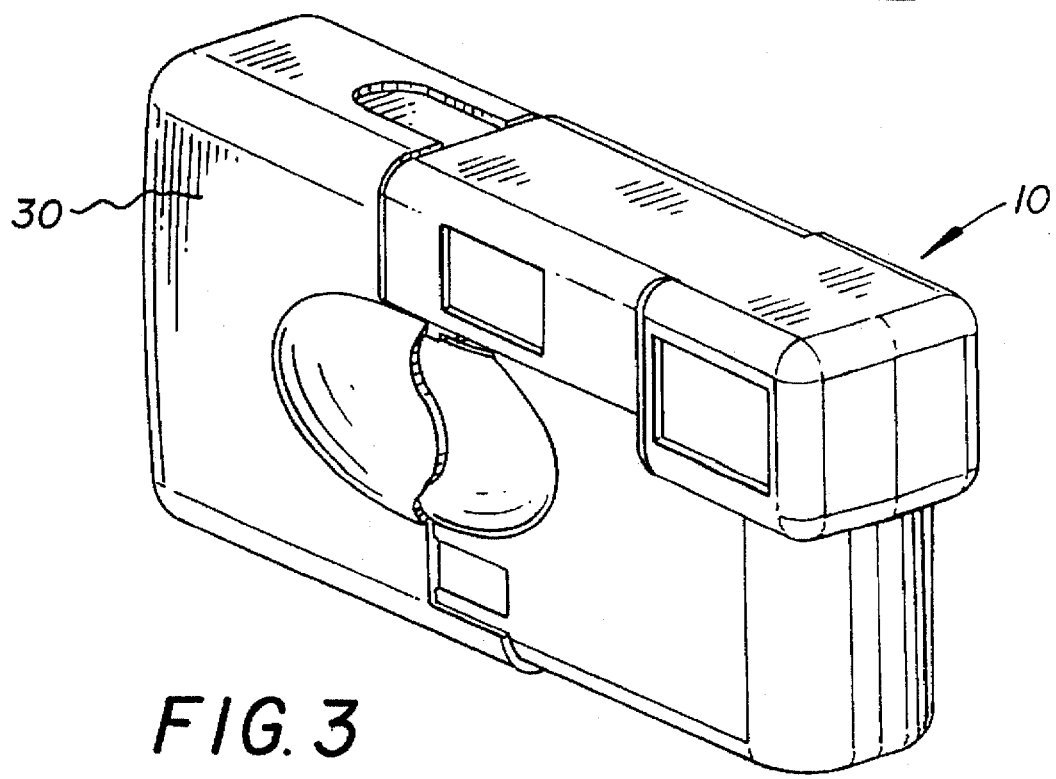
FIG. 3 is a front perspective view of the camera of FIGS. 1 and 2, showing a film advancing pump cover in a fully closed position.

A translatable pump handle or cover 30 is attached in a known manner to the exterior of the camera 10 and is movable from an opened or extended position, FIG. 2, to a closed position, FIG. 3 relative to the frame 12. The pump cover 30 is preferably a plastic injection-molded component having a front half section 32, and a rear half section 34 which combine to form an open end 35, as well as define an interior recess 33 which is sized to enclose a portion of the frame portion 12 when the pump cover 30 is translated from the opened to the closed position. The interior wall of the rear half section 34 includes a stationary linear gear rack 36 having a set of spaced gear teeth 37 for engaging an adjacent idler gear 38 that is mounted by placement of the gear hub through a post 39 extending from the top of the frame portion 12.

A tapered engagement or contacting arm 40 is disposed along the interior wall of the front half section 32, a portion of which extends from the open end 35 of the cover 30, for contacting film metering and demetering apparatus attached to the camera frame 12, as described in greater detail below.

The cover 30 further includes a slotted or cutout portion 46 along a top surface 45 adjacent the open end 35 for allowing access to a depressible shutter release button 52 when the cover is in the opened position, FIG. 2. Otherwise, the shutter release button 52 as well as a front lens element 100 are each hidden when the pump cover 30 is in the closed position, FIG. 3.

Figure 5:
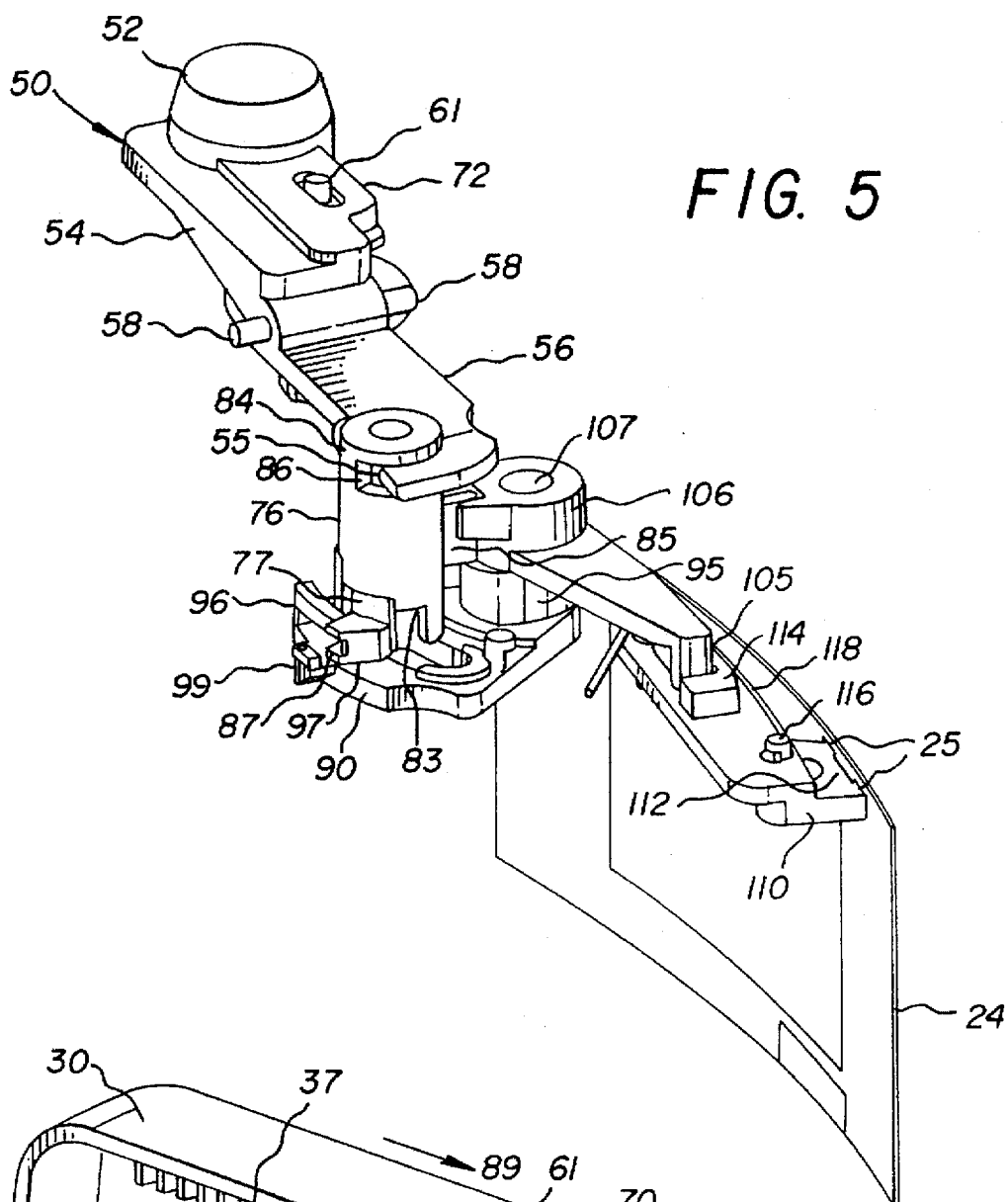
FIG. 5 is a partial perspective view of the primary components of the film advance system according to this first embodiment.

Referring back to the exploded view of FIG. 1 as well as FIG. 5, a pivotable trigger 50 is a unitary plastic injection molded beam-like member having an upper portion 54 and a lower portion 56, attached via a pair of lugs or pins 58 which engage a pair of corresponding slots 59 protruding from the top of the frame portion 12. The upper portion 54 of the trigger 50 includes the depressible shutter release button 52 at one end adjacent an opening 57, not shown in FIG. 5, sized for accommodating the vertical shaft 61 of a film cartridge drive 60. The lower portion 56 includes a slotted portion 55 at the remaining end while the trigger 50 is pivotable about the connection formed by the lugs 58 and slots 59.

Referring specifically to FIGS. 1 and 6–7(d), the film cartridge drive 60 includes a depending lower portion 64, which when assembled to the top of the frame portion 12 extends through an opening 65 into the cavity of the film cartridge chamber 16. The lower depending portion 64 includes an external driving element 63, sized for engaging a spool end of a film cartridge 28, FIG. 30, in a known manner to cause the cartridge spool to wind film into the cartridge.

A supporting surface 62 from which the vertical shaft 61 upwardly extends supports a drive gear 66 having a set of circumferentially disposed gear teeth 67. A drive spline 70, having a pair of depending engagement teeth 72 and a flange 69 is coaxially mounted through the opening 57 in the trigger 50 and onto the vertical shaft 61 of the cartridge drive 60 through a center aperture. The flange 69 is sized to retain the spline 70 within the opening 57 so that the trigger 50 supports the spline when assembled thereto. The depending teeth 72 of the spline 70 extend through the hub of the drive gear 66 for engagement with a cavity 74 of the cartridge drive 60 through the supporting surface 62. The cavity 74 is defined by an annulus having a series of equally spaced and inwardly depending drive teeth 88, wherein each space is sized to retain an engagement tooth 72 when the spline 70 is engaged into the cavity. A return drive spring 68, not shown in FIGS. 6–7(d) but clearly shown in FIGS. 1 and 8(a)–8(c), separates the drive gear 66 from the bottom of the trigger 50 and biases the shutter release button 52 in an undepressed position.

Figure 6:
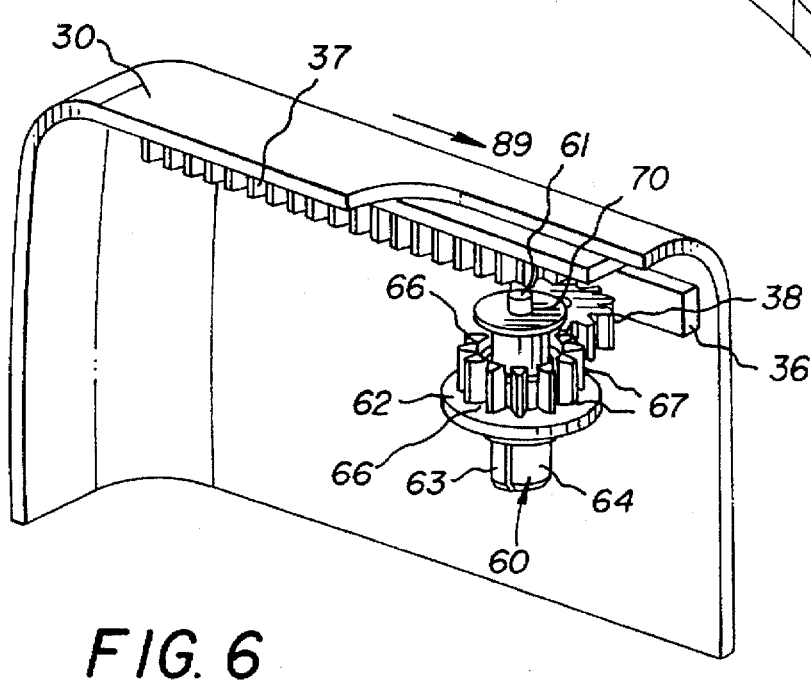
FIG. 6 is a partial perspective view of the of the camera of FIGS. 1-5 illustrating the interaction between the film drive components of the film advance system.

Initially, the drive spline 70 is not engaged; that is, while the shutter release button 52 is in the undepressed state, the lower engagement teeth 72 are not engaged in the cavity 74. As seen in the partial view of FIG. 6, the drive gear 66 is always in engagement with the idler gear 38. However, no positive force can be imparted to the film cartridge 28, FIG. 30, until the spline 70 is engaged into the cavity 74 of the cartridge drive 60. Preferably, and according to this embodiment, a compliant sheet metal spring 75, shown in FIGS. 1 and 8(a)–8(c), is attached to the top of the upper portion 54 of the trigger 50 through a slotted aperture 71, allowing the vertical shaft 61 of the cartridge drive 60 to pass therethrough. The compliant spring 75 bears against the top of the spline 70 to supply the necessary biasing force to keep the spline engaged in the cavity 74 when the shutter release button 52 is depressed, as described in greater detail below. As noted, the idler gear 38 is positioned for engagement between the drive gear 66 and the linear gear rack 36 on the interior of the pump handle 30, as shown in FIG. 6. The operation of each of the above components are described in greater detail below.

Referring to FIGS. 1, 5, 12, and 13, a cylindrical metering release element 76 includes a hollowed center for mounting over a frame post 78, shown only in FIG. 1, and to allow corresponding rotation, as well as a bottom slotted portion 83 which is initially aligned relative to a top resting surface 82 of a frame protrusion 79. The metering release element 76 includes a recessed area 77, adjacent the slotted portion 83 which is used in conjunction with a cantilevered spring arm 96 of an adjacently assembled high energy lever 90, as detailed below, to allow the metering release element to rotate. The metering release element 76 also includes a depending elongate section 85 extending from the periphery of the metering release element 76 for engaging the end portion 104 of the demetering lever 106, shown particularly in FIG. 2, as well as a supporting top section 84 having a recessed cutout 86 directly beneath which are used for engaging the slotted portion 55, FIGS. 1, 5 of the trigger 50.

Referring to FIGS. 1 and 5, the high energy lever 90 is pivotally mounted to an adjacent frame post through a mounting aperture 91, shown only in FIG. 1, and is biased in a released or fired position, shown in FIG. 5, by a torsion spring 94, also shown only in FIG. 1, having one end mounted to a post of the lever and the remaining end attached to a separate frame post, while the body of the spring is wound around a protruding portion 95 extending around the mounting aperture.

Figure 10:
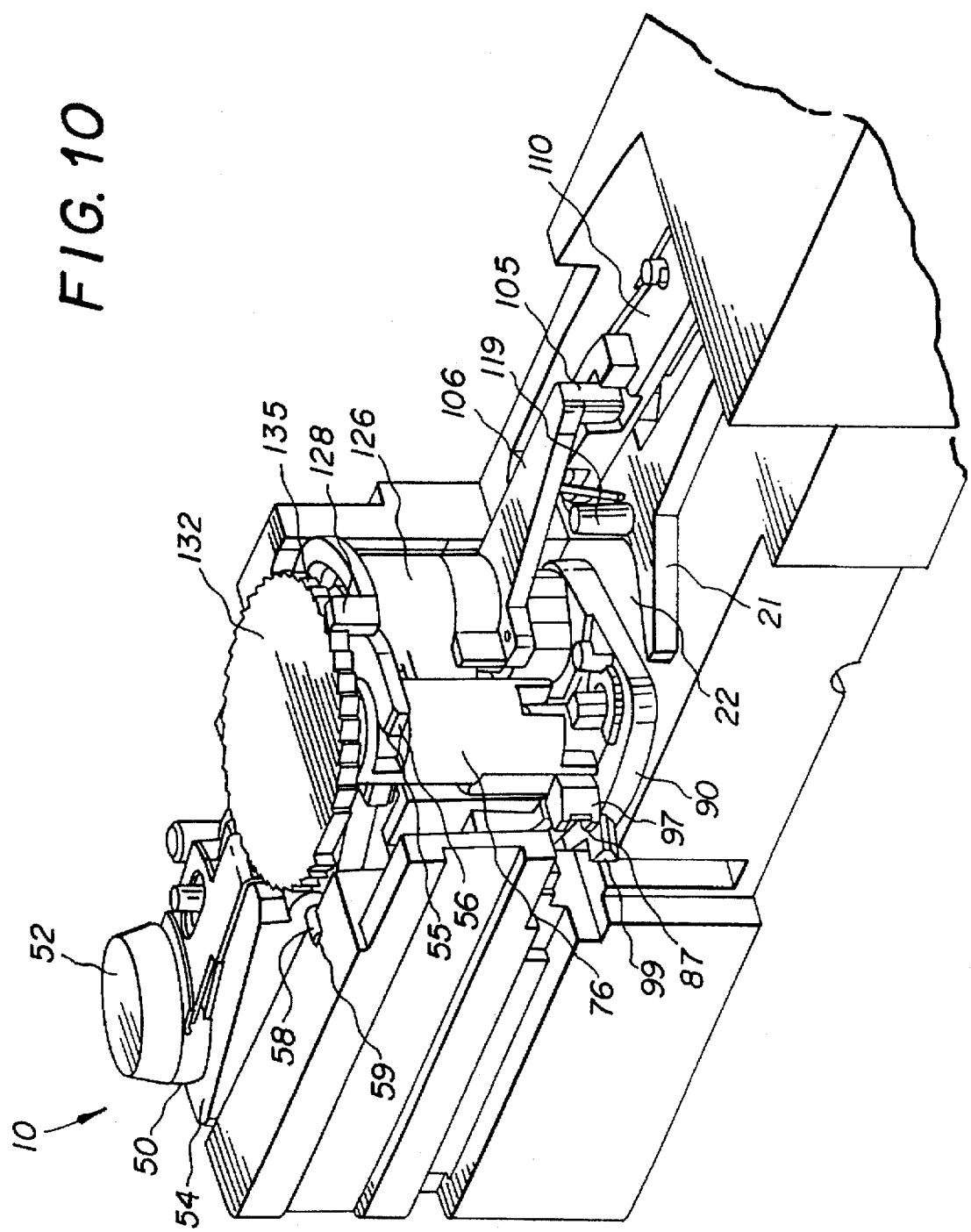
FIG. 10 is the partial front perspective view of the camera of FIGS. 1-9 immediately after the shutter release button has been depressed.
Figure 11:
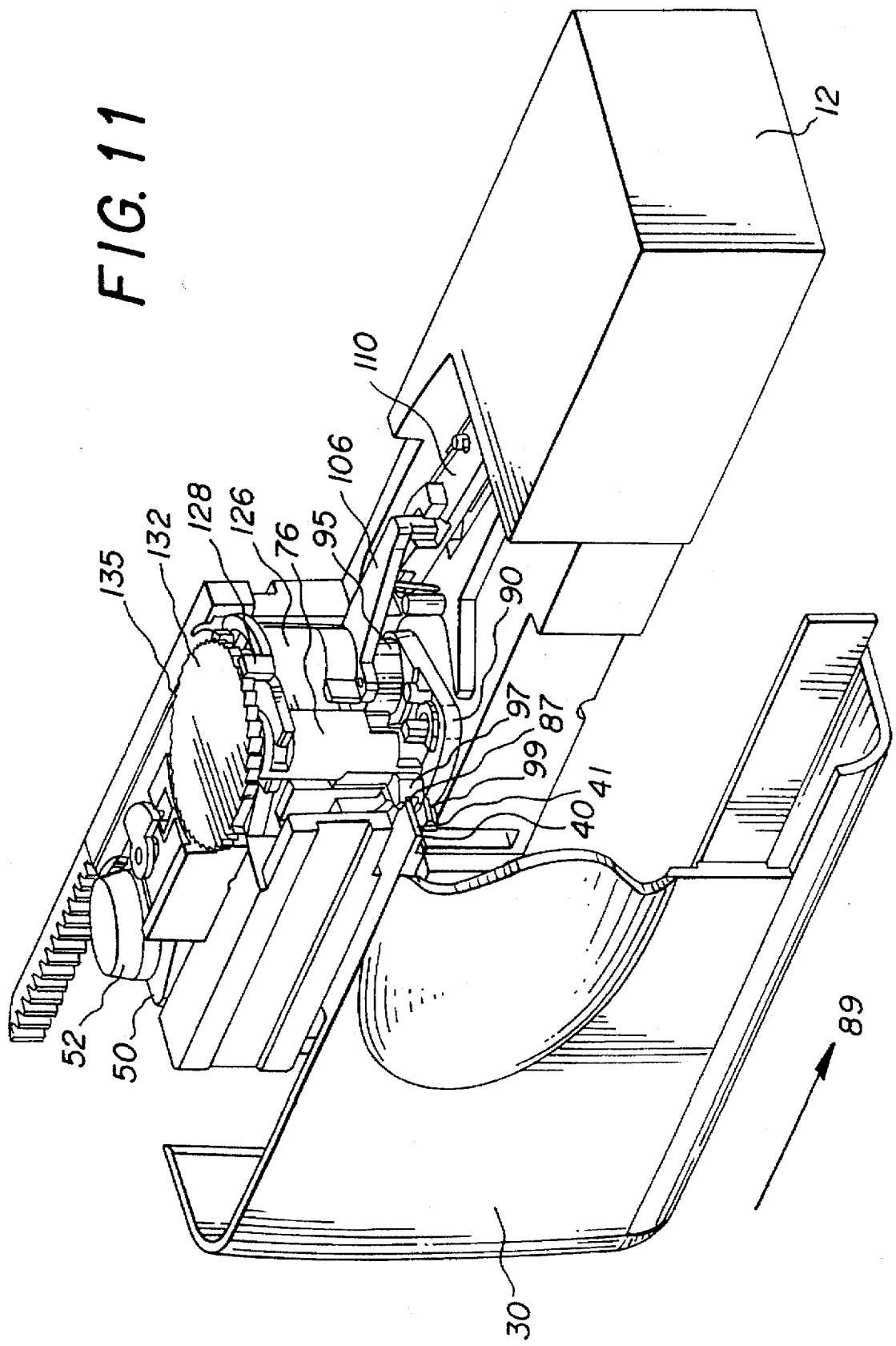
FIG. 11 is a partial front perspective view of the camera of FIGS. 1-10 showing the initial engagement of the pump cover with the film advance system according to the first embodiment.

Referring to FIG. 5, the high energy lever 90 includes a shutter blade striking portion 99 which extends beyond the front of the frame portion 12, FIG. 10, when the assembled lever is in the released position. A cantilevered spring arm 96 extends upwardly and across the front of the lever 90 relative to the shutter blade striking portion 99 and includes a contact portion 97 having a groove 87 sized for receiving a portion of the tapered engagement arm 40 of the pump cover 30 as shown in FIG. 11. When the lever 90 is in the released position, the contact portion 97 also extends outward of the front of the frame portion 12.

Figure 12:
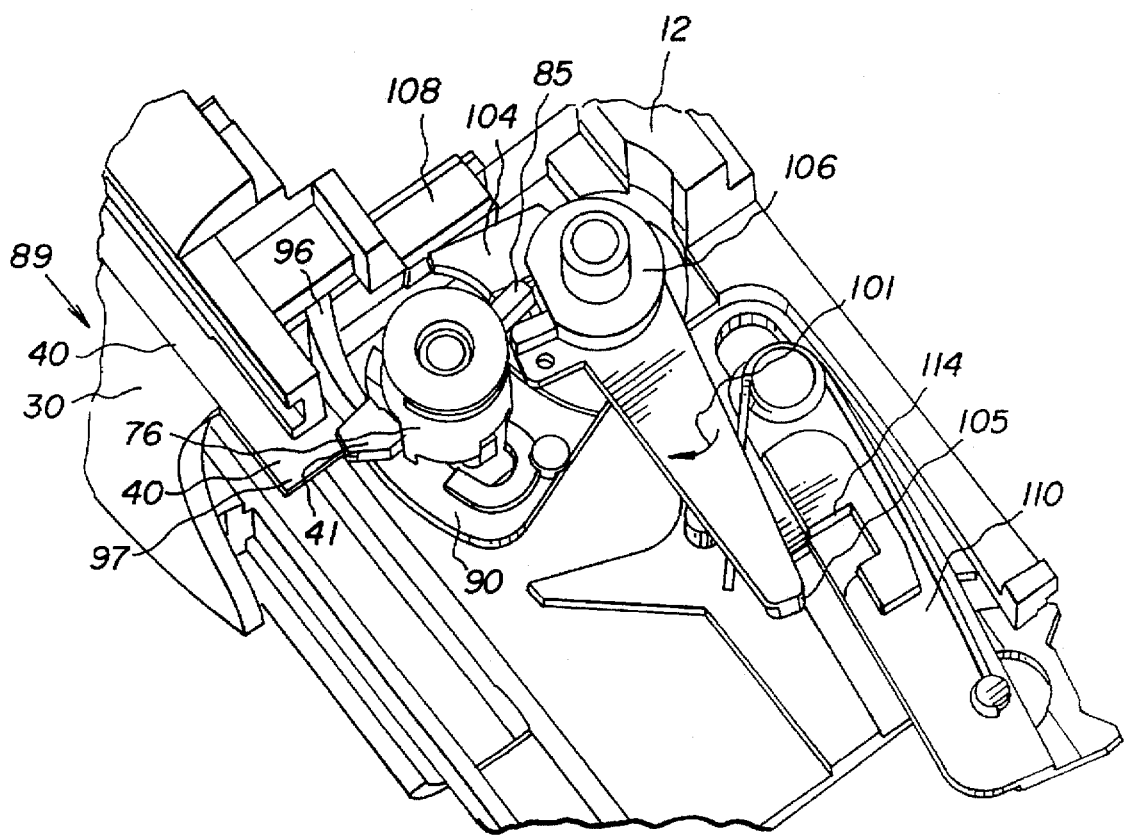
FIG. 12 is a partial top view of the camera showing the unlocking of the metering pawl member.
Figure 13:
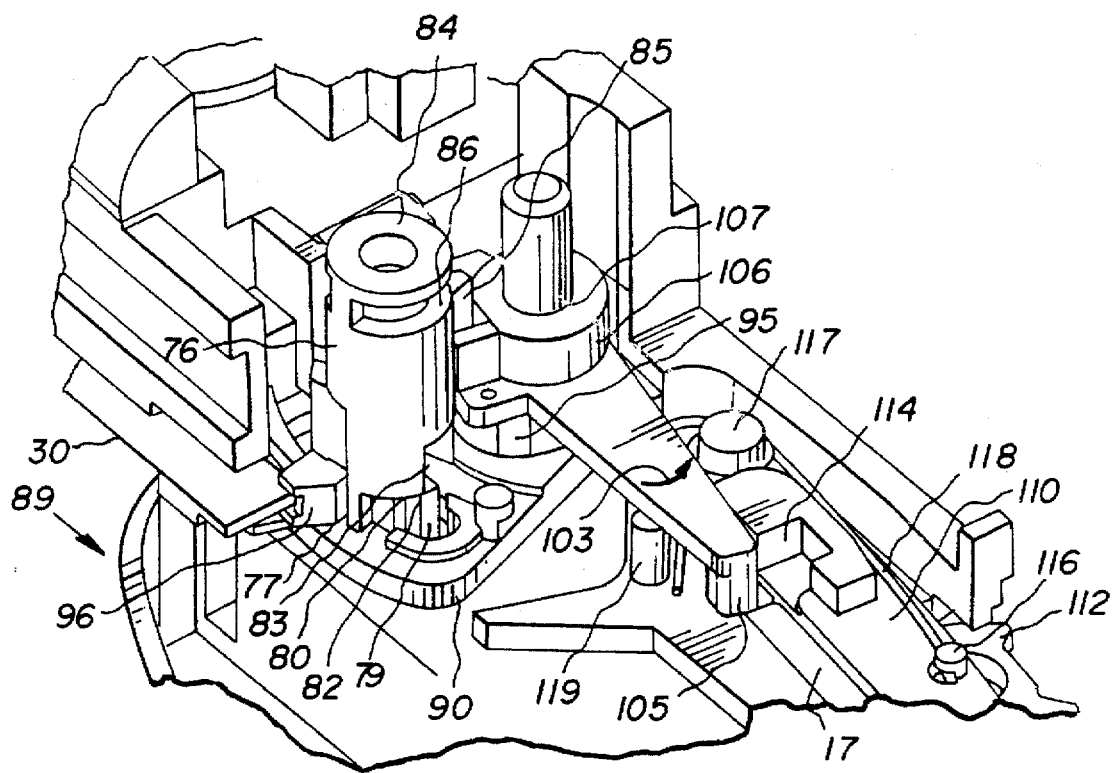
FIG. 13 is a partial side perspective view of FIG. 12.

Referring to FIGS. 1, 5 and 13, a pivotable demetering lever 106 is attached through a coaxial mounting aperture 107 to the top of the protruding portion 95 of the high energy lever 90, and is pivotally biased to rotate in the direction shown by arrow 103, FIG. 13, to a first locking position with a slotted portion 114 of a metering pawl member 110 by a sheet-metal spring 108, FIG. 12, which is engaged in a slot of the frame portion 12, FIG. 12. The lever 106 includes a locking pin 105 extending from a bottom surface for engaging the slotted portion 114 of the metering pawl member 110, as well as an oppositely disposed articulating end portion 104, best seen in FIG. 12, used primarily for contacting the elongate portion 85 of the metering release element 76.

Figure 9:
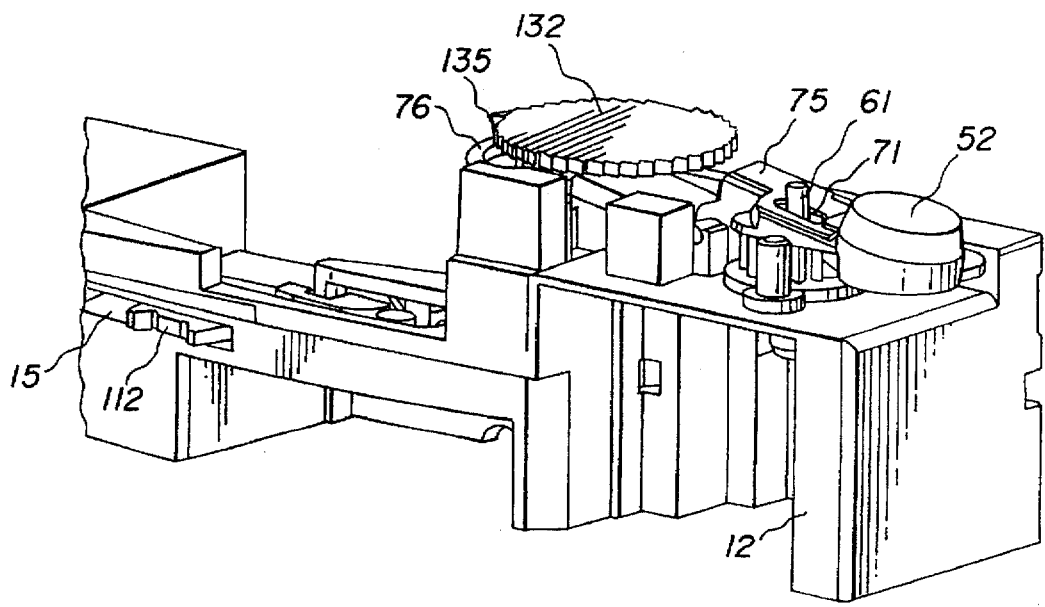
FIG. 9 is the partial rear perspective view of the camera of FIGS. 1-8(c) showing the camera after the shutter release button has been depressed.
Figure 14:
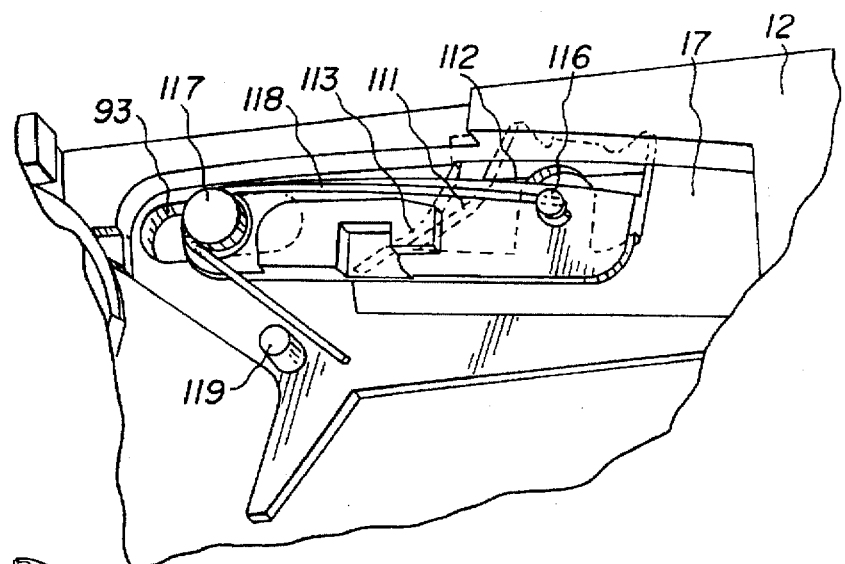
FIG. 14 is the partial top perspective view of the movement of metering pawl member of FIG. 12 relative to the frame of the camera.
Figure 15:
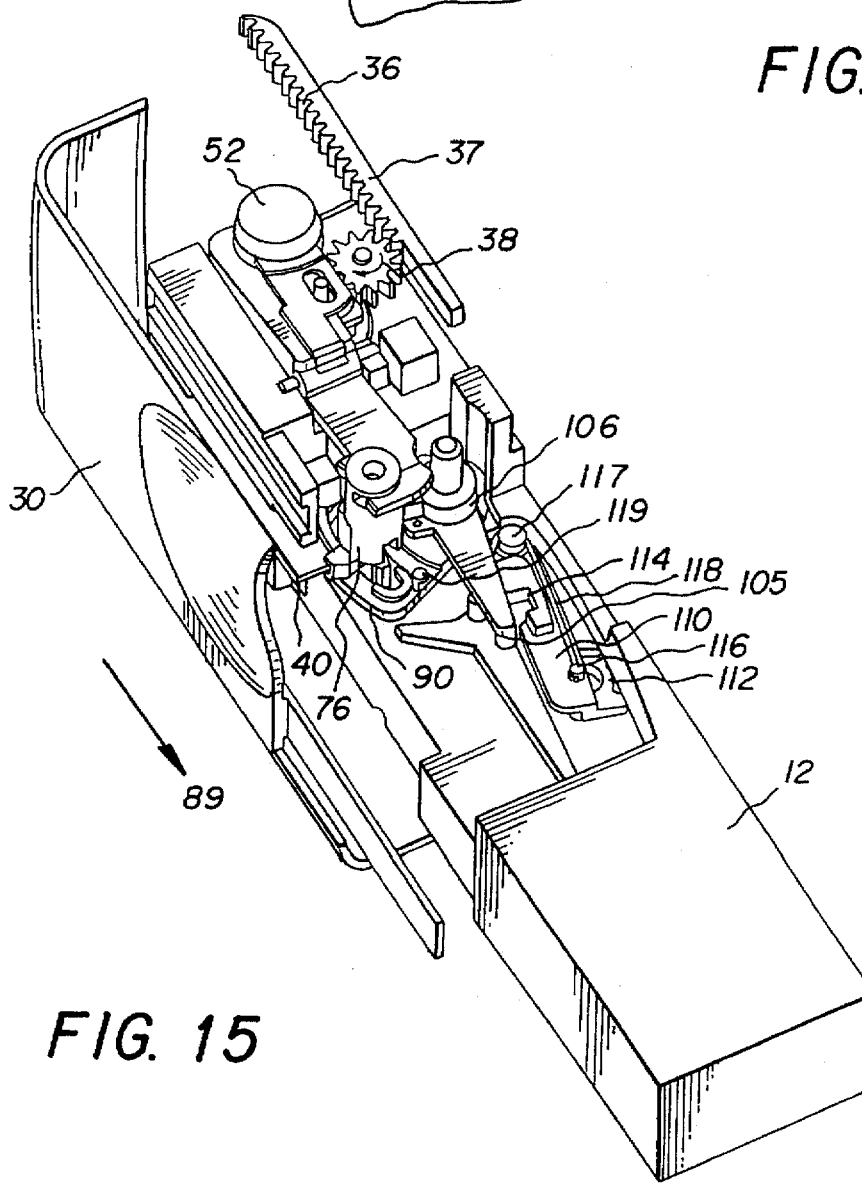
FIG. 15 is the partial top perspective view of the camera of FIGS. 1–14 showing the initial disengagement of the metering pawl member with the advancing filmstrip.
Figure 16:
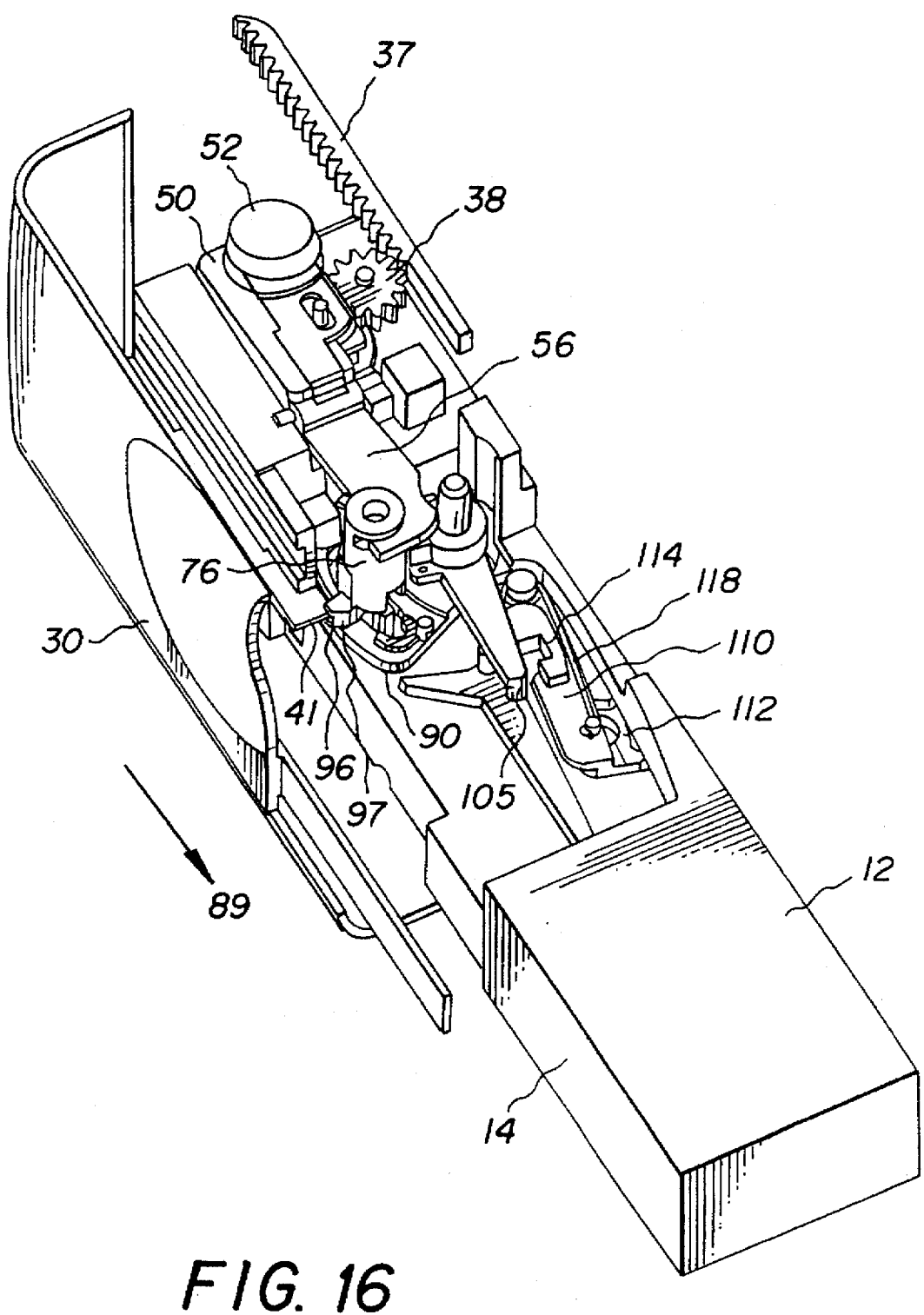
FIG. 16 is a partial top perspective view of FIG. 15 showing the complete disengagement of the metering pawl member from the filmstrip.

Referring to FIGS. 13 and 14, the metering pawl member 110 includes a twin pawl filmstrip hook 112, which is movable into and out of the film plane of the camera 10 through a slot 17, FIG. 9, of the frame portion 12, and is biased by a torsion spring 118 which is connected at one end to a post 116 extending from the top surface of the metering pawl member and at the other end to a post 119 of the frame portion 12. Preferably, the spring 118 is wrapped about an intermediate post 117 extending from the top of the metering pawl member 110 at one end while the metering pawl member is supported within a pair of slots 93 and 17, FIGS. 1, 14 in the top of the frame portion 12 which are oversized to allow both pivotal and axial movement for reasons which are detailed below.

In describing the remainder of the components attached to the frame portion 12 and referring to FIG. 1, the front lens element 100 is attached to the front of the frame portion by a snap fitting retainer 102, aligning the lens element with the front opening 20. A shutter blade 120 having an engagement end 122 also includes a masking portion 124 which covers the front opening 20 of the frame portion 12 of the camera 10.

A keeper plate 130 attached to the top of the frame portion 12 retains a number of the previously described components, and includes a slotted holding portion 129 for retaining a rotatable frame counter 132 having a set of peripheral teeth 135, FIG. 9, which is incremented by a counter actuator 126 attached to the top of the demetering lever 106.

It should be noted that specifics relating to the operation of, or pertaining to other features of the camera 10, such as use of the viewfinder (not shown) or flash assembly (not shown) are commonly known in the field of photography, and require no additional discussion.

Referring to FIG. 2, a partial view of the camera 10 illustrates the pump cover 30 in a fully opened or extended position which is the initial position for describing the operational sequence of the film advance system. As is evident from FIGS. 1 and 3, the front lens element 100 and the depressible shutter button 52 of the trigger 50 are clearly exposed to the user when the pump cover 30 is in this position.

Operation of the First Embodiment

Referring to FIGS. 3–20 and 50–57, the following discussion describes the operational sequence of the described film advance system according to this particular embodiment. The sequence begins with the pump cover 30 in the fully opened position, as shown in FIG. 2.

Figure 4:
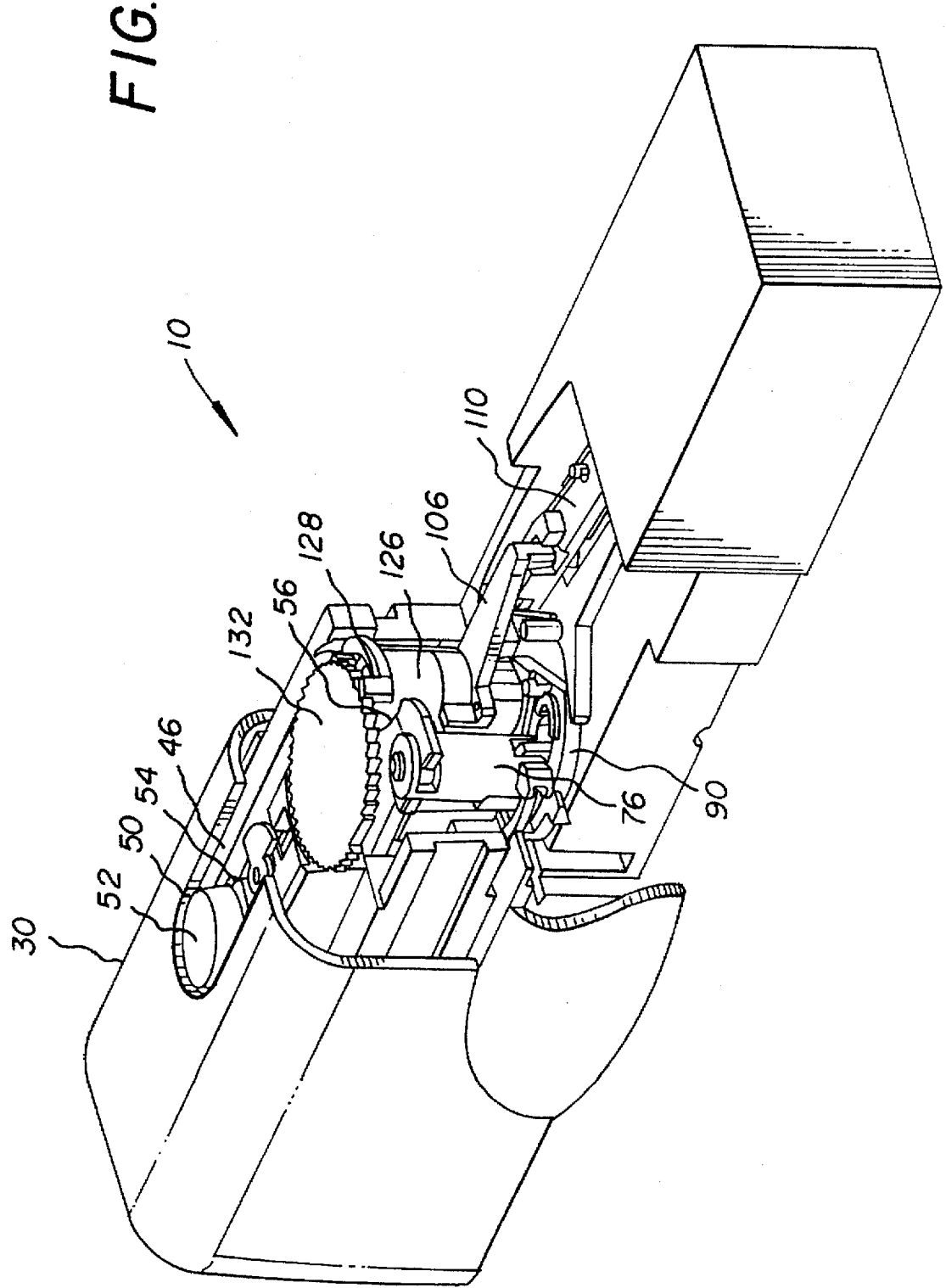
FIG. 4 is a partial front perspective view of the camera of FIGS. 1-3, showing the pump handle in the fully opened position, prior to the depression of the shutter release button.

FIG. 4 illustrates a partial view of the camera 10 showing the initial relative positions of each of the above described film advance components. The front and rear covers of the described camera 10 are not illustrated for the sake of clarity.

Initially, the shutter release button 52 is visible in the cutout portion 46 of the pump cover 30 in an undepressed position. Therefore, the upper portion 54 of the trigger 50 is raised relative to the lower portion 56, which supports the metering release element by engagement of the recessed cutout 86 with the slotted portion 55. In this initial position, the presence of the metering release element 76 blocks the release of the high energy lever 90, which is preset in the cocked position against the biasing force supplied by the torsion spring 94, FIG. 1.

Referring to FIG. 5, the locking pin 105 of the demetering lever 106 is initially engaged with the slotted portion 114 of the metering pawl member 110, and is biased in this position by the sheet metal spring 108, as shown in FIG. 12, which bears against the lever. In addition, the metering pawl member 110 is biased in a filmstrip engaging position by the torsion spring 118, positioning each of the twin pawls of the metering hook 112 in engagement with a set of exposure position or frame-defining perforations 25 of a filmstrip 24.

Figure 7A:
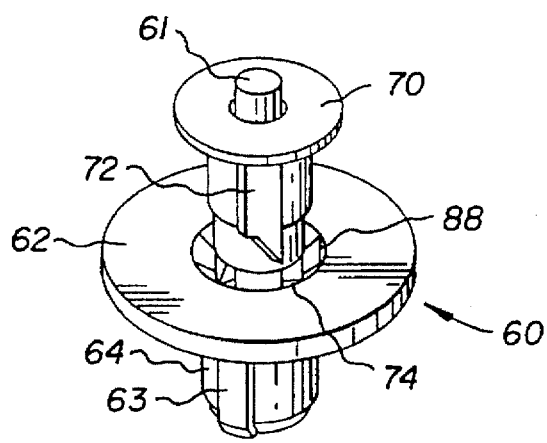
FIGS. 7(a)-7(d) are partial perspective views showing the interaction between the drive spline and the film cartridge drive components in respective disengaged and engaged positions.
Figure 7B:
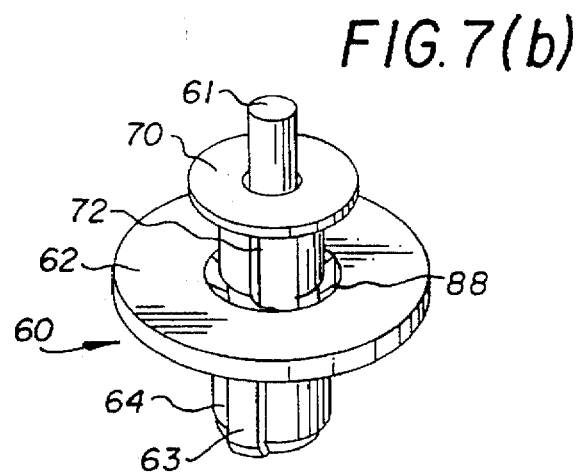
Figure 7C:
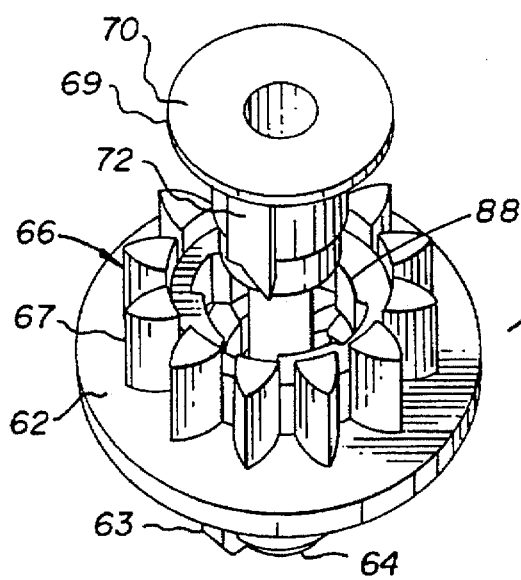
Figure 7D:
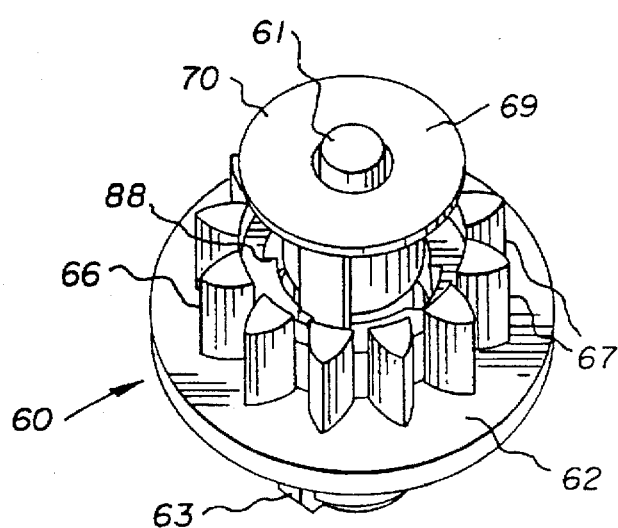
Figure 8A:
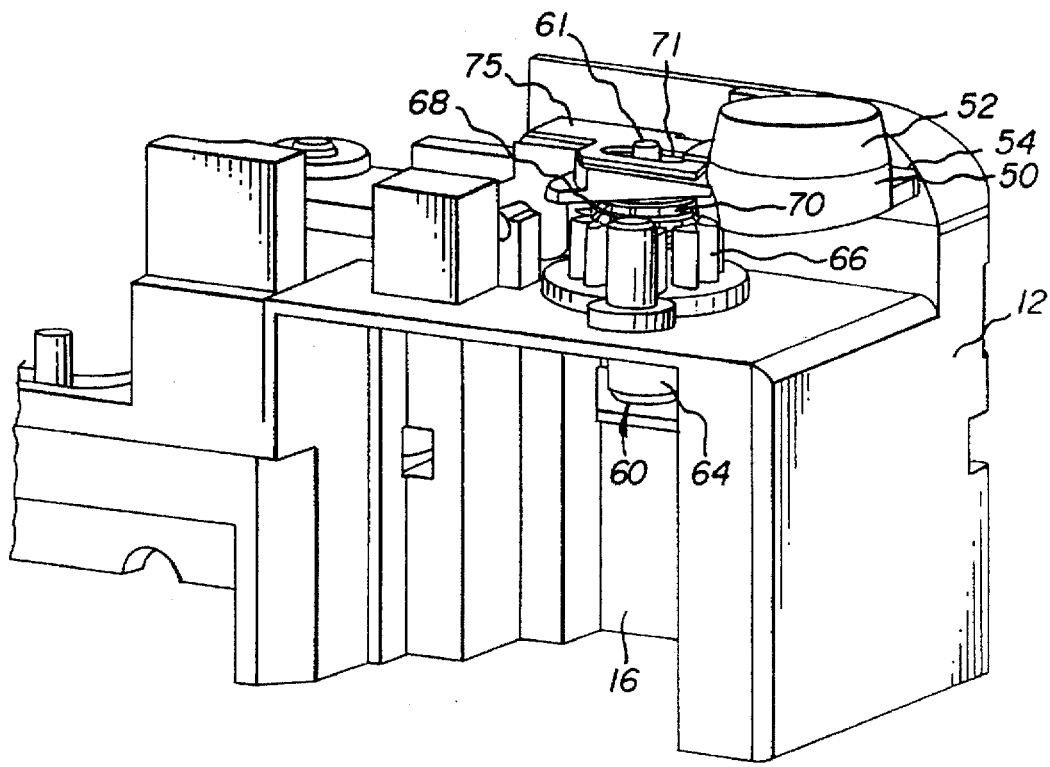
Figure 8B:
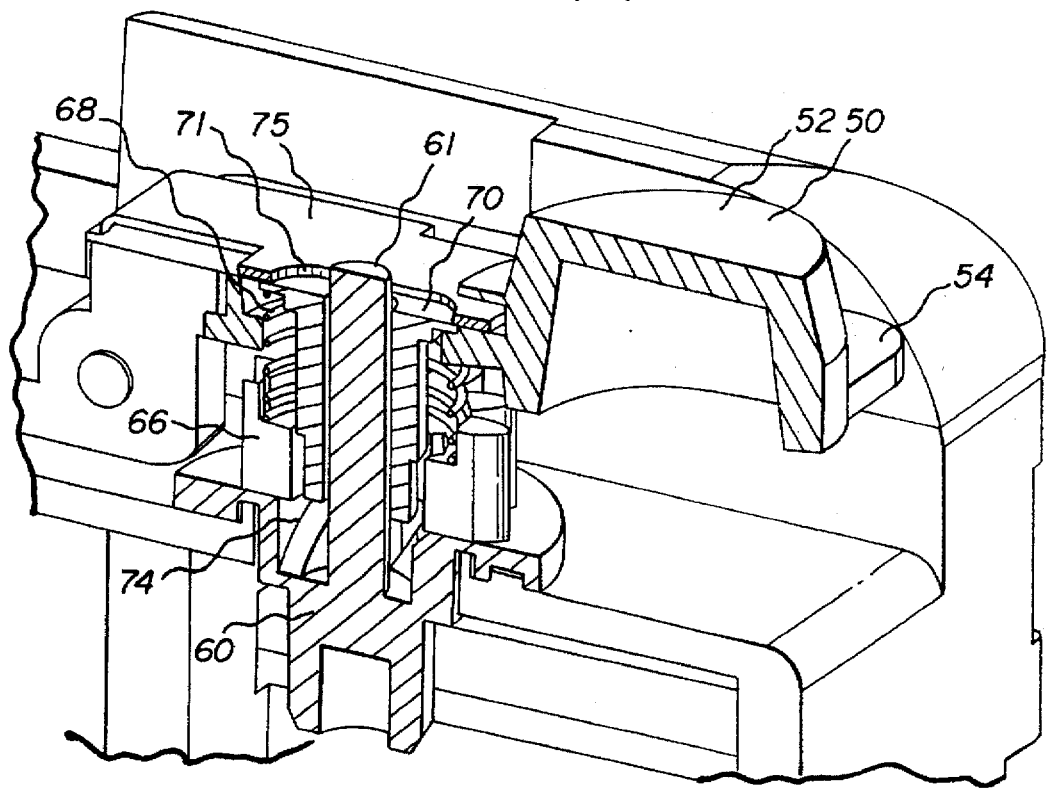
Figure 8C:
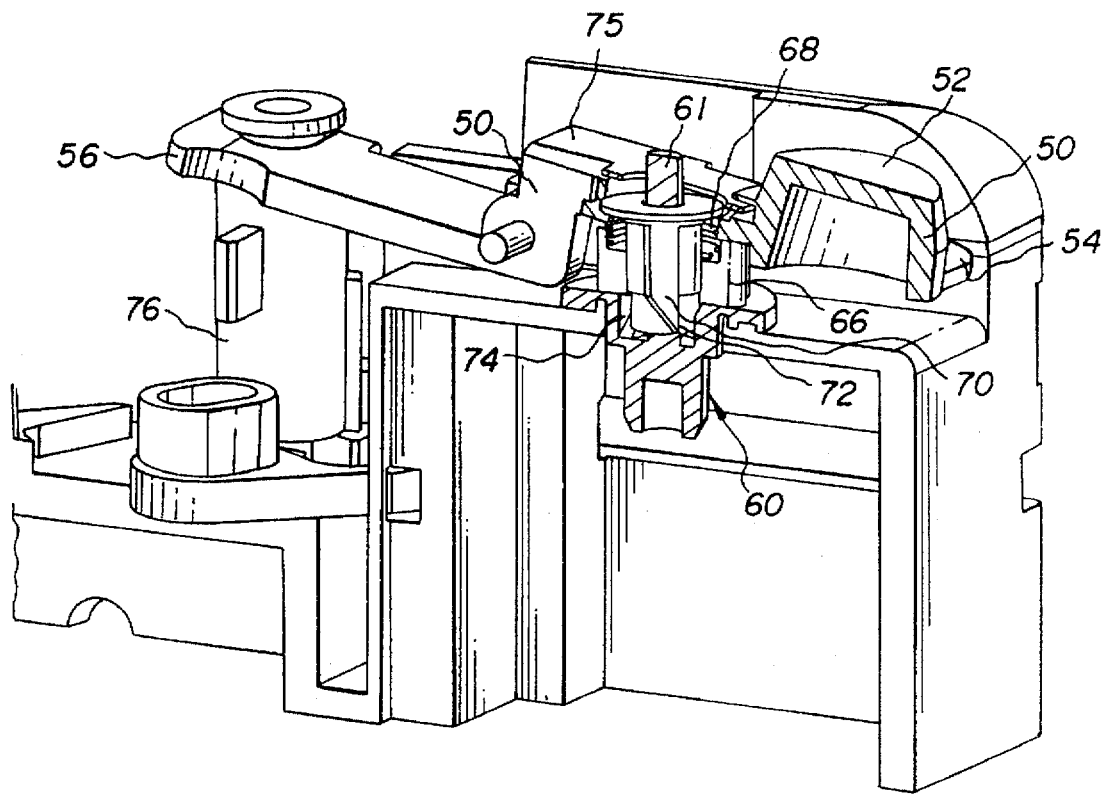

Referring now to FIGS. 8(a)–8(c), the operation of the film advance system is keyed by the depression of the shutter release button 52, which also controls the following functions: First, the trigger return spring 68 positioned between the drive gear 66 and the trigger 50 is compressed as the shutter release button 52 is moved downwardly towards the cartridge drive 60 by the finger pressure of a user. The adjacent drive spline 70 being on the upper portion 54 of the trigger 50 is also pushed by the bottom of the upper portion of the trigger 50 similarly in a downward direction along the vertical shaft 61 of the film cartridge drive 60 and through the hub of the drive gear 66, and causing the two lower engagement teeth 72, to enter the cavity 74 of the cartridge drive 60 to mesh with corresponding drive teeth 88 provided on the interior of the film cartridge drive 60, as shown in FIGS. 8(c) as well as FIGS. 7(b) and 7(d). The engagement teeth 72 of the drive spline 70, preferably and according to this embodiment, slide through the hub of the drive gear 66 along a set of guides (shown in FIG. 7(c)), which are molded in the hub of the drive gear. The described engagement of the drive spline 70 links the rotational movement of the drive gear 66 with the cartridge drive 60.

Still referring to FIGS. 8(a)–8(c), and as previously noted, located on the top surface of the upper portion 54 of the trigger 50 and attached thereto through a slot 73, FIG. 1, is a compliant spring 75, preferably made from sheet metal. The spring 75 travels with the upper portion 54 of the trigger 50 when the shutter release button 52 is depressed, as shown in FIG. 9, and loads a spring force which is sufficient to hold the drive spline 70 in mesh with the 35 cartridge drive 60 while the trigger 50 remains pivoted.

Referring to FIG. 10, the depression of the shutter release button 52 also causes the release of the high energy lever 90, FIG. 6, as the attached metering release element 76 is raised by the supporting lower portion 56 of the trigger 50 due to the pivoted connection between the lugs 58 and the slots 59. Preferably, the metering release element 76 is lifted a distance sufficient to allow the high energy lever 90 to pass underneath; in this embodiment, a distance of approximately 2.0–2.7 mm allows the high energy lever 90, to rotate at a high speed due to the stored force of the spring 94, shown only in FIG. 1, in a clockwise direction about its pivot, thereby having the shutter blade striking portion 99 momentarily strike the engagement end 122, FIG. 1, of the shutter blade 120, FIG. 1, in a manner conventionally known to allow ambient light to enter the exposure chamber 18, FIG. 1, to impinge on a portion of the filmstrip 24, FIG. 5.

Once the shutter release button 52 has been depressed and the high energy lever 90 has been released beneath the metering release element 76, the upper portion 54 of the trigger 50 will remain in a "down" position until the high energy lever 90 has been recocked, as described below. It will be readily apparent that retaining the shutter release button 52 in the depressed position is preferable as described in that the possibility of the camera user creating double exposures is virtually eliminated.

FIG. 10 is an enhanced partial perspective view of the described camera 10 immediately after the preceding events have occurred. Referring to FIG. 11 and in the released position, the contact portion 97 of the spring arm 96 extends outward of the front of the frame portion 12 of the camera 10 and is aligned with the path of the tapered engagement arm 40 of the pump cover 30, as well as the recessed portion 77, FIG. 13, of the metering release element 76.

Still referring to FIG. 11, it is evident that the presence of the released high energy lever 90 also prevents the metering release element 76 from assuming the initial lowered position, and therefore the trigger 50 remains pivoted. As the pump cover 30 begins to move inwardly in a closing direction, shown by arrow 89, the front edge 41 of the tapered engagement arm 40 is aligned with and engages the groove 87 provided on the contacting portion 97 of the spring arm 96, FIG. 12. The presence of the engagement arm 40 causes the cantilevered spring arm 96, FIG. 12, to inwardly deflect toward the back of the camera 10 and into the recessed portion 77 of the metering release element 76, as shown in FIG. 13. As the pump cover 30 continues to translate in the direction 89, the force applied to the metering release element 76 by the contact portion 97 causes the metering release element 76 and the high energy lever 90 to each respectively pivot in a counterclockwise fashion.

Referring to FIG. 12, and as the metering release element 76 is rotated counterclockwise by the closing movement of the pump cover 30, the elongate portion 85 of the metering release element 76 is rotated through a position which causes contact with the articulating end portion 104 of the demetering lever 106, causing a corresponding rotation, in e lever, in the direction 101, sufficient to overcome the biasing force of the sheet-metal spring 108, thereby also causing the locking pin 105 to be pivoted out of locking engagement with the slotted portion 114 of the metering pawl member 110.

Simultaneously, and referring to FIG. 11, the pivotal movement of the demetering lever 106 causes a similar clockwise movement by the attached counter actuator 126 due to its connection therewith. A flexible contact element 128 extending from the top of the actuator engages the peripheral teeth 135 of the frame counter 132. The rotational movement of the counter actuator 126 is sufficient to cause the frame counter 132 to rotate by one increment in a known manner. In the meantime, however, the twin pawl metering hook 112 of the metering pawl member 110 remains in engagement with the perforations of the filmstrip 24, in the same relative position shown in FIG. 5.

As is evident from FIG. 13, the counterclockwise rotation of the metering release element 76 in addition to unlocking the metering pawl member 110, also causes the raised bottom surface adjacent the slotted portion 83 to rest upon surface 82 of the frame protrusion 79, retaining the metering release element in a raised position, even after the metering release element is no longer supported by the high energy lever 90 which is being cocked by the pump cover 30.

Each of the above described movements occur immediately after the depression of the shutter release button 52, and preferably within about the first four (4) millimeters (mm) of travel of the pump cover 30 in the closing direction, see FIG. 6. To insure that the filmstrip 24, FIG. 5, is not prematurely driven, the engagement teeth 37 of the gear rack 36 are shortened or removed entirely according to this embodiment along the first four millimeters of travel, preventing engagement of the gear rack with the stationary idler gear 38; therefore, though the drive gear 66 is substantially in engagement with the idler gear 38, the filmstrip 24, FIG. 5, will not have had any winding force applied to draw the filmstrip into the film cartridge 28, FIG. 30, while the pump cover 30 has allowed or caused the multiple functions described above to occur.

Referring now to the partial view of the camera 10 shown in FIG. 6, and as the pump cover 30 continues to travel inwardly in direction 89 and beyond the first four millimeters of travel, the idler gear 38 meshes with the first complete engagement tooth 37 of the linear gear rack 36, causing clockwise rotation of the idler gear and corresponding counterclockwise rotation of the meshed drive gear 66 to commence winding of the filmstrip 24, FIG. 5, in a film winding direction into the film cartridge 28, FIG. 30. Preferably, a partial tooth (not shown) can be provided on the linear gear rack 36 prior to the first complete tooth 37 to insure proper alignment between the gear rack and the idler gear 38 prior to film advancement by translational movement of the pump cover 30.

Referring now to FIGS. 5 and 14–16, and as noted above, the twin pawl metering hook 112 of the unlocked metering pawl member 110 is retained in engagement with the perforations 25, shown only in FIG. 5, of the filmstrip 24 also shown only in FIG. 5, even after the locking pin 105 has been pivoted out of the slotted portion 114. As the filmstrip 24 is caused to move under the winding force supplied by the movement of the gear rack 37 with the idler gear 38 and the corresponding engagement between the engaged idler gear and the drive gear 66, as shown in FIG. 6, the unlocked metering pawl member 110 translates with the engaged filmstrip 24, FIG. 5, against the force of the spring 118 and along the path of the film plane due to the presence of the slots 93 and 17, FIGS. 1, 14 of the frame portion 12, until a ramped cam surface 111, shown only in FIG. 14, at the bottom of the metering pawl member 110 contacts a corresponding ramped cam surface 113, shown only in FIG. 14, of the frame portion 12 found on an inner surface of the slot 17. As the metering pawl cam surface 111 moves up the ramped portion of the frame cam surface 113, the metering hook 112 of the metering pawl member 110 is caused to move inwardly, in a direction away from the filmstrip 24, FIG. 5, and out of the film plane as the metering pawl member is caused to both translate and pivot.

Figure 17:
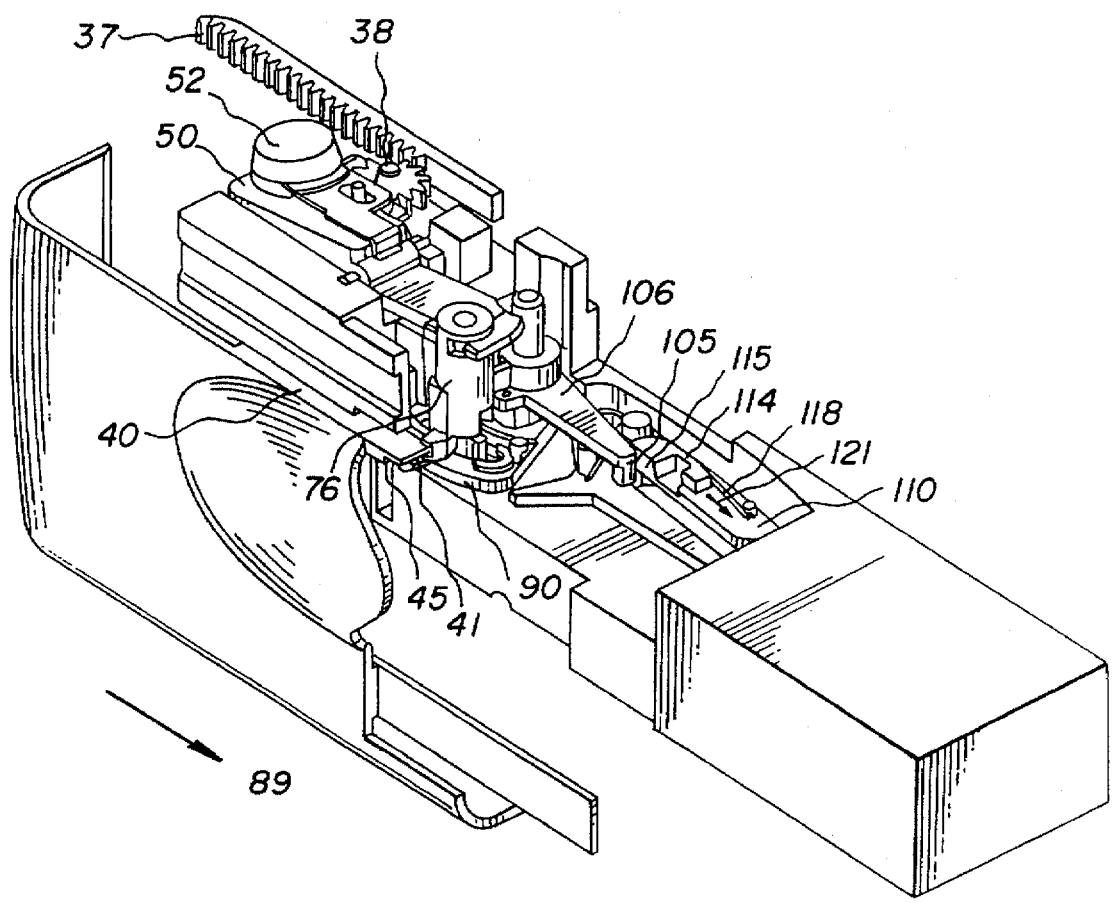
FIG. 17 is the partial front perspective view of the camera of FIGS. 1–16 illustrating the realignment of the metering pawl member with the filmplane.

The absence of the tension supplied by the engaged filmstrip 24, FIG. 5, in combination with the biasing force supplied by the torsion spring 118 causes the metering pawl member 110 to laterally translate, as well as pivot in a direction 121 away from the centerline of the camera 10 toward the film supply chamber 14, as shown in FIG. 17.

In addition, the lateral slide of the metering pawl member 110 caused by the biasing of the torsion spring 118 causes a raised metering pawl cam surface 115 adjacent the slotted portion 114 to engage the locking pin 105, holding the demetering lever 106 in place between the force of the sheet metal spring 108, FIG. 12, and the cam surface 115.

Figure 18:
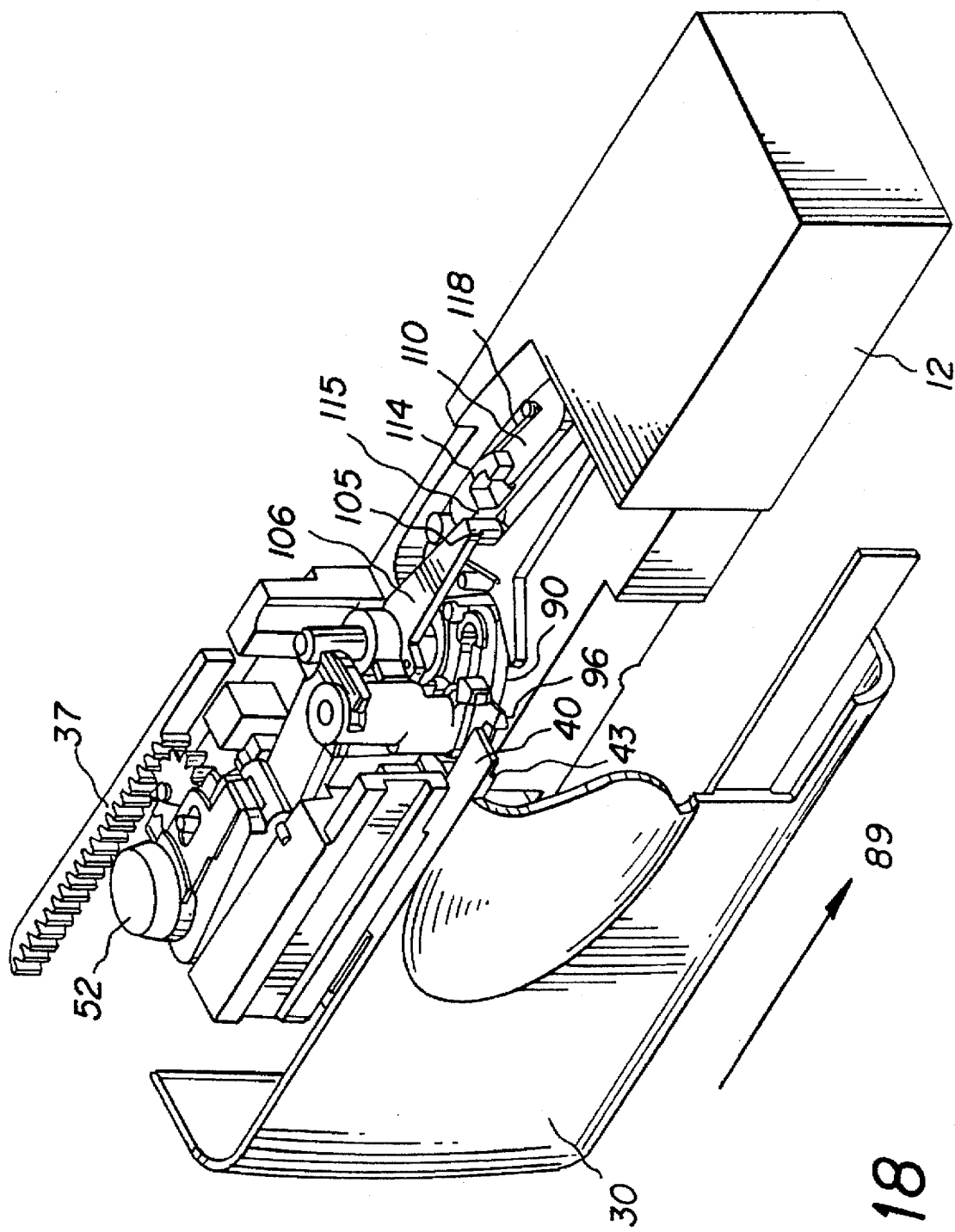
FIG. 18 is the partial front perspective view of FIG. 17 showing the positioning of the demetering lever relative to the metering pawl member prior to film metering.
Figure 19:
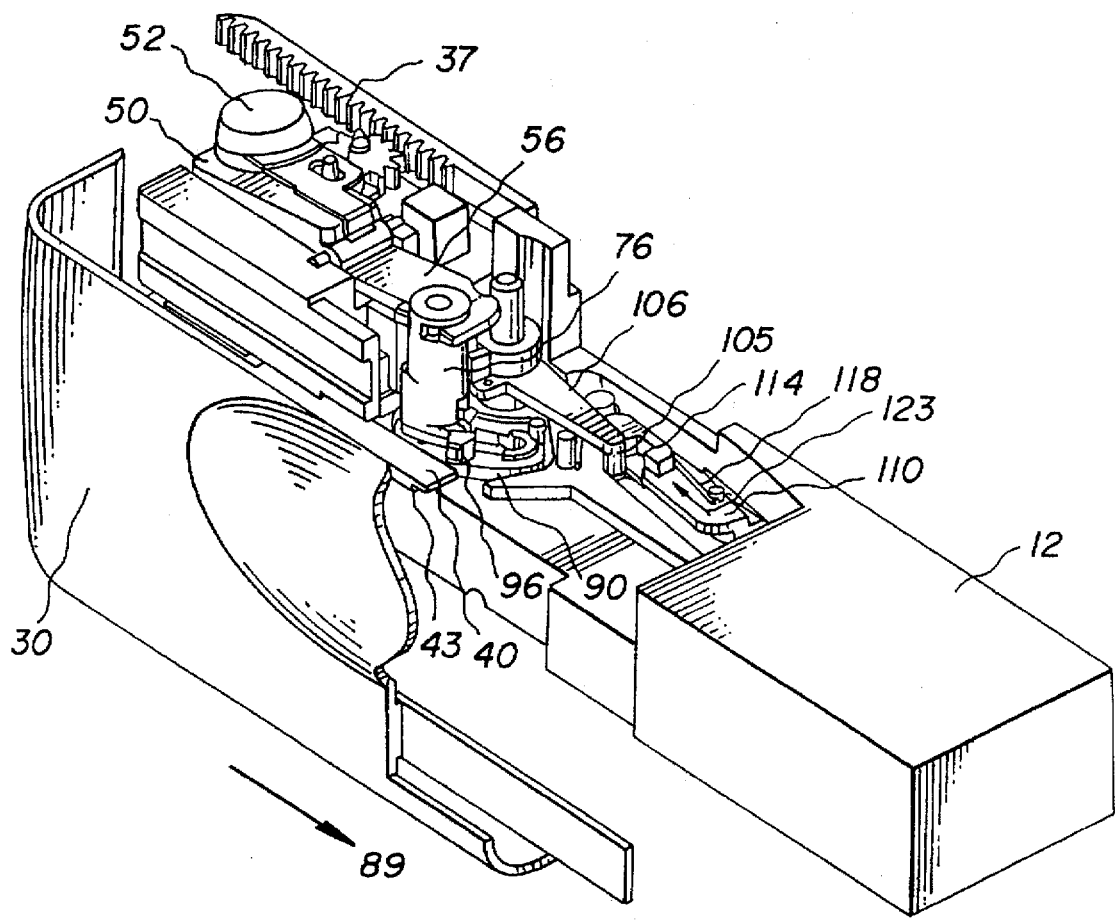
FIG. 19 is a partial front perspective view of FIG. 18 showing the relative movement of the metering pawl member after the member has engaged a new set of exposure frame-defining perforations of the advancing filmstrip.

Referring to FIGS. 18 and 19, the continued travel of the pump cover 30 in the closing direction, arrow 89, causes engagement of the stepped portion 43 of the engagement arm 40 with the spring arm 96 of the high energy lever 90, pivoting the high energy lever in a counterclockwise direction beneath the metering release element 76 against the biasing force supplied by the spring 94, shown only in FIG. 1. As noted previously, the rest surface 82, FIG. 13, supports the metering release element 76 in a raised position allowing the high energy lever 90 to be moved in the described manner.

Figure 20:
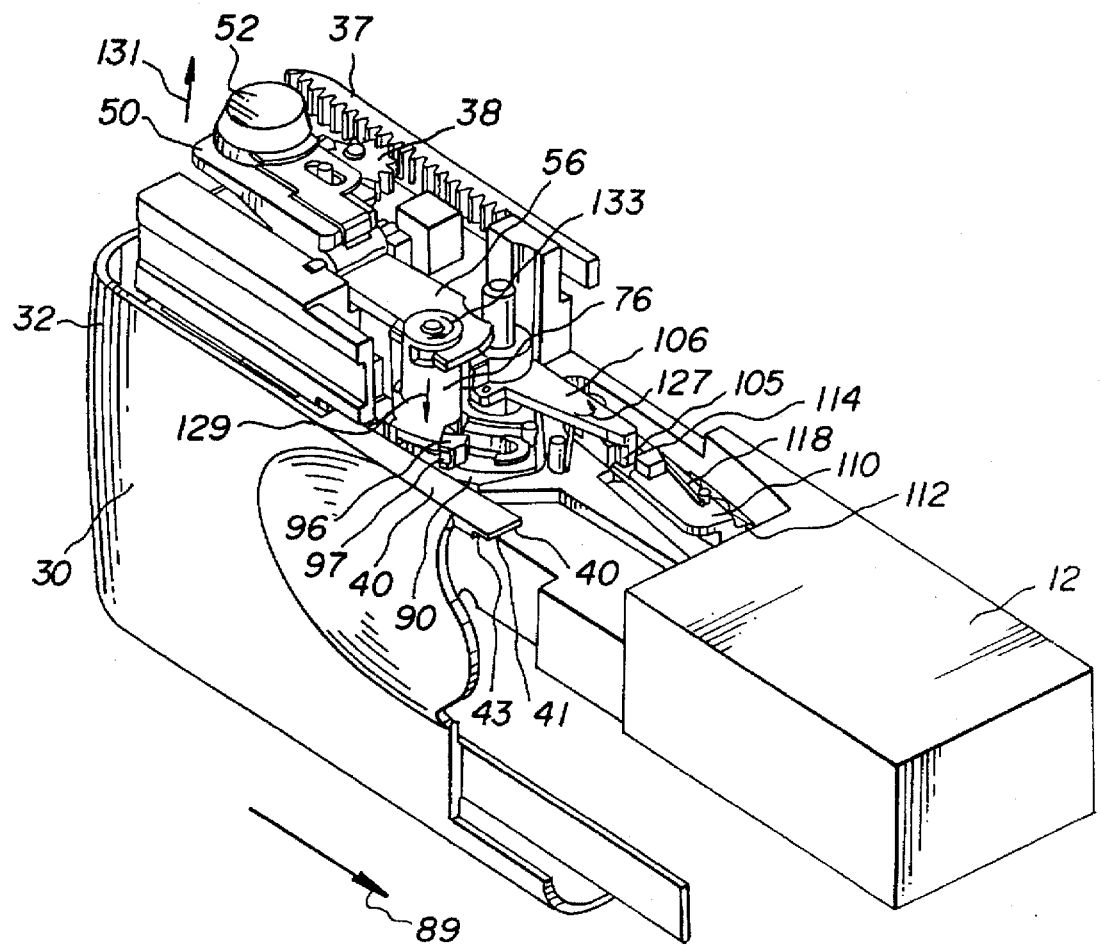
FIG. 20 is the partial front perspective view of FIG. 19 showing the camera in the film metered position prior to image capture.

Referring to FIGS. 5, 19, and 20, the filmstrip 24 continues to be wound into the film cartridge 28, FIG. 30, due to the respective engagements between the linear gear rack 36, the idler gear 38, the drive gear 66, the engaged drive spline 70, and the cartridge drive 60. As the filmstrip 24 translates across the film rails (not shown) of the camera frame portion 12 which border the exposure chamber 18, the metering hook 112 of the metering pawl member 110, which has been relocated back into the film plane through the slot 17, FIG. 9, of the frame portion 12 due to the biasing force of the torsion spring 118, will drop into the next set of perforations 25 of the advancing filmstrip 24.

Engagement of the moving filmstrip 24 with the metering hook 112 is sufficient to overcome the biasing force of the spring 118, causing subsequent movement of the metering pawl member 110 in direction 123, FIG. 19, toward the film cartridge chamber 16. The filmstrip 24, FIG. 5, and the metering pawl member 110 are each pulled a relatively short distance as the locking pin 105 of the demetering lever 106 slides along the raised cam feature 115 until the locking pin has slid to the end of the raised cam feature, dropping the locking pin to a lowered position under the biasing force of the sheet metal demetering spring 108, FIG. 12, and into a locked position with the slotted portion 114 of the metering pawl member 110.

When the locking pin 105 of the demetering lever 106 drops into the slotted portion 114 of the metering pawl member 110, the filmstrip 24, FIG. 5, has been metered.

Referring now to FIG. 20, the dropping of the locking pin 105 into the slotted portion 114 of the metering pawl member 110 causes a reversal of the chain of events previously described; that is, the demetering lever 106 is caused to rotate counterclockwise, per arrow 127, under the biasing force supplied by the demetering spring 108, FIG. 12, having sufficient force to rotate the articulating end portion 104, FIG. 12, against the elongate portion 85, causing a clockwise rotation of the metering release lever 76, in direction 133. As is evident from the FIGS., the engagement arm 40 of the pump cover 30 is no longer in contact with the spring arm 96 and is preferably tapered so as to have a reduced width to insure the pump cover 30 is not in active engagement with the metering release lever 76 or the high energy lever 90 when the pump cover 30 has been closed beyond a predetermined position.

Therefore, the spring arm 96, FIG. 5, is also no longer in engagement with the metering release element 76 since there is no inward bearing force against the contact portion 97, making the respective movements of the high energy lever and the metering release element separate and independent.

Referring to FIGS. 13 and 20, the preceding chain of events also causes the bottom surface of the metering release element 76 to drop from the rest surface 82, allowing the lower surface of the slotted portion 83 to drop into contact therewith, thereby dropping the lower portion 56 of the trigger 50 and pivoting the upper portion 54, FIG. 20, to an original raised position, shown by arrows 129, 131, FIG. 20.

Referring to FIGS. 7(c) and 20, as the upper portion 54 of the trigger 50 returns to its raised position, the two engagement teeth 72 of the spline drive 70 are pulled out of active engagement with the cartridge drive 60. Therefore, despite the fact that the drive gear 66 remains engaged with the idler gear 38 and the teeth of the gear rack 36, as shown in FIG. 6, there is no winding force supplied to the filmstrip or the film spool. Therefore, the filmstrip 24, FIG. 5, is no longer being wound into the film cartridge as the pump cover 30 continues translation in the closing direction. The shutter release button 52, though moved to the undepressed position, is still sufficiently recessed relative to the top surface of the pump cover 30 to allow opening and closing of the cover relative to the camera frame 12 without interference.

In summary, the pump cover 30 remains free to continue movement in the closing direction, arrow 89, as the filmstrip 24 is now metered, the cartridge gear drive is disengaged, and the upper portion 54 of the trigger 50 has been restored to the raised position. All of the demetering and metering of the filmstrip 24, FIG. 5, takes place during the closing stroke of the pump cover 30. The pump cover 30 is also movable to the fully open position, FIG. 2, by pulling the pump cover away from the centerline of the camera 10. Repeated opening and closing of the pump cover 30, is also permitted without disengagement or damage to the camera 10 until the shutter release button 52 is depressed, restarting the film transport system in the identical manner described above.

It should be appreciated that alternate configurations can be imagined which allow the metering release element and the high energy lever to pivot in the manner described in order to produce a similar chain of events. Two such configurations are herein detailed with reference to FIGS. 50–54 and 55–57. For purposes of the discussion which follow, similar parts are labeled with the same reference numerals for the sake of clarity.

Referring first to FIGS. 50–54, the pump cover 30 can include an inwardly depending arm 143 having a contoured surface 145 for contacting a modified, but still cantilevered spring arm 139 having a contact section 141 without a groove which allows simultaneous rotation of the metering release element 76 and the high energy lever 90.

Figure 52:
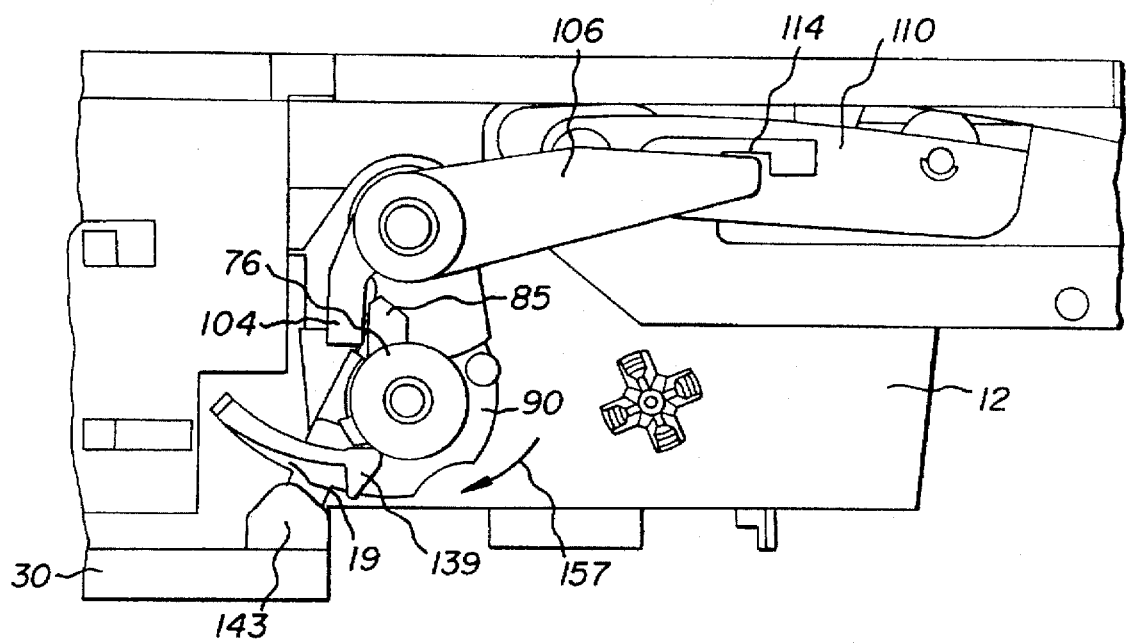
FIG. 52 is the partial top view of the camera shown in FIG. 51 after the high energy lever has been released.

As in the first embodiment, the firing of the high energy lever 90 in the direction 157, FIG. 52, aligns the contact portion 141 of the spring arm 139 with the inwardly projecting portion 143 of the pump cover 30 for contact therewith.

Figure 50:
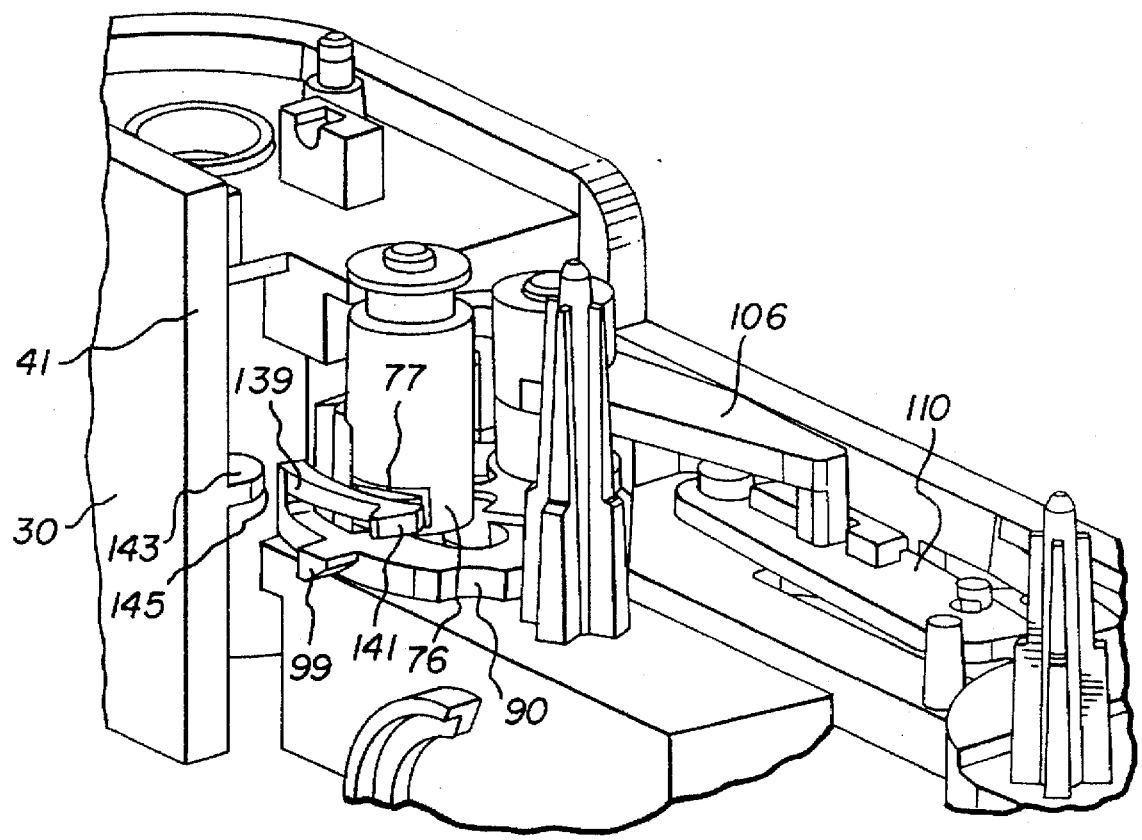
FIG. 50 is a partial front perspective view of a camera similar to the first embodiment of FIGS. 1–20, with a pump cover having a different configuration for engaging and rotating the metering release lever and the high energy lever.
Figure 51:
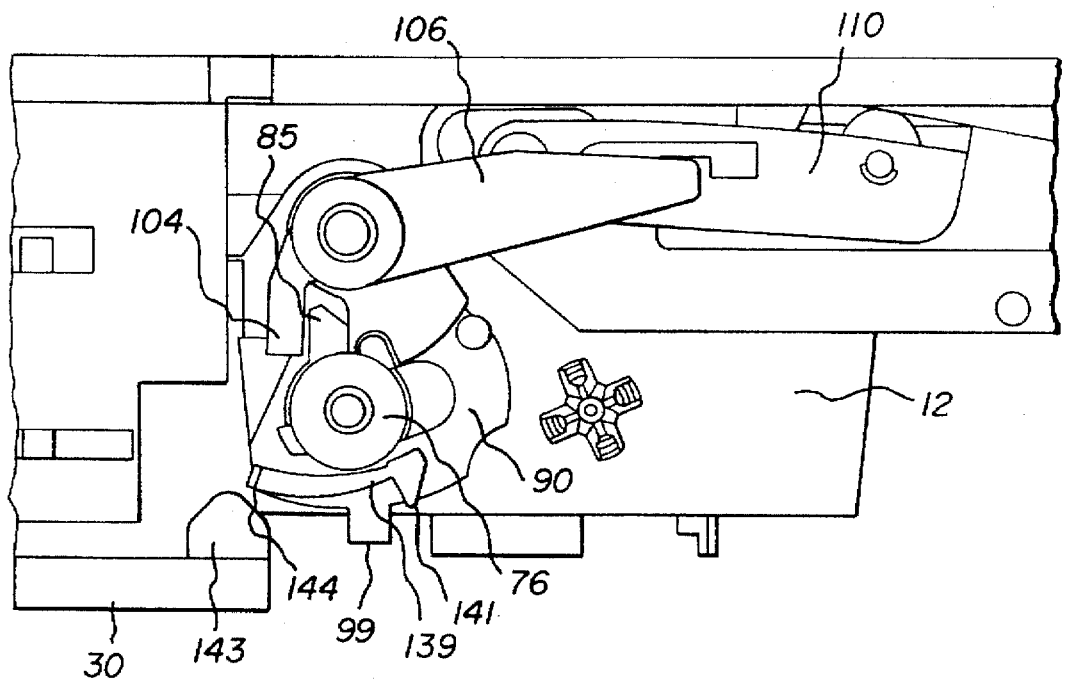
FIG. 51 is a partial top view of the camera shown in FIG. 50.

Similarly, the firing of the lever 90 causes the shutter blade contacting portion 99, FIG. 50, to momentarily strike the shutter blade 120, FIG. 1, as described above, placing the high energy lever in the released position beneath the raised metering release element as shown in FIG. 52, the frame portion 12 having a slot 19 sized for accommodating the spring arm 139.

Figure 53:
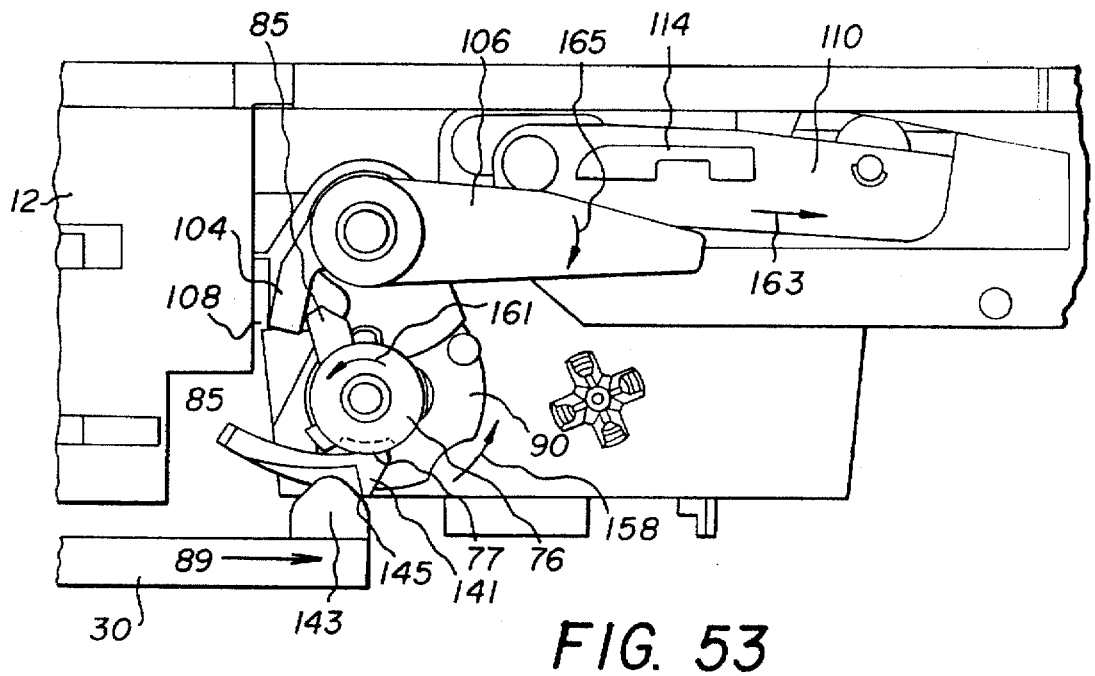
FIG. 53 is the partial top view of FIGS. 51 and 52 depicting the engagement of a contacting arm with the spring arm of the high energy lever.

Referring to FIG. 53, as the pump cover 30 is translated in the closing direction 89, the raised metering release element 76 rotates in the direction 161 as the inwardly protruding arm 143 bears against the contact portion 141 of the spring arm 139, rotating the high energy lever 90 in the direction 158, in a manner similarly described above. The rotation of the metering release element 76 causes the elongate portion 85 to bear against the end protrusion 104 of the demetering lever 106, causing a clockwise pivot in the direction 165, and unlocking the metering pawl member 110, which is spring-biased to move in the direction 163, after the filmstrip 24, FIG. 5, has disengaged from the metering pawl, as described above.

Figure 54:
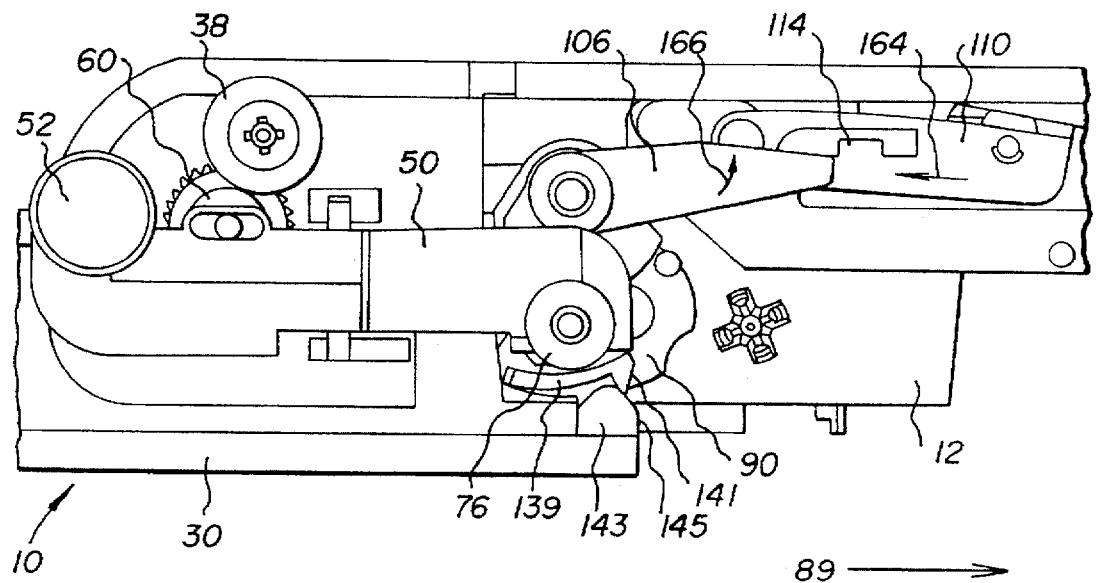
FIG. 54 is the partial top view of FIG. 53 depicting the cocking of the high energy lever and the rotation of the metering release lever as the pump cover is closed.

Referring to FIG. 54, and also in a manner previously described, continued translation of the pump cover 30 in the closing direction 89, provides drive engagement between the gear rack (not shown), the idler gear 38, and the cartridge drive 60, whereby the metering pawl member 110 moves, arrow 164, with the advancing filmstrip 24, FIG. 5, until the demetering lever is biased back, arrow 166, into the slotted portion 114.

Figure 55:
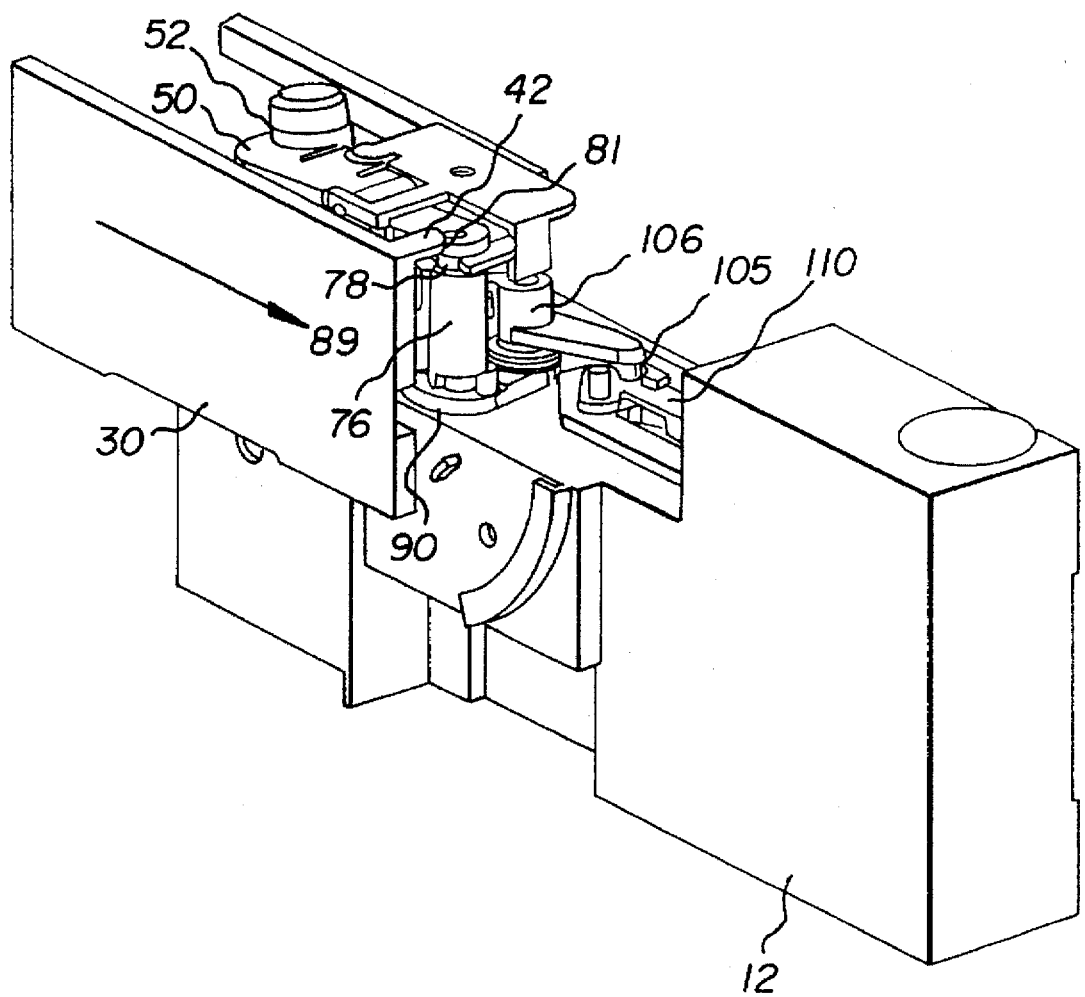
FIG. 55 is a partial front perspective view of a camera according to the first embodiment of FIGS. 1–20, illustrating another alternate configuration of the pump cover, metering release lever, and high energy lever.
Figure 56:
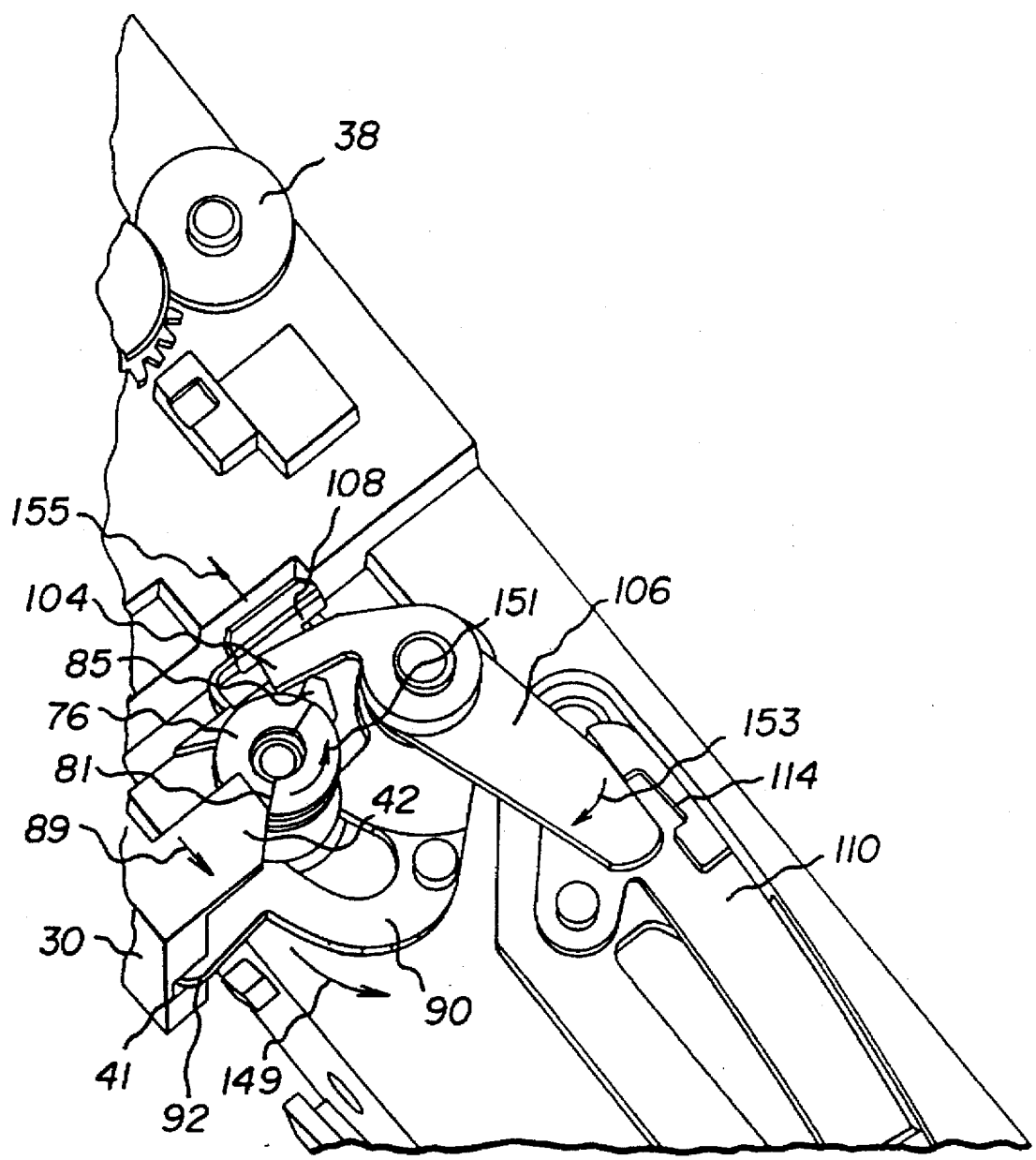
FIG. 56 is a partial top perspective view of the camera of FIG. 55 showing the engagement of the pump cover with the metering release lever and the high energy lever.
Figure 57:
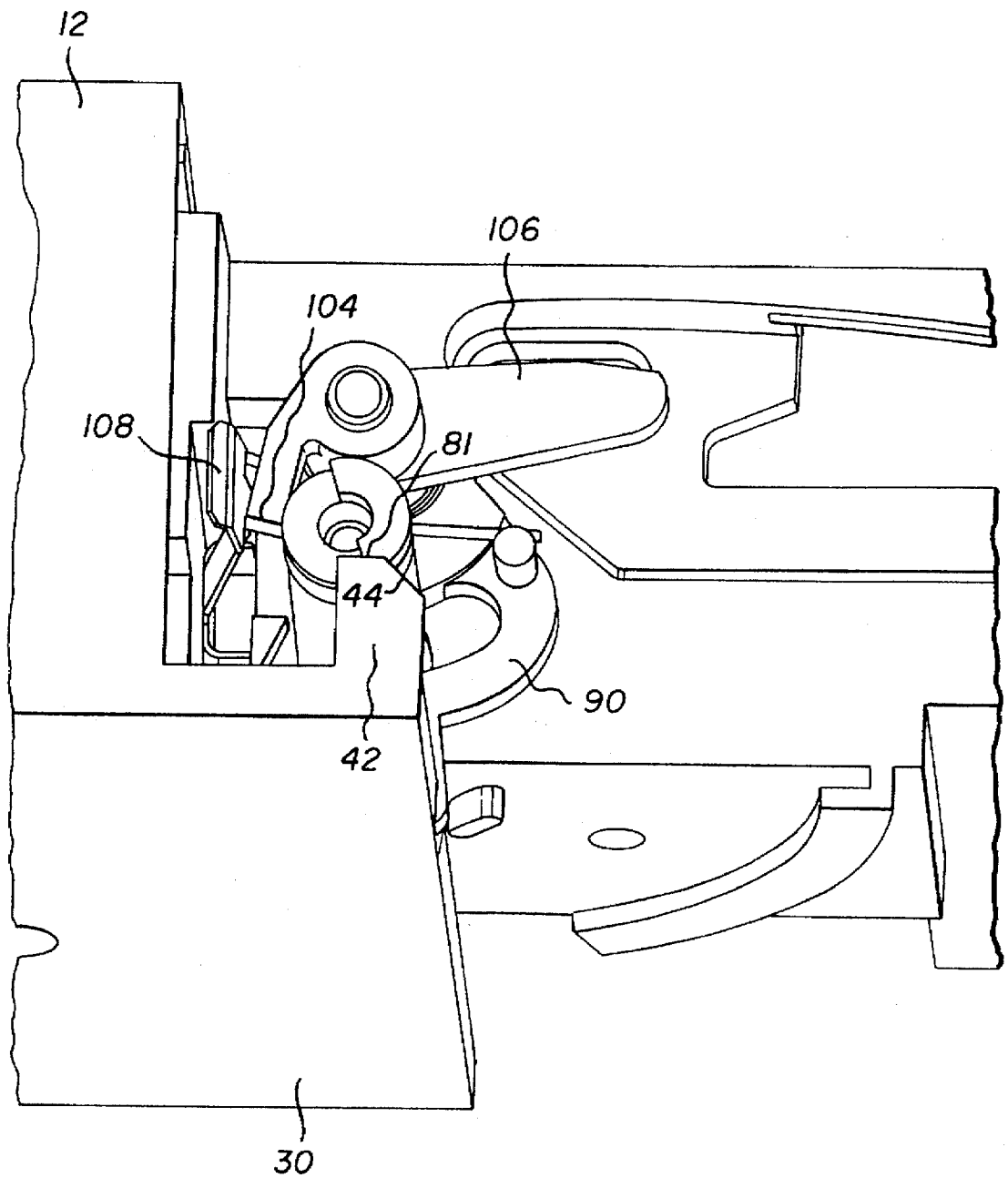
FIG. 57 is an enhanced partial front perspective view of the camera of FIGS. 55 and 56 showing the engagement of the pump cover with the metering release element.

Referring now to the second example shown in FIGS. 55–57, the metering release element 76 and the high energy lever 90 can be independently pivoted by the pump cover 30. According to this example, an inwardly protruding portion 42 is located adjacent the top of the pump cover 30 in lieu of either the tapered engagement arm 40 and the inwardly projecting portion 143. It should be readily apparent that the location of the protruding portion can be varied. The portion 42 includes a ramped contact surface 44, FIG. 57, which is configured to engage the top of the metering release element 76 when the element is raised by the trigger 50, as shown only in FIG. 50. The top of the metering release element 76 includes a corresponding top contact surface 81 in the form of a raised semi-circular ring for contacting the contact surface 44 of the portion 42. The edge of the pump cover 30 is aligned with an elongate portion 92 of the high energy lever 90 to separately pivot the high energy lever as the pump cover is closed, and after the high energy lever has fired.

In operation, and referring to FIGS. 56 and 57, the shutter release button 52 of the illustrated camera is depressed, as previously described, and the pump cover 30 is moved in closing direction 89. The inwardly extending portion 42 on the top of the pump cover 30 engages the contact surface 81, causing a counterclockwise rotation of the metering release lever 76 about the frame post 78, FIG. 55, shown by arrow 151. As in the previously described embodiment, as the metering release lever 76 rotates, the elongate section 85 contacts the end protrusion 104 of the demetering lever 106, as most closely seen in FIG. 57, causing a clockwise rotation, shown by arrows 153 and 155 of the demetering lever against the biasing of the spring 108, as well as causing the locking pin 105, FIG. 55, on the underside of the lever to be disengaged from the slotted portion 114 of the metering pawl member 110.

The closing movement of the pump cover 30 additionally causes engagement of an extending portion 92 of the high energy lever 90 with the front edge 41 of the pump cover 30, causing the high energy lever to be rotated against the force of the torsion spring 94 in the direction shown by arrow 149, FIG. 56.

Referring in general to the FIGS., the operation of the film advance system for each of the above examples is identical to that primarily described above wherein the idler gear 38 is brought into engagement with the gear teeth 37 of the linear gear rack 36 to advance the filmstrip 24 from the film supply chamber 14 across the exposure chamber 18 and into the confines of the film cartridge 28, FIG. 30. As the engaged portion of the filmstrip 24 begins to move in a direction away from the film supply chamber 14 toward the film cartridge chamber 16, the metering pawl member 110 is caused to move against the torsion the torsion spring 118 until a pair of cam surfaces 111, 113, FIG. 15 on the metering pawl member and the top surface of the frame portion 12, such as described above, causes disengagement of the filmstrip 24 from the metering hook 112. The metering pawl member 110 is biased by the torsion spring 118, placing the metering hook 112 through the frame slot 15, FIG. 9, and back into the film plane, where the metering hook awaits the next set of perforations 25, FIG. 30.

As should be apparent, if the shutter release button 52 is not depressed, the pump cover 30 will remain translatable relative to the camera frame 12. Because the shutter release button 52 has not been depressed, the metering release element 76 has not been raised and the extending portion 42 of the pump cover 30 will remain above the contact surface 81 or the spring arm feature and will therefore not contact the metering release element 76, keeping the metering pawl member 110 engaged and the high energy lever 90 in the cocked position. The pump cover 30 in the meantime can be freely translated in the opening and closing directions without changing the state of the camera.

Second Embodiment

A second and alternate embodiment of the film advance system according to the present invention is now described with reference to FIGS. 21–41.

Figure 21:
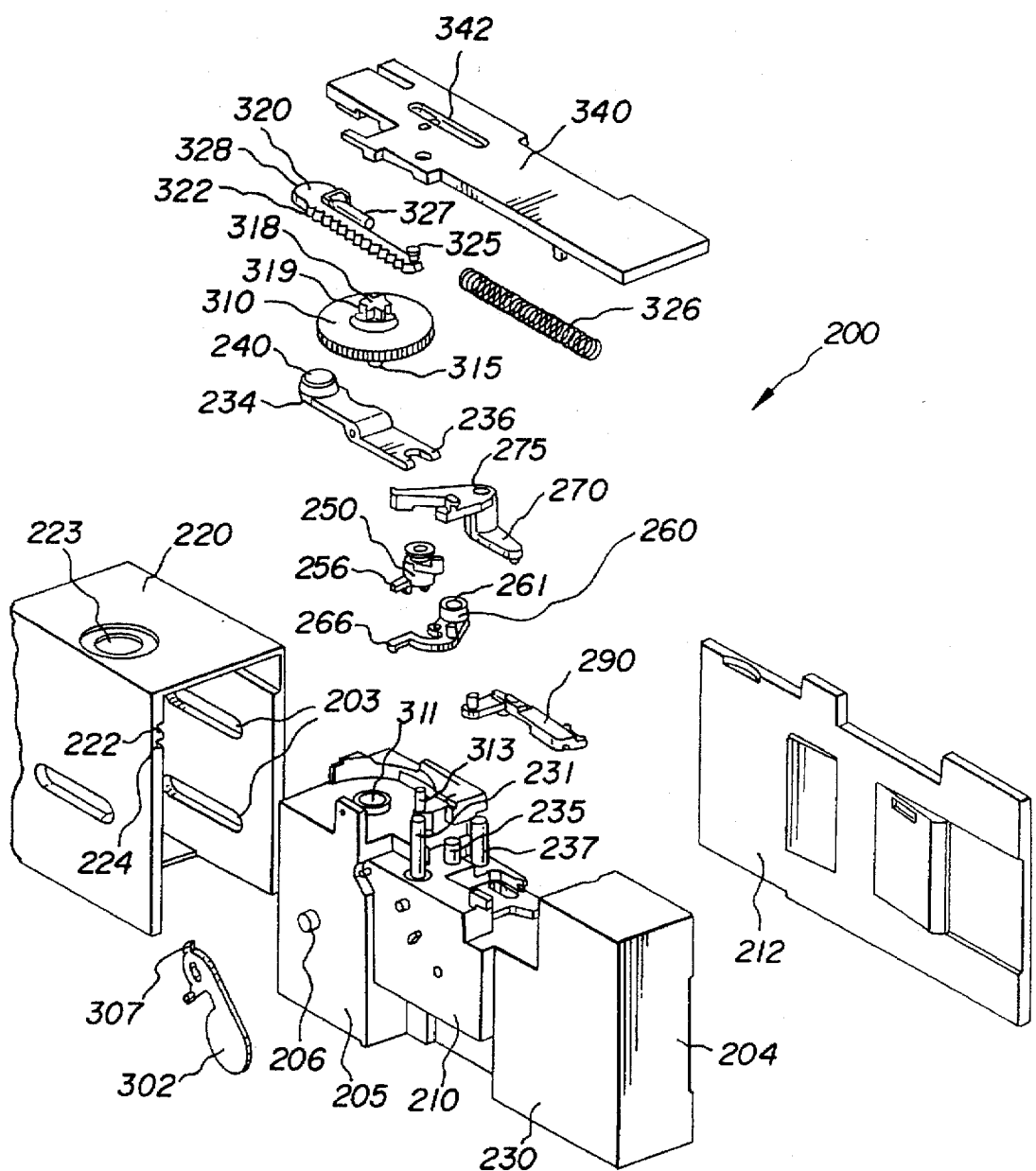
FIG. 21 is an exploded front perspective view of a camera having a film advance system according to a second embodiment of the present invention.

Referring to FIG. 21, there is shown an exploded view of a camera 200 comprising a plastic frame portion 230, having molded-in features for defining a film supply chamber 204 for retaining an unexposed film roll (not shown) and a film cartridge chamber 205 for retaining the film cartridge 28, FIG. 30, which are oppositely situated relative to an exposure chamber 210, as is commonly known.

Figure 22:
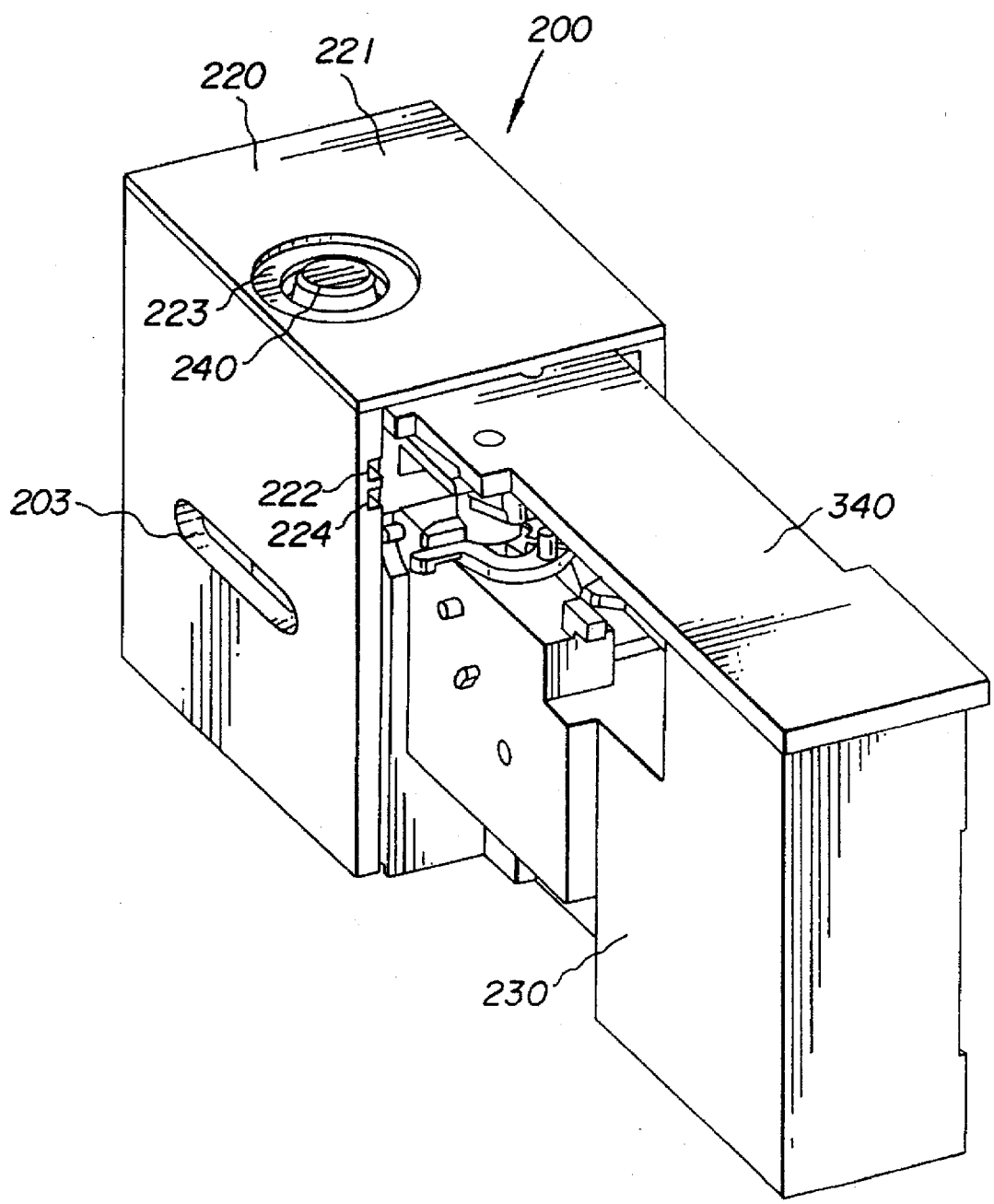
FIG. 22 is a partial top perspective view of the camera of FIG. 21, showing the pump cover in the opened position.

A translatable pump cover 220 is attached to the exterior of the frame portion 230 through a set of slots 203 located in the front and rear of the cover for attachment over a set of correspondingly located over sized pins 206 located on the front and rear of the frame portion 230 to allow the cover to be moved between an opened, FIG. 22, and a closed position, such as shown in FIG. 3 of the preceding embodiment. It should be readily apparent that other suitable mounting assemblies can be utilized for movably attaching the cover 220 to the frame portion 230.

Referring to FIGS. 21 and 22, a top surface 221 of the cover 220 includes an aperture 223 for accessing a shutter release button 240 when the cover is in the opened position, while a pair of interior parallel slots or channels 222, 224 are provided on the front interior of the cover 220 for engaging with film metering and demetering mechanisms, which are described in greater detail below.

A front (not shown) and rear cover 212 lighttightly seal the camera 200 in a manner similar to that previously shown in FIGS. 2 and 3. Details relating to the function and fitting of the covers to the frame portion are commonly known in the field and do not form a part of the present invention.

The camera frame portion 230 is illustrated with a number of the major components of the film advance system assembled thereto.

Figure 23:
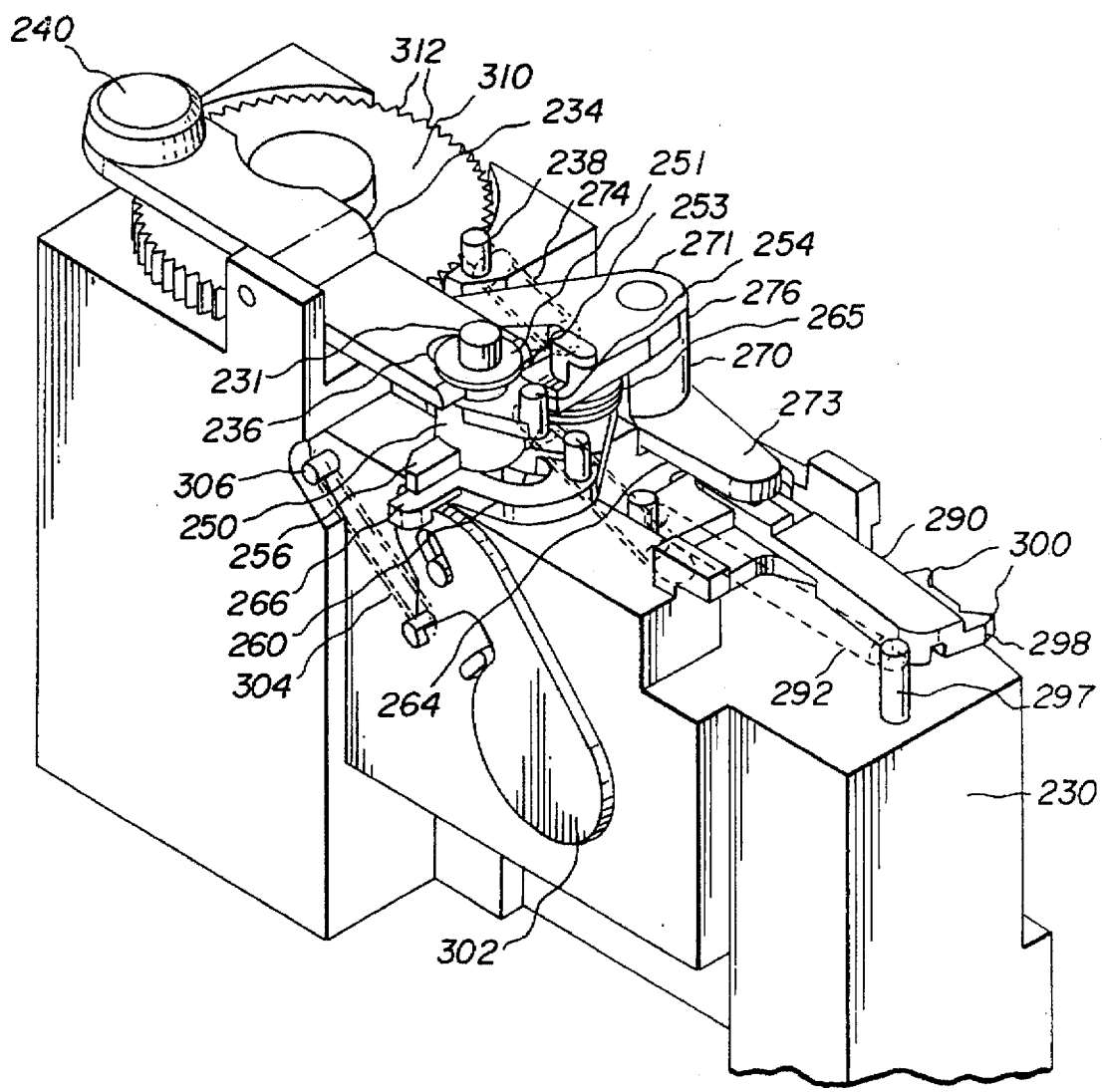
FIG. 23 is a partially assembled front perspective view of the frame portion of the camera shown in FIG. 21 and 22.
Figure 25:
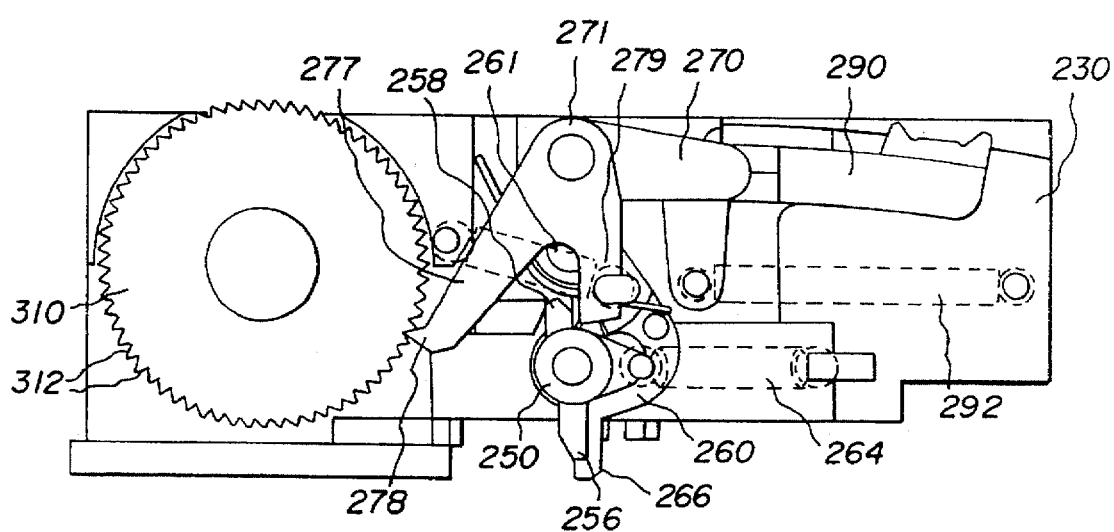
FIG. 25 is a top view of the camera of FIG. 24.

Referring to FIGS. 21, 23 and 25, a cylindrical metering release element 250 having a hollowed center is attached to the frame portion 230 through an appropriately sized post 231 and includes a pair of oppositely disposed elongate sections 256, 258 extending from the periphery. A supporting top section 251 includes a recess 253 for engaging a slotted end 236 of a pivotable trigger 234. The trigger is not shown in FIG. 25 in order to show clarity of other aspects of the invention. The metering release element 250 is spring biased in a first rotational position by an extension spring 264, shown in phantom, having one end attached to the frame 230 and the remaining end attached to a top post 254 of the element. In the first rotational position, the elongate portion 256 extends from the front of the frame portion 230 for contact by the translatable pump cover 220 as described below.

Referring to FIGS. 21 and 23, the trigger 234 is similar to that described in the preceding embodiment, and includes the depressible shutter release button 240 at one end and the slotted remaining end 236. The trigger 234 is pivotally mounted by pin 239 inserted through a hole located in the top of the frame portion 230.

Referring to FIGS. 21, 23 and 25, a high energy lever 260 is adjacently attached to a separate frame post 235 through a mounting aperture 261 and is biased in a cocked or loaded position by a torsion spring 265. The lever 260 includes an extending arm portion 266, which like the elongate portion 256, extends from the front of the frame portion 230 when the lever is in the cocked position.

The presence of the metering release element 250 prevents the high energy lever 260 from moving from the cocked position to a fired position, as best shown in FIG. 23, until after the shutter release button 240 has been depressed and the metering release element 250 has been raised by the pivoting action of the trigger 234.

Still referring to FIGS. 21, 23 and 25, a demetering lever 270 having an upper portion 271, a mounting portion 276, and a lower portion 273 is mounted to an adjacent post 237, shown only in FIG. 21, on the top of the frame portion 230 through a mounting aperture 275. The lower portion 273 includes a bottom extending locking pin 272, FIG. 26, for engaging a slotted portion 294, FIG. 26 of a metering pawl member 290. The upper portion 271 bifurcates from the mounting portion 276 by a pair of depending arms 277, 279, most clearly shown in FIG. 23. The demetering lever 270 is biased to an initial rotational position by a spring 274, shown in phantom in FIG. 23, having one end attached to a frame post 238, and the remaining end to a post located on a top surface of the arm 279. The depending arm 277 includes a locking portion 278 at its end which engages the periphery of a film advance gear 310.

Referring now to FIGS. 21, 23, 26, and 30, the metering pawl member 290 is attached to the top of the frame portion 230 beneath the lower portion 273 of the demetering lever 270, and includes an extending outboard section 283 having a post which engages an end of an extension spring 292, shown in phantom in FIG. 23, the other end of the spring being attached to a separate post 297 of the frame portion 230. The spring 292 is not shown in FIGS. 26 and 30 for the sake of clarity. The slotted portion 294 extends from the top of the lever 290 for accommodating the locking pin 272 of the demetering lever 270 when the metering pawl member 290 is initially biased in a first position by the spring 292. A metering hook 298 having a pair of pawl-like extensions 300 extends from the lever body 293 into the film plane of the camera 200 through a slot 215, FIG. 26, in the frame portion 230 for engaging frame-defining perforations 25 of a filmstrip 24, as shown in FIG. 30.

Referring to FIGS. 21 and 23, a shutter blade 302, including an engagement end 307, is attached to the front of the frame portion 230 and is biased by a spring 304, shown in phantom in FIG. 23, attached at one end to a frame post 306 in a position which covers a front opening (not shown), so that when contacted by the extending arm portion 266 of the high energy lever 260, the shutter blade momentarily allows light to pass through the front opening and into the exposure chamber 210, as is readily known in the field.

Referring to FIGS. 21, 23, and 25, a film advance or drive gear 310 having a set of peripheral gear teeth 312 is centrally mounted at the hub of a cartridge drive element 315, shown partially in FIG. 21, which when assembled to the frame portion 230 extends through an opening 311 into the film cartridge chamber cavity to engage the film spool (not shown) of the film cartridge 28, FIG. 30, in a known manner. As previously noted, the film cartridge 28 can be any conventional 35 mm film magazine having an engageable spool end which allows film to be wound into the confines of the magazine, or a thrusting-type film cartridge, such as those described by U.S. Pat. Nos. 4,948,063, 5,031,853, and 5,248,108, the contents of which are herein incorporated by reference. The gear teeth 312 are initially engaged by the locking portion 278 of the demetering lever 270, which is fitted between a pair of the circumferential gear teeth, as best shown in FIG. 25.

When the locking portion 278 is released, in the manner described below, the film advance gear 310 is permitted to rotate to advance the filmstrip 24, FIG. 30, between the film supply chamber 204, FIG. 21, and the film cartridge chamber 208, FIG. 21, as described below. A pinion gear 318 is mounted to the top of the film advance gear 310 through a pin (not shown) which supports the gear for rotation and causes corresponding rotation of the film advance gear. The pinion gear 318, which includes a set of peripheral gear engagement teeth 319, is not shown in FIGS. 23 and 25 for clarity.

Figure 24:
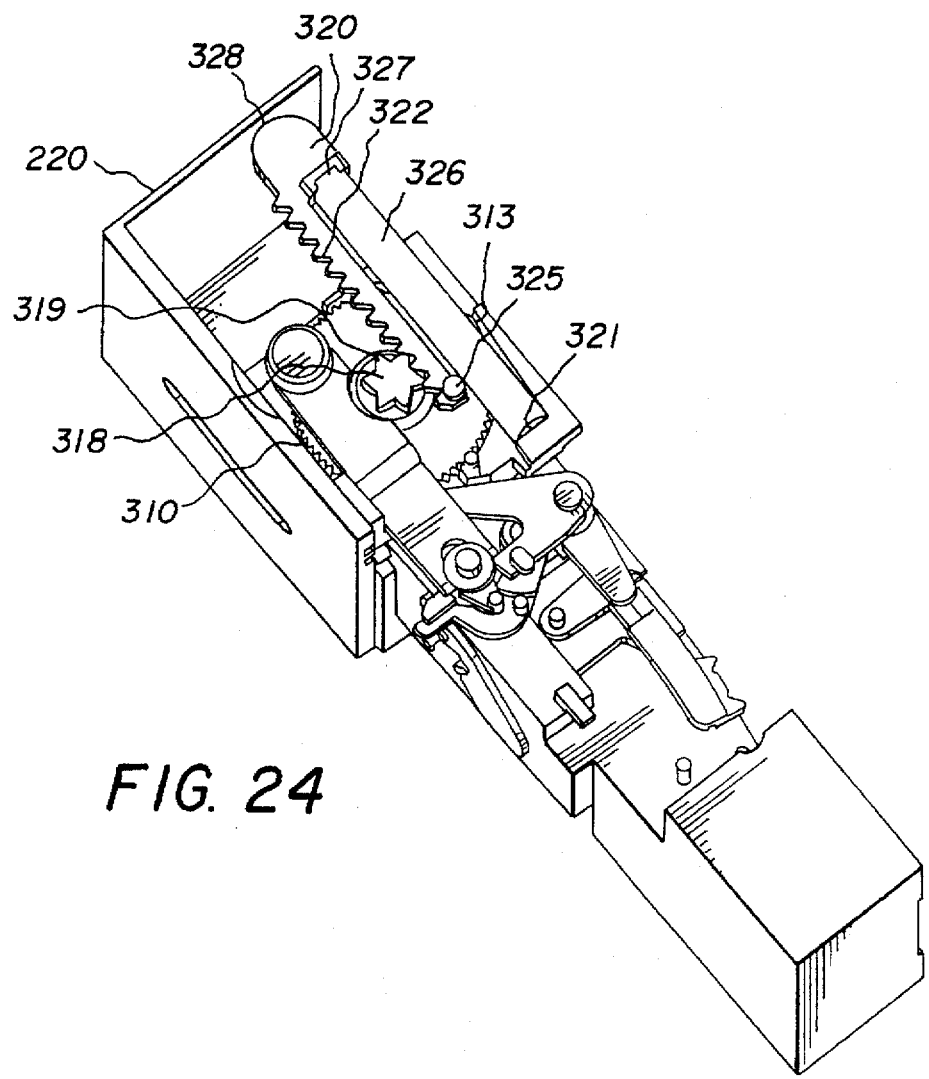
FIG. 24 is a top perspective view of the camera film advance mechanism prior to depression of the shutter release button.

Referring to FIGS. 21 and 24, a movable gear rack 320 is attached within a recessed region 313 on the top of the frame portion 230 above the film cartridge chamber 205, the rack including a set of linearly arranged engagement teeth 322 for engaging the gear teeth 319 of the pinion gear 318. A compression spring 326 is attached at one end to a support 327 extending from the rack 320 and at the other end is biased into a sidewall 321 of the recessed region 313. The opposing side of the gear rack 320 from the sidewall 321 of the recessed region includes a curved end 328 which extends from the end of the frame portion 230 and is engageable with a sidewall of the pump cover 220.

A keeper plate 340 is positioned at the top of the frame portion 230 to retain the above components and to guide the gear rack 320 by means of a slot 342 which is sized for retaining a guide pin 325 protruding from the top of the gear rack 320.

Operation of Second Embodiment

Referring to the FIGS. 21–40, and in operation, a film cartridge 28, FIG. 30, is loaded into the film cartridge chamber 205 of the camera frame portion 230 and an unexposed film roll (not shown) is loaded into the film supply chamber 204. The end of the filmstrip outermost on the unexposed film roll is brought across the frame 230 to the spool (not shown) of the cartridge 28 and attached by means not shown, but conventionally known.

The pump cover 220 is initially positioned in a fully opened position relative to the camera frame portion 230, with the shutter release button 240 being visible through the top aperture 223, as shown in FIG. 22.

Figure 26:
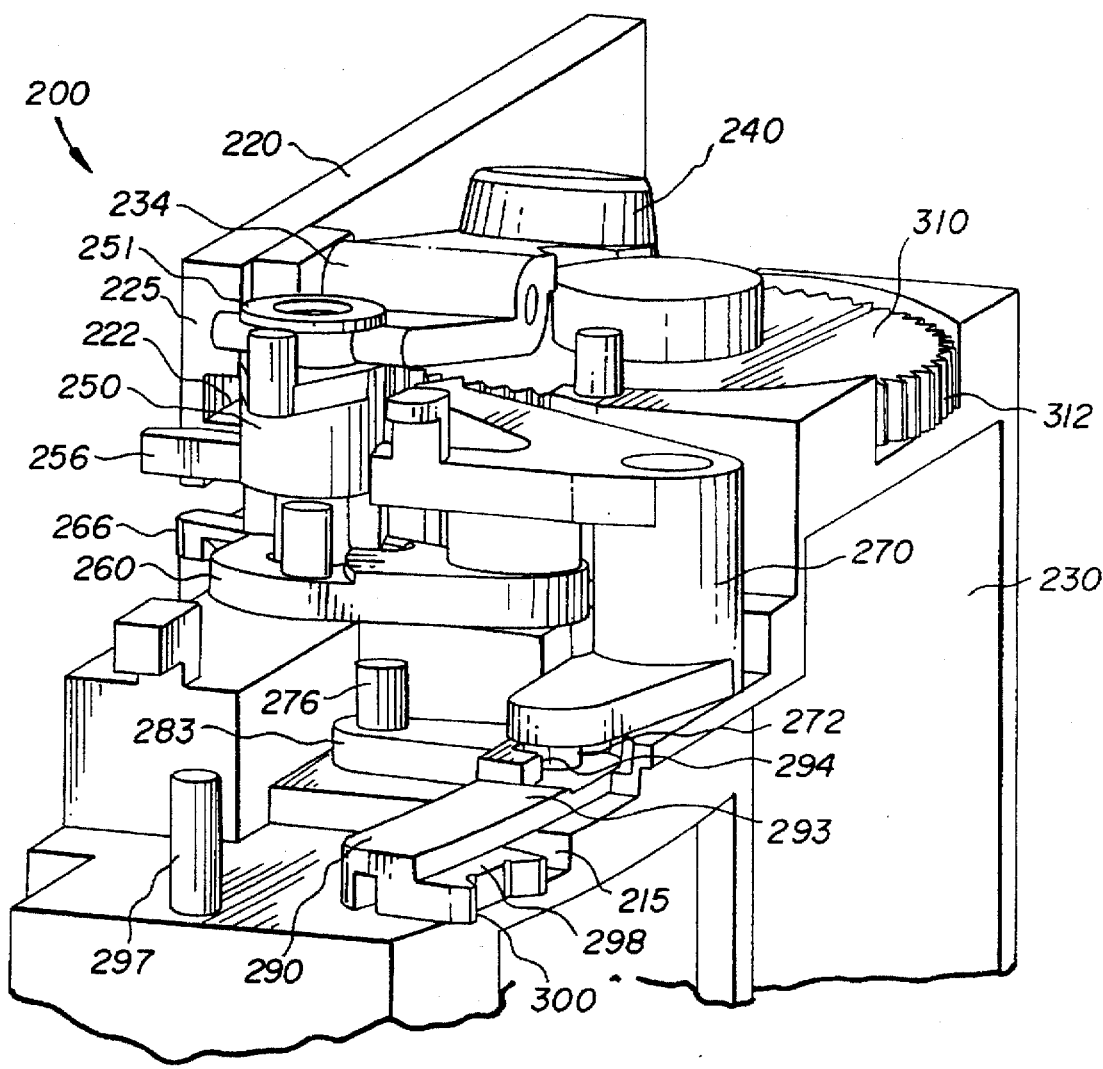
FIG. 26 is a partial rear perspective view of the camera of FIG. 25, showing the alignment of the pump cover with the elongating arms of the high energy lever and the metering release element.

Referring specifically now to the partial views of the camera 200 depicted in FIG. 26, and as the shutter release button 240 is depressed, the trigger 234 is pivoted such that the slotted end 236, FIG. 21, bears against the underside of the supporting portion 251, FIG. 21, thereby lifting the metering release element 250 sufficiently to allow release of the high energy lever 260 under the biasing force of the spring 264, whereby the extending arm portion 266 of the lever momentarily strikes the engagement end 307, FIG. 21, of the shutter blade 302, FIG. 21, in a manner commonly known. In the meantime, the extending elongate portion 256 of the metering release element 250 remains aligned with the upper channel 222 of the pump cover 220 when raised by the trigger 234.

Figure 27:
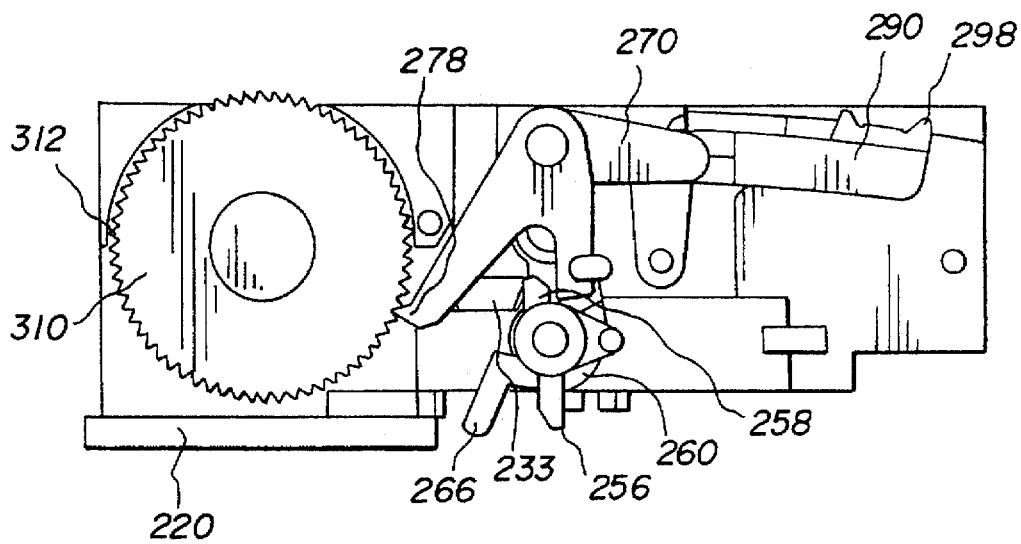
FIG. 27 is a top view of the camera of FIG. 26.

The high energy lever 260 is now in the position shown most clearly in FIG. 27, with the front extending arm portion 266 also aligned with the path of the pump cover 220, which is partially shown. All of the remaining components of the film advance system are unaffected by the preceding events; that is, the demetering lever 270 is still engaged with the film advance gear 310 and the metering pawl member 290, respectively. For clarity, portions of the described camera 200 are not shown in FIGS. 23, 25–27, 29, 31–34, 39, and 41, including the gear rack 320 and the keeper plate 340.

Figure 28:
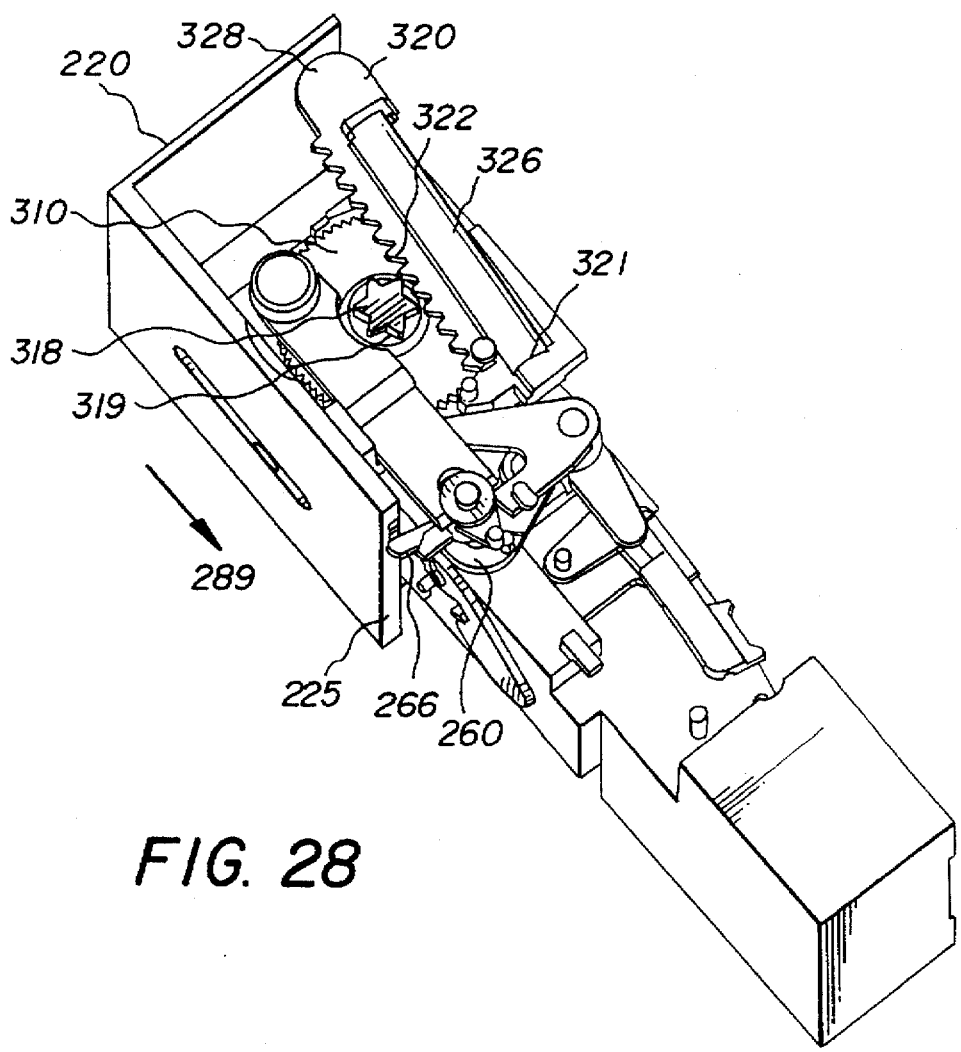
FIG. 28 is a top perspective view of the camera of FIG. 24, showing engagement of the pump cover with the high energy lever, and the initial loading of the gear rack.

Referring to FIG. 28, the pump cover 220 is then translated in the closing direction, shown by arrow 289, wherein the curved end 328 of the gear rack 320 is engaged by the interior of the sidewall of the cover. The displacement of the gear rack 320 causes the spring 326 to compress against the interior sidewall 321 of the recessed region 313 of the frame portion 230, while the engagement teeth 322 of the rack 320 contact but slide over the gear teeth 319 of the pinion gear 318 which is not permitted to move due to the locked engagement between the locking portion 278, FIG. 25, and the film advance gear 310.

Figure 29:
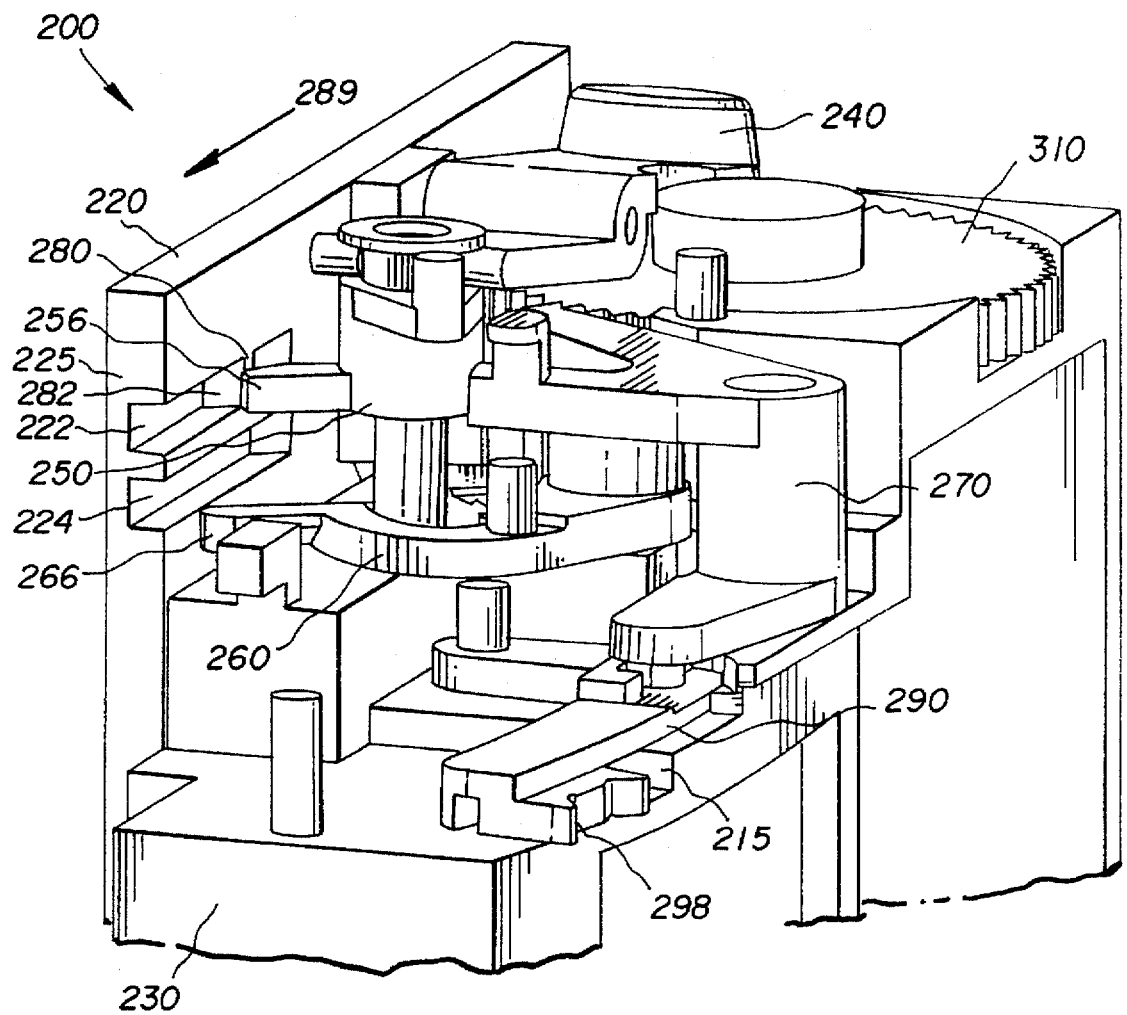
FIG. 29 is the rear perspective view of FIG. 26 showing the engagement of the pump cover with the elongate portion of the metering release element.

As the pump cover 220 continues to be translated in the closing direction, arrow 289, the leading edge 225 of the cover first contacts the extending arm portion 266 of the high energy lever 260, causing a counterclockwise rotation of the lever beneath the raised metering release element 250 and against the force of the torsion spring 265, FIG. 23. Referring to FIG. 29, and at the same time, the elongate portion 256 enters the upper channel 222, allowing the metering release element 250 to remain supported in the raised position, the channel being sized to accommodate the elongate portion without rotating the metering release element.

Figure 31:
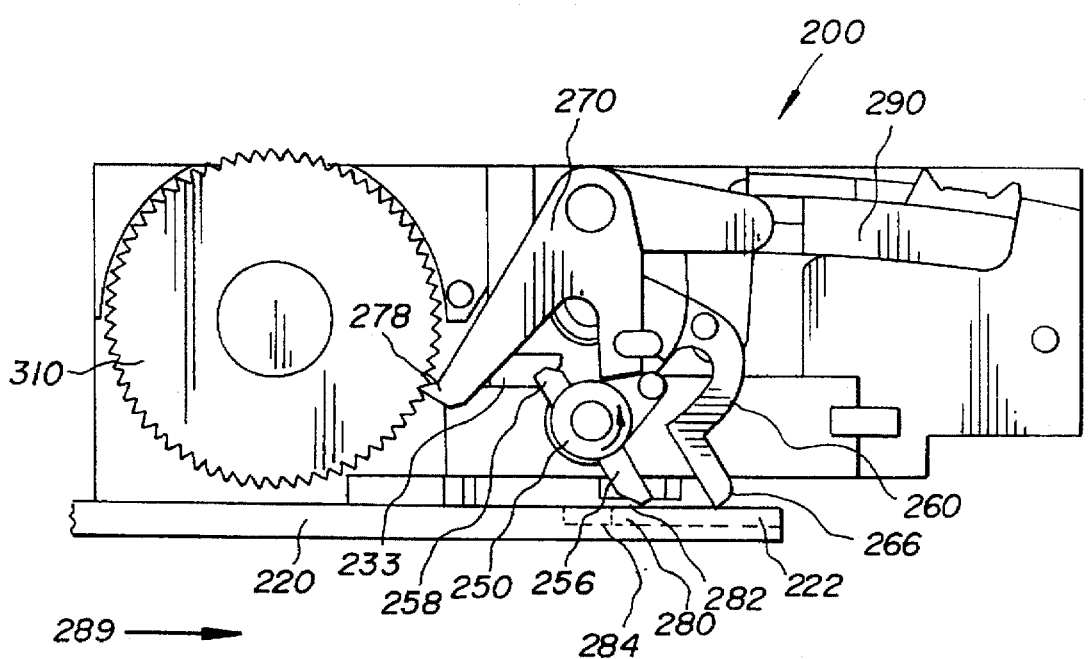
FIG. 31 is the top view of FIG. 27, showing the displacement of the metering release element when engaged by a rib member of the pump cover.

Referring to FIGS. 29–31, the upper channel 222 includes an integral rib 280 having a ramped front surface 282 and a rear edge 284, shown in phantom in FIG. 31. As the pump cover 220 continues to translate in the closing direction 289, toward the center of the camera 200, the ramped front surface 282 of the rib 280 engages the extending front elongate portion 256, causing a counterclockwise rotation of the metering release element 250, shown in FIG. 31 by arrow 281.

In the meantime, the high energy lever 260 has already been fully pivoted to the cocked position and has been moved out entirely from under the metering release element 250 by the translation of the pump cover 220, as shown most clearly in FIG. 31. The presence of the pump cover 220, however, retains the high energy lever 260 in a cocked position. Furthermore, and as shown in the top view of FIG. 31, a raised shelf 233 extending from the top of the camera frame portion 230 supports the oppositely extending elongate portion 258, preventing the metering release lever 250 from prematurely dropping into the lower channel 224 until the filmstrip 24, FIG. 30, has been metered.

Figure 32:
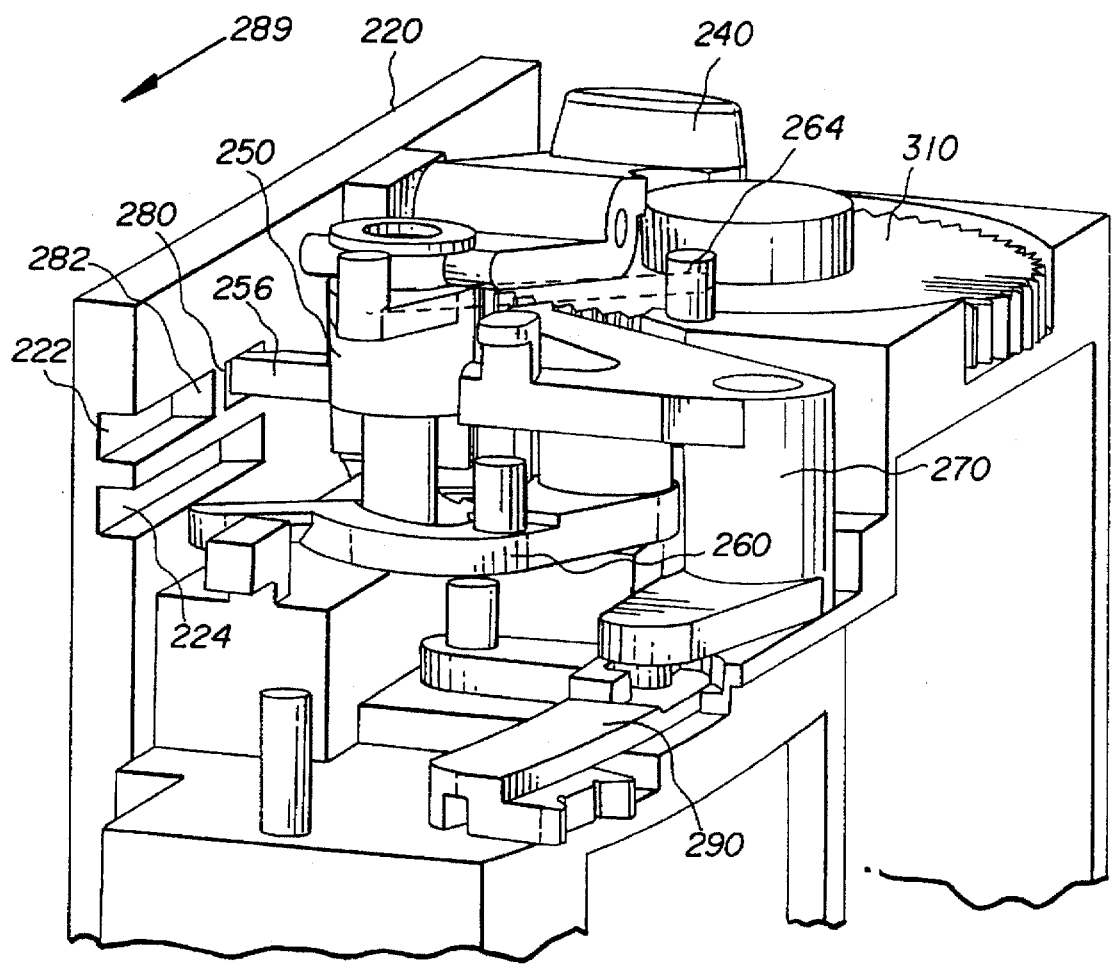
FIG. 32 is the rear perspective view of FIG. 29, showing the completion of the pump closing stroke.

Referring to FIG. 32, and as the pump cover 220 continues to be translated in the closing direction, arrow 289, the elongate portion 256 of the metering release element 250 is caused to reenter the upper channel 222 of the cover due to the biasing force supplied by the spring 264, shown in phantom, thereby keeping the metering release element in a raised position and allowing the pump cover to reach the end of the closing stroke, as dictated by the length of the cover slots 203, as well as the slot 342 of the keeper plate 340, each shown in FIG. 21. Referring to FIG. 30, and at the end of the closing stroke, the spring 326 is fully loaded against the sidewall 321, FIG. 28, of the recessed portion 313, FIG. 28. As previously noted, the gear rack 320 is not shown in FIG. 32 for the sake of clarity.

Figure 33:
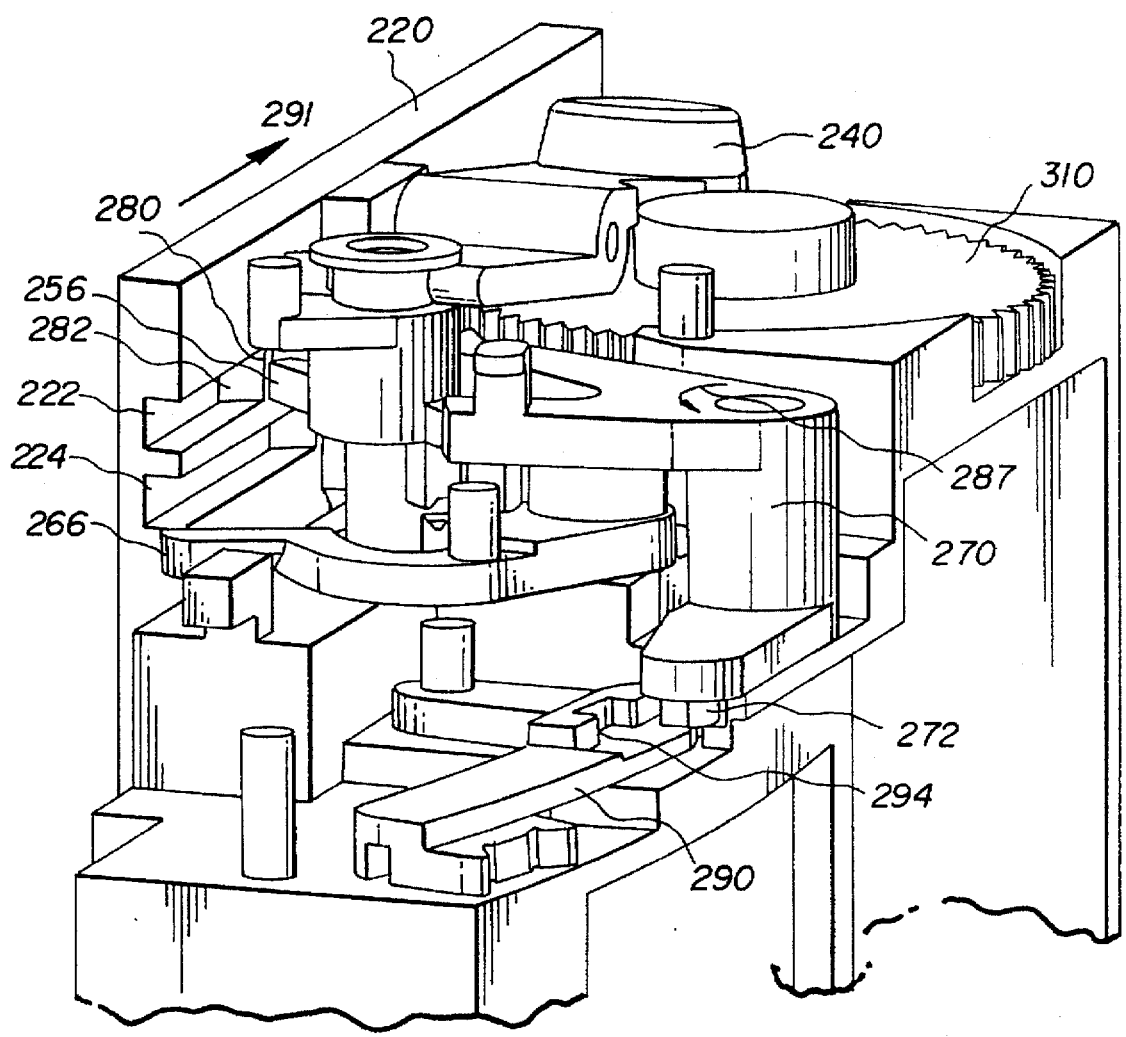
FIG. 33 is the rear perspective view of FIG. 32, as the pump cover initiates a translation in the opening direction.
Figure 34:
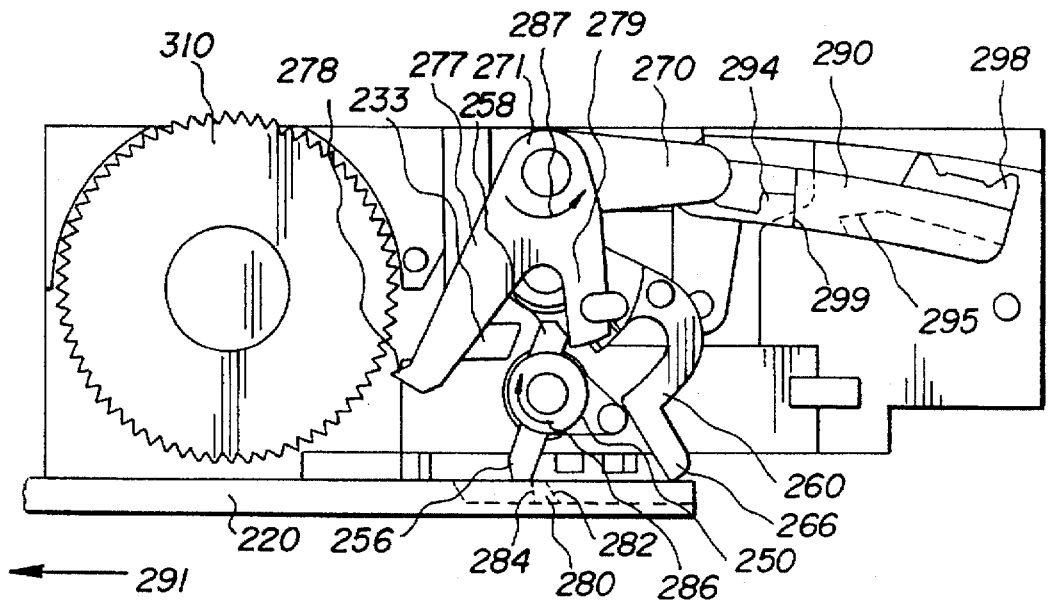
FIG. 34 is the partial top view of FIG. 33.

Referring now to FIGS. 33–41, and by reversing the translation direction, shown as arrow 291, the pump cover 220 can be moved back to the opened position, producing the following sequence of events:

First, and referring specifically to FIGS. 33 and 34, the extending elongate portion 256 contacts the back edge 284 of the rib 280 in the upper channel 222 of the pump cover 220, causing the metering release element 250 to rotate in direction 286, FIG. 34, and causing contact between the opposing elongate portion 258 and an edge of the metering arm 279 of the demetering lever 270. A corresponding counterclockwise rotation, arrow 287, of the lever 270 rersult, causing the locking portions 278, 272 to be moved out of engagement with the film advance gear 310 and the slotted portion 294 of the spring-biased metering pawl member 290, respectively.

As evident from FIG. 36, disengagement of the locking portion 278 from the film advance gear 310 allows the filmstrip 24 to be advanced from the film supply chamber 204 to the film cartridge 28 contained in the film cartridge chamber 205 by the opening movement of the pump cover 220 as follows.

Figure 35:
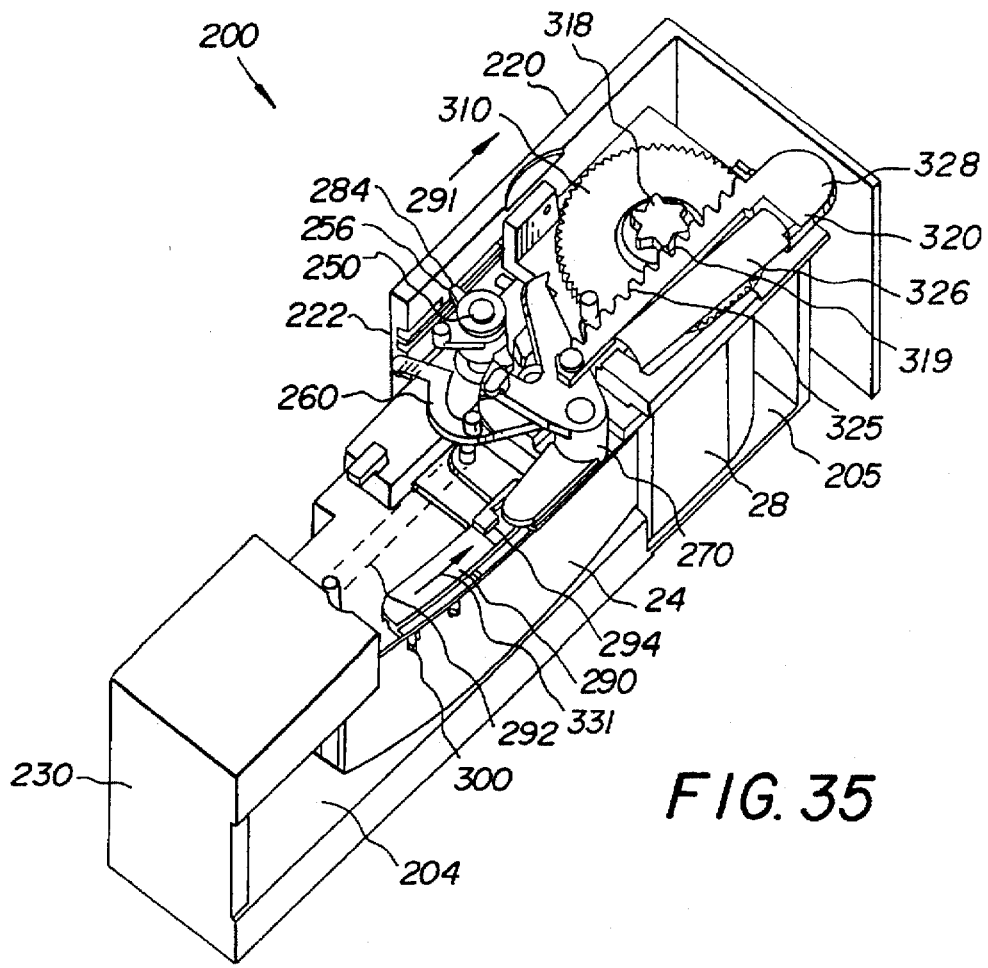
FIG. 35 is a top perspective view of the rear of the camera of FIGS. 21–34, showing the initiation of the pump cover opening sequence and the release of the film release gear to allow advancing of a filmstrip.
Figure 36:
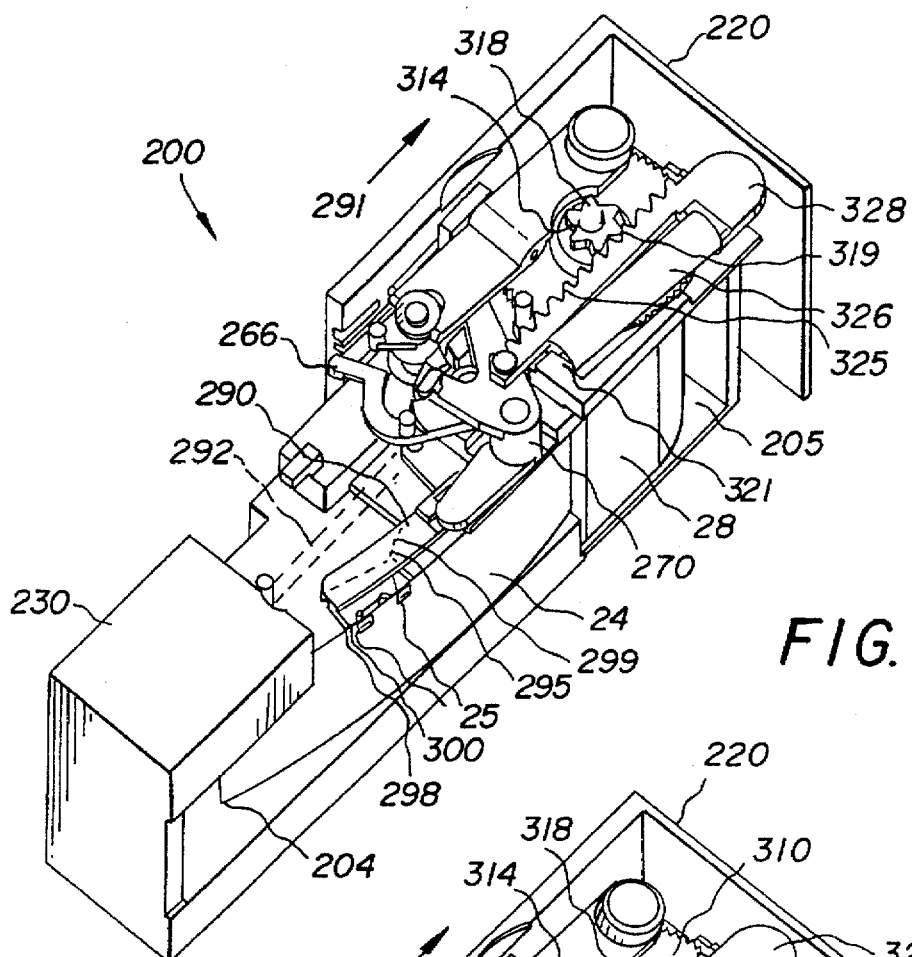
FIG. 36 is the top perspective view of FIG. 35, showing the metering pawl being cammed out of engagement with the filmstrip.
Figure 37:
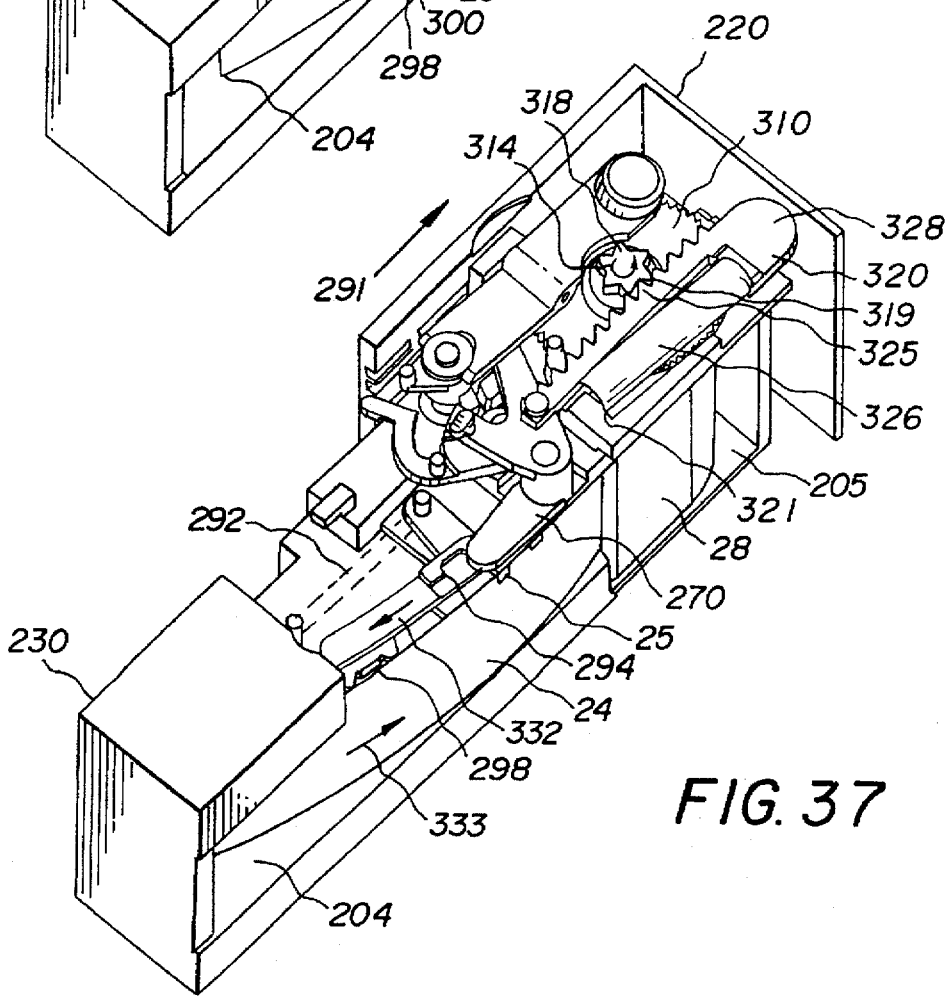
FIG. 37 is the top perspective view of FIGS. 35 and 36, showing the metering pawl after the pawl has been biased into a filmstrip engageable position.

Referring to FIGS. 35–38 in general, the teeth 325 of the gear rack 320 engage the gear teeth 319 of the pinion gear 318, causing a counterclockwise rotation of the gear and the associated cartridge drive element 315, in direction 314 shown in FIGS. 36 and 37, which rotates the spool end (not shown) of the cartridge 28 in a film winding direction. The preloading of the spring 326 provides a biasing force as the curved end 328 of the rack 320 remains in contact with the sidewall of the cover 220 while the cover is moving in the opening direction, arrow 291.

Still referring to FIGS. 35–38, and as the film advance gear 310 is rotated in the film winding direction to move the filmstrip 24, the metering pawl member 290 is caused to translate with the filmstrip 24 in direction 331, FIG. 35, in a manner similar to that described in the first embodiment, until a cam surface 295 of the metering pawl, shown in phantom in FIG. 34, engages a corresponding cam surface 299, also shown in phantom in FIG. 34, of the frame portion 230, as shown in FIG. 36, causing the metering hook 298 to be moved inwardly toward the interior of the camera 200 and causing the pawls 300 to move out of engagement with the film perforations 25, as best shown in FIG. 36.

Referring to FIG. 37, once the tension of the moving filmstrip 24 has been removed from the metering hook 298, the spring 292 causes the metering pawl member 290 to be positioned per arrow 332 with the metering hook 298 in a film engaging position, similar to the first embodiment. Continued rotation of the film advance gear 310 in the film winding direction by the translation of the pump cover 220 moves the filmstrip 24 in direction 333 past the metering hook 298 until the pawls 300 sense and reengage the next set of film perforations 25, FIG. 38.

In addition, and referring to FIG. 34, the rotational movement of the metering release lever 250, in direction 286, also forces the elongate portion 258 from the raised shelf 233 of the camera frame portion 230. Because the high energy lever 260 has been pivoted out from beneath the metering release lever 250 and remains restricted from attaining the released position by the interior wall of the pump cover 220, the metering release element is allowed to drop as biased by spring 264, FIG. 23. Thus, the elongate portion 256 is caused to drop into the lower channel 222 of the pump cover 220, as seen most particularly in FIG. 39. The demetering lever 270, however, is restricted from assuming its initial biased position by a raised cam surface 308, FIG. 39, adjacent the slotted portion 294 which engages the locking pin 272, as most clearly shown in the partial view of the camera depicted in FIGS. 38 and 39.

Figure 38:
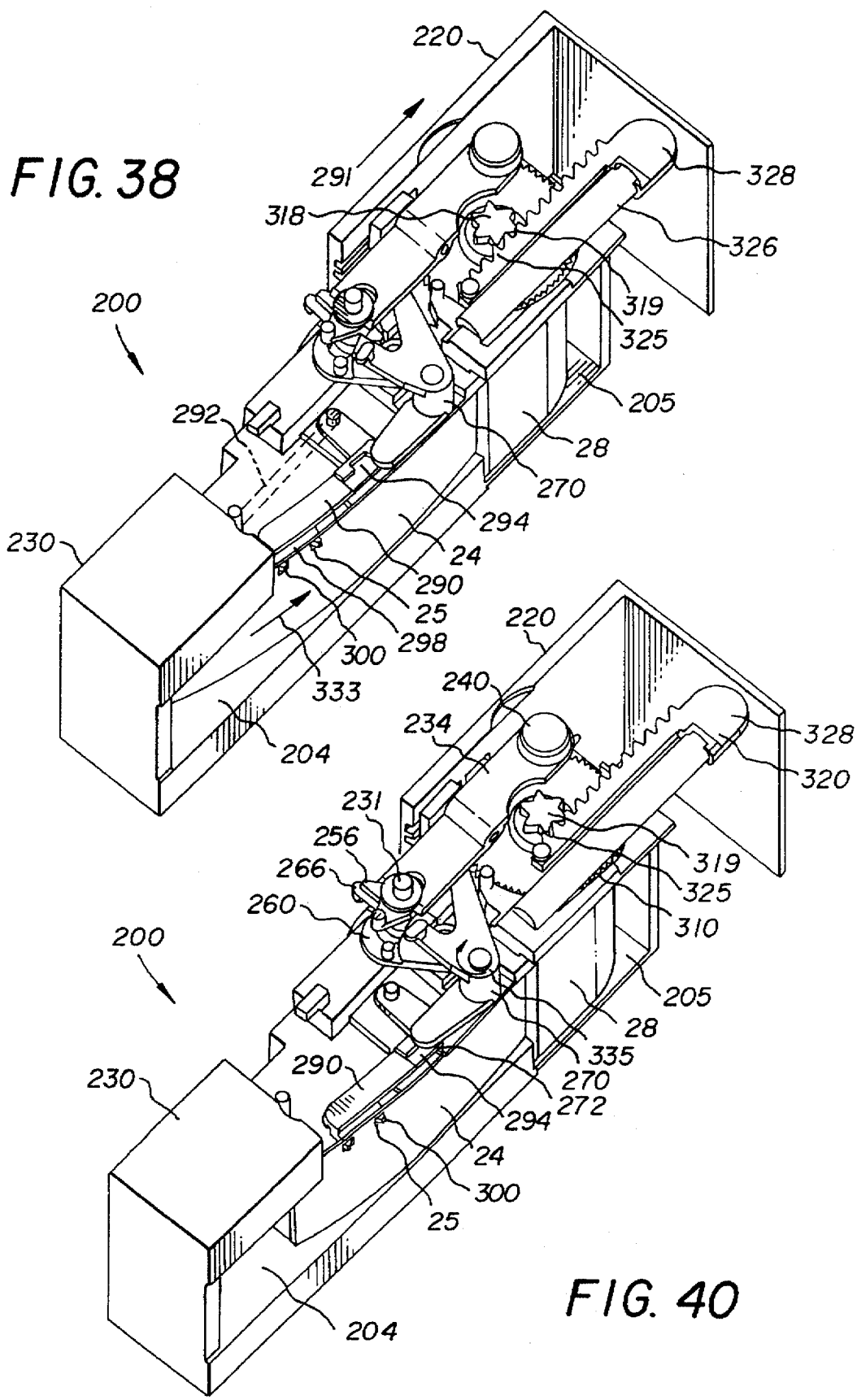
FIG. 38 is the top perspective view of FIGS. 35–37, showing the metering pawl as reengaged with the advancing filmstrip.
Figure 39:
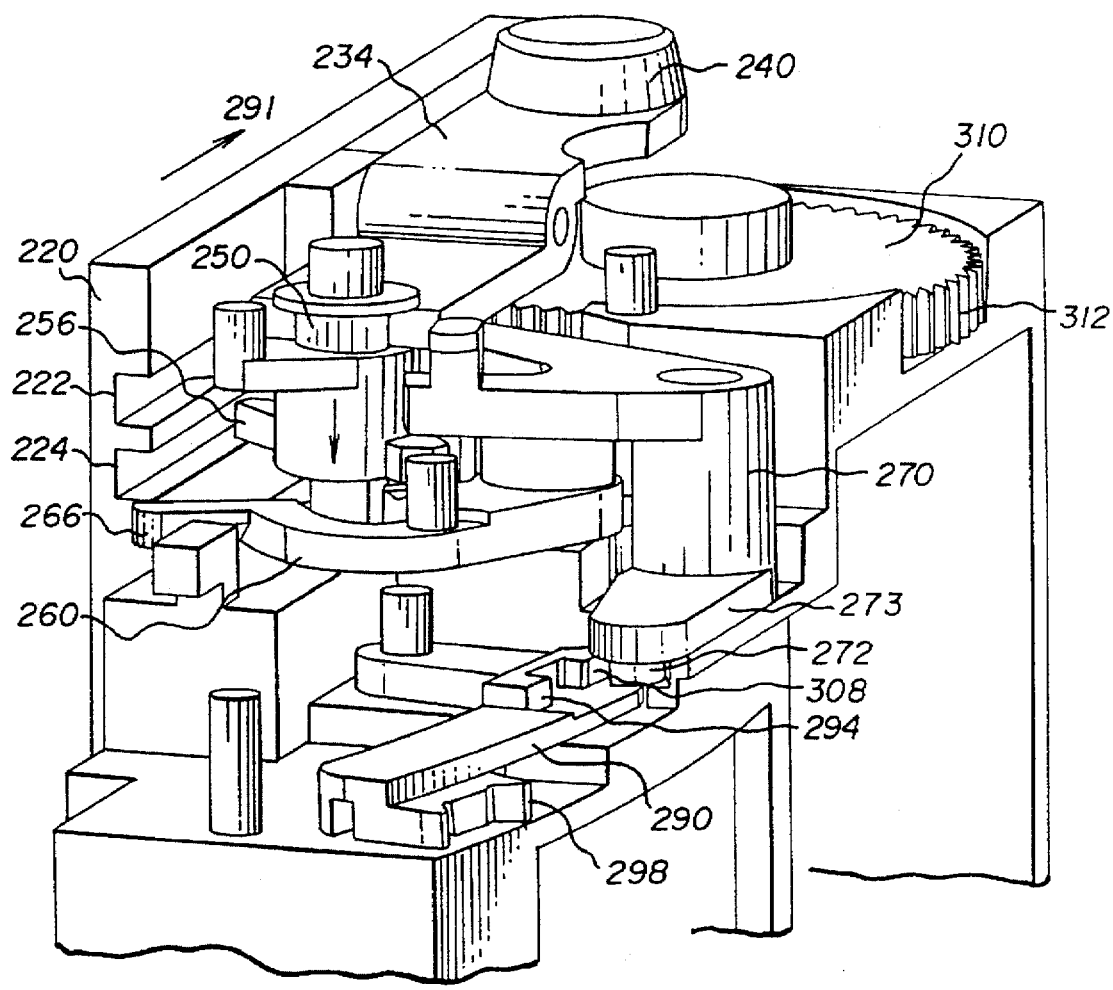
FIG. 39 is a rear perspective view of the camera showing the disengagement of the metering release lever from the opening pump cover.

Referring to FIGS. 38 and 39, and after the metering hook 298 reengages the film perforations 25, the metering pawl member 290 is caused to move with the advancing filmstrip 24 until the locking pin 272 is caused to move off the cam surface 308 and into the slotted portion 294 under the biasing of the spring 292, FIG. 23, producing a clockwise rotation, arrow 335, of the demetering lever 270, as shown in FIG. 40, which reengages the locking pin 272 with the slotted portion 294, and the locking pin 278 with the film advance gear 310, as previously shown in FIG. 31, preventing further filmstrip advance.

Figure 41:
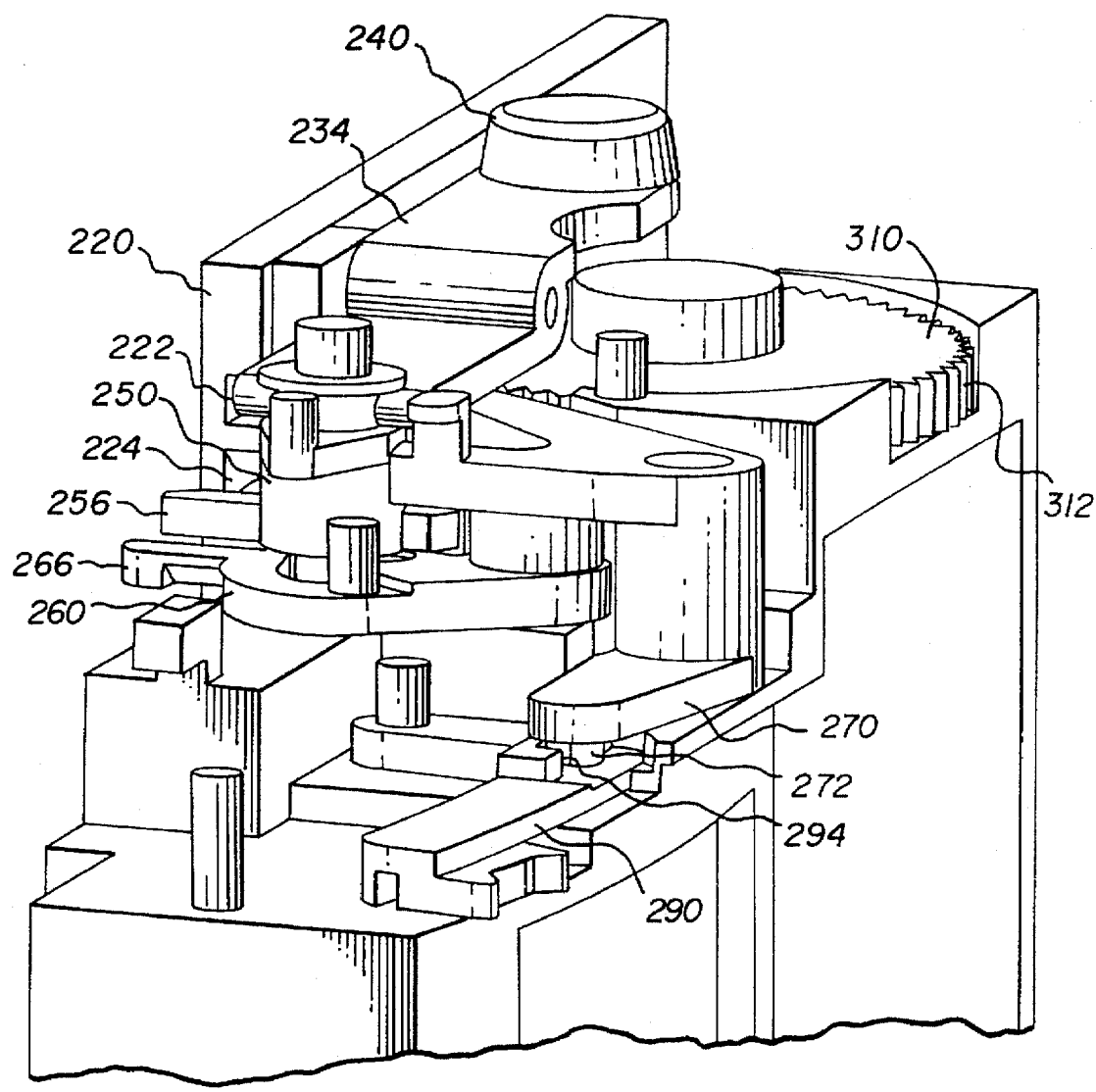
FIG. 41 is a rear perspective view of the camera after the pump cover has assumed the fully opened position and the film advance components have assumed their respective initial positions.

Referring to FIGS. 40 and 41, the locking of the metering pawl member 290 insures the filmstrip 24 has been metered. The camera is now in the opened position, previously shown in FIG. 22.

The pump cover 220 can be translatably moved between the opened and the closed position while the shutter release button remains in the undepressed state without damage to the camera 200; that is when the cover is moved in the closing direction, the elongate portion 256 of the metering release element 250 will be accommodated by the lower channel 224.

Third Embodiment

A film advance system according to a third embodiment is herein described with reference to FIGS. 42–49. In brief, a pair of separately disposed levers are used to move an idler gear into and out of engagement with a drive gear in order to advance a filmstrip in this particular film drive system. The details of this particular embodiment are herein described.

Figure 42:
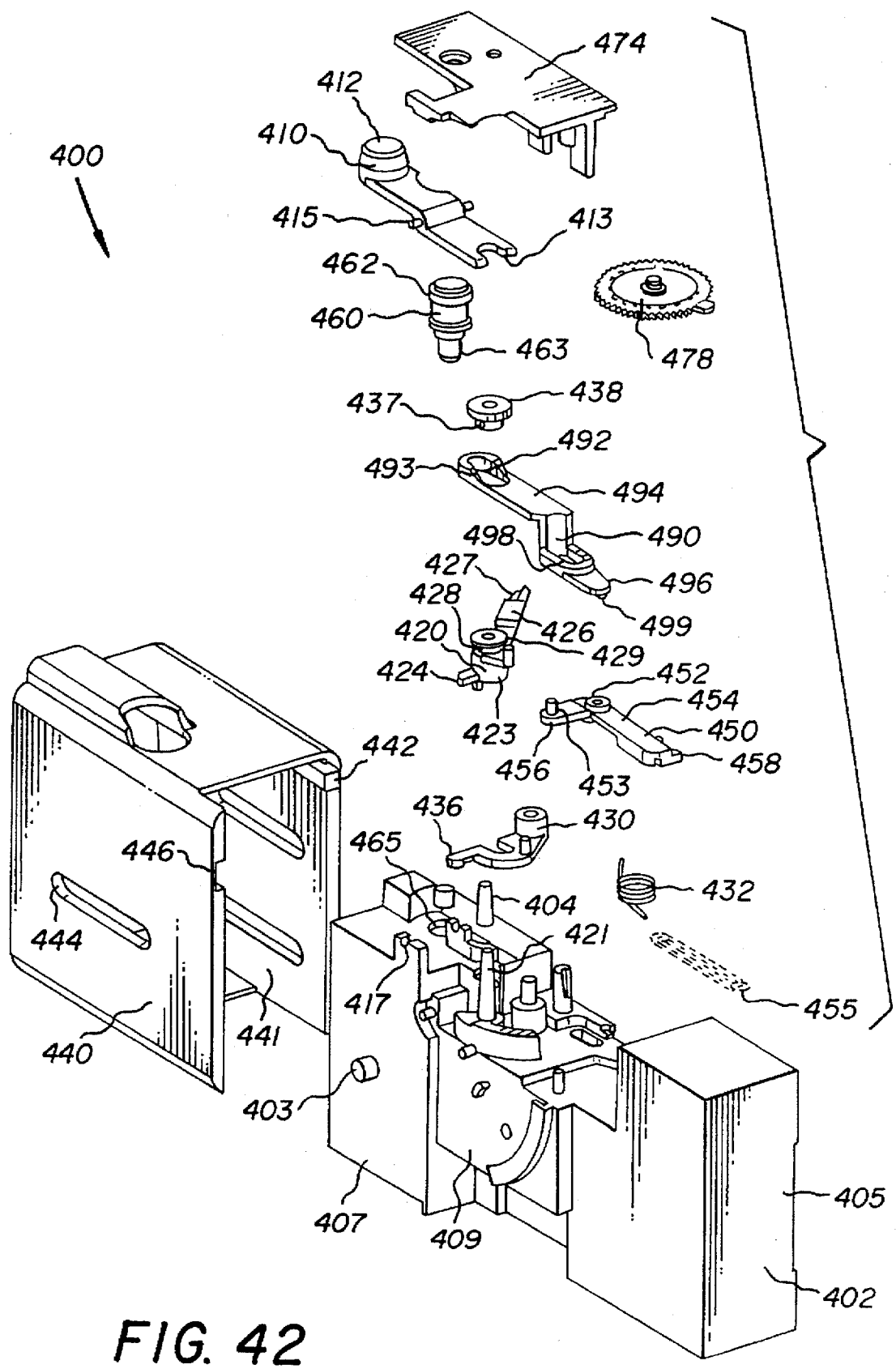
FIG. 42 is an exploded front perspective view of the invention according to a third embodiment.

Referring first to the exploded view of FIG. 42, there is shown a camera 400 made in accordance with this particular embodiment, including a frame portion 402 having molded-in features for defining a film supply chamber 405, and a film cartridge chamber 407, which are oppositely located relative to an exposure chamber 409, as described in the preceding embodiments, the details of which are commonly known in the field.

A translatable pump cover 440 having an interior recess 441 includes a set of front and rear slots 444 for engaging corresponding pins 403 located on the exterior of the frame portion 402 for enabling the cover to move between an opened and a closed position. The cover 440, as depicted in the opened position in FIG. 43, also includes a top surface 445 having an aperture 443 sized to allow access to a depressible shutter release button 412 when the cover is in the opened position.

Figure 44:
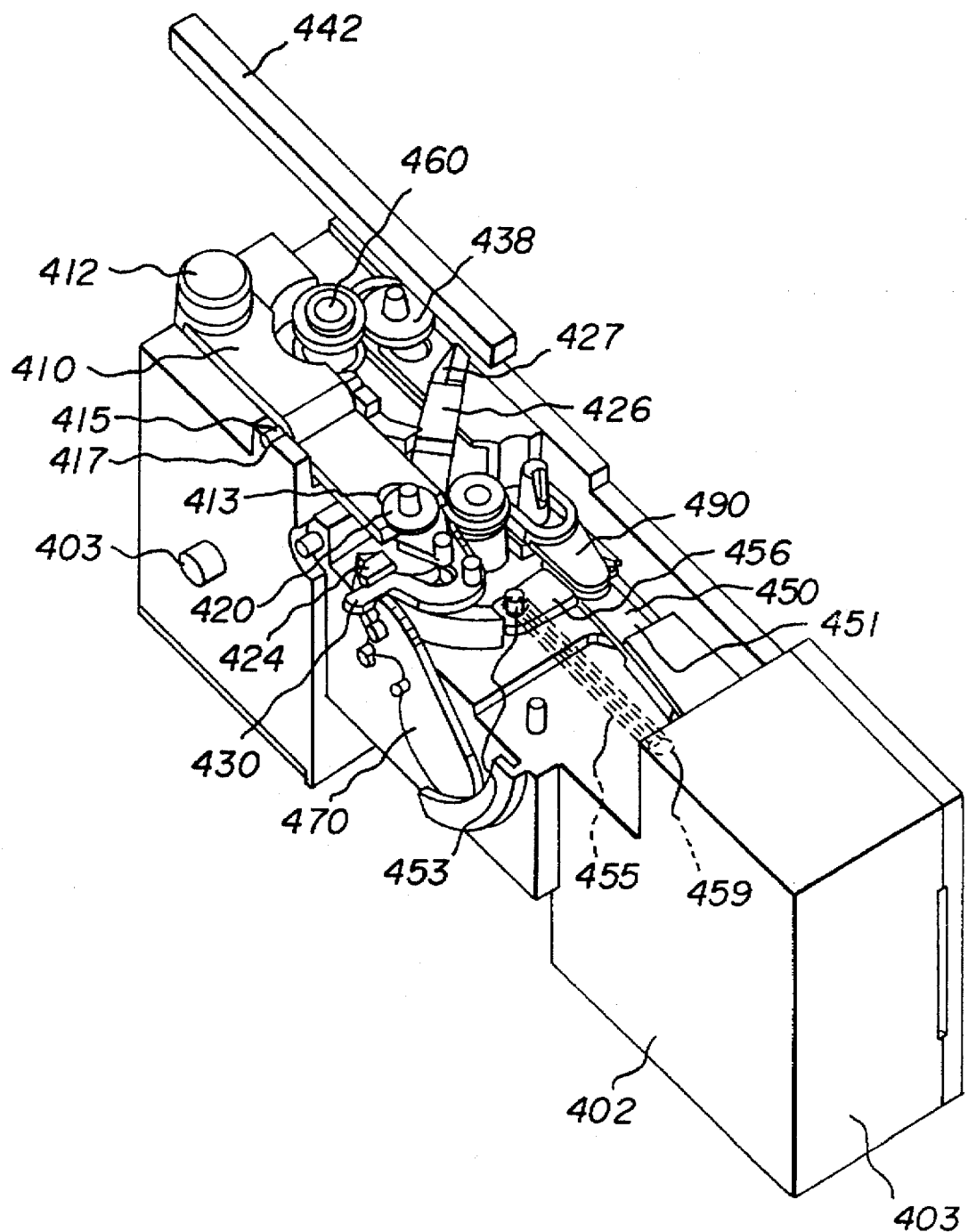
FIG. 44 is a top perspective view of the camera of FIGS. 42 and 43 with the pump cover removed.

A number of film advance components are mounted to the frame portion 402. Referring to FIGS. 42 and 44, these components include a trigger 410, similar to those described in the two preceding embodiments, having the shutter release button 412 at one end and an oppositely disposed slotted end 413 for supporting a metering release lever or element 420. The trigger 410 also includes a pair of pins 415 at the center of its span which are fitted into corresponding slots 417 in the top of the frame portion 402 to allow the trigger to pivot.

Figure 45:
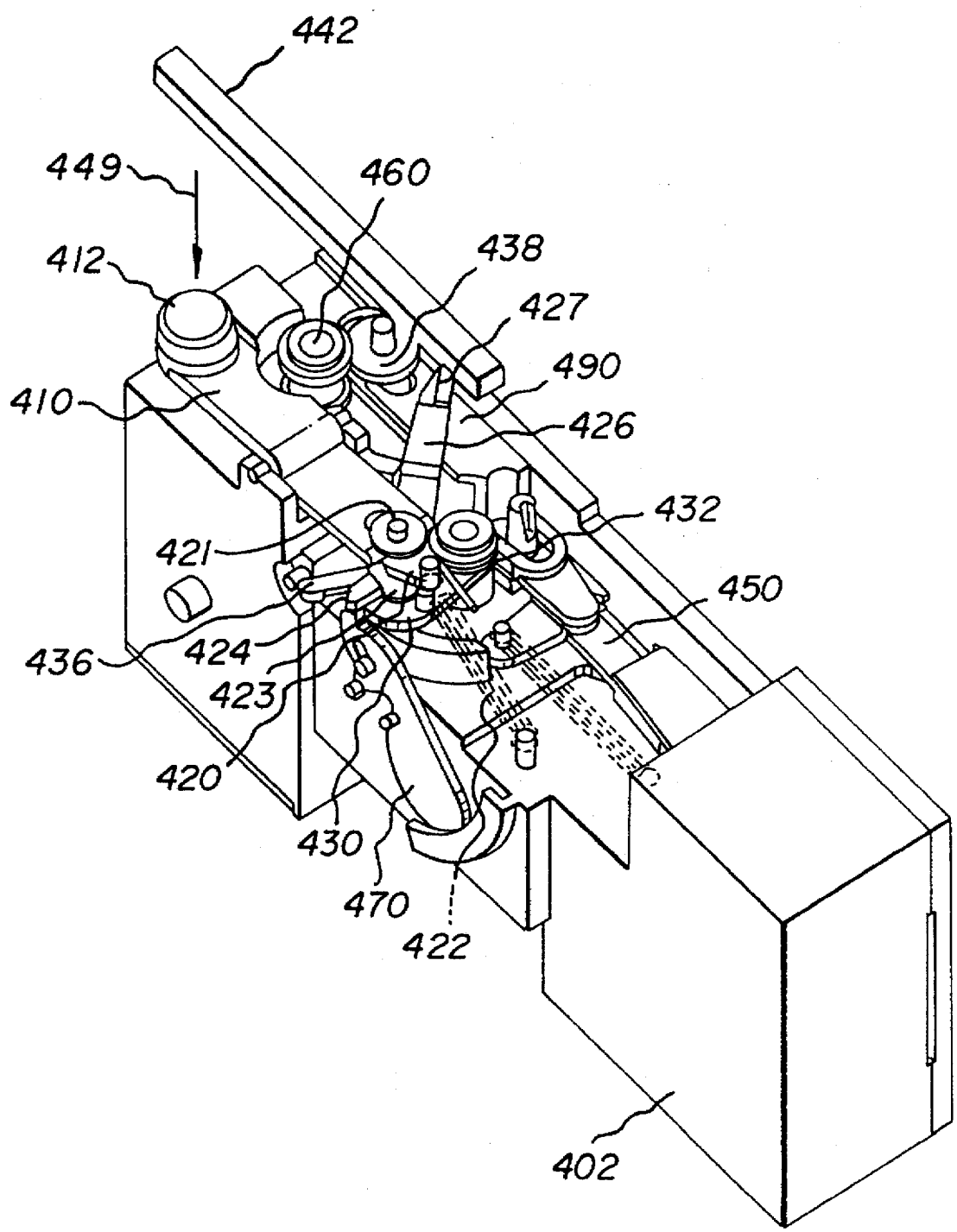
FIG. 45 is the top perspective view of FIG. 44 after the shutter release button has been depressed.

Referring to FIGS. 42 and 45, the metering release element 420 includes a cylindrically shaped body portion 423 having a hollow center which allows mounting to a frame post 421, and which is biased in a first rotational position by a spring 422, shown in phantom in FIG. 45. An elongate portion 424, extends from the periphery of the cylindrical body portion 423 beyond the front of the frame portion 402 when the element 420 is in the first rotational position for contacting an engagement arm (not shown) of the pump cover 440. A gear lifting arm 426 also depends from the cylindrical body portion 423 and includes a ramped surface 427 at its depending end for engaging and lifting an idler gear 438 when the metering release element 420 is pivoted about the frame post 421, as described in greater detail below. Referring only to FIG. 42, an upper supporting portion 429 includes a recess 428 for engaging the slotted end 413 of the trigger 410.

Referring to FIGS. 42 and 45, a high energy lever 430, similar to those previously described in the two preceding embodiments, includes a mounting aperture through which the lever is attached over an adjacent frame post and is biased by a torsion spring 432, attached to the lever in a manner previously described. In addition, and as in the preceding second embodiment, the lever 430 includes a depending arm 436 which extends from the front of the frame portion 402 for contacting a shutter blade 470 in a manner commonly known. Initially, the lever 430 is held against the force of the torsion spring 432 in a cocked position, and is prevented from release by the presence of the metering release element 420, which initially is in a lowered position until the shutter release button 412 is depressed is depressed.

A linear gear rack 442 similar to that provided in the first described embodiment is provided on the interior of the rear side of the pump cover 440, though for purposes of this embodiment the integral engagement teeth are not shown for clarity. A channel 446, FIGS. 42, 46, included on the interior of the front half of the pump cover 440, is aligned to engage the elongate portion 424 of the metering release element 420 after the shutter release button 412 has been depressed and includes an engagement arm (not shown), similar to the integral rib provided in the described second embodiment above, which causes the metering release element to pivot against the force of the spring 422.

Referring to FIG. 42, the idler gear 438 includes a lower depending portion 437 which is mounted over a frame post 404 through a hub aperture as well as through a slotted portion 492 of a gear lifting lever 490, which is also attached over the frame post 404. The gear 438 includes a set of circumferential gear teeth sized for engaging the gear teeth of a cartridge drive 460 and the gear rack 442, respectively.

Figure 46:
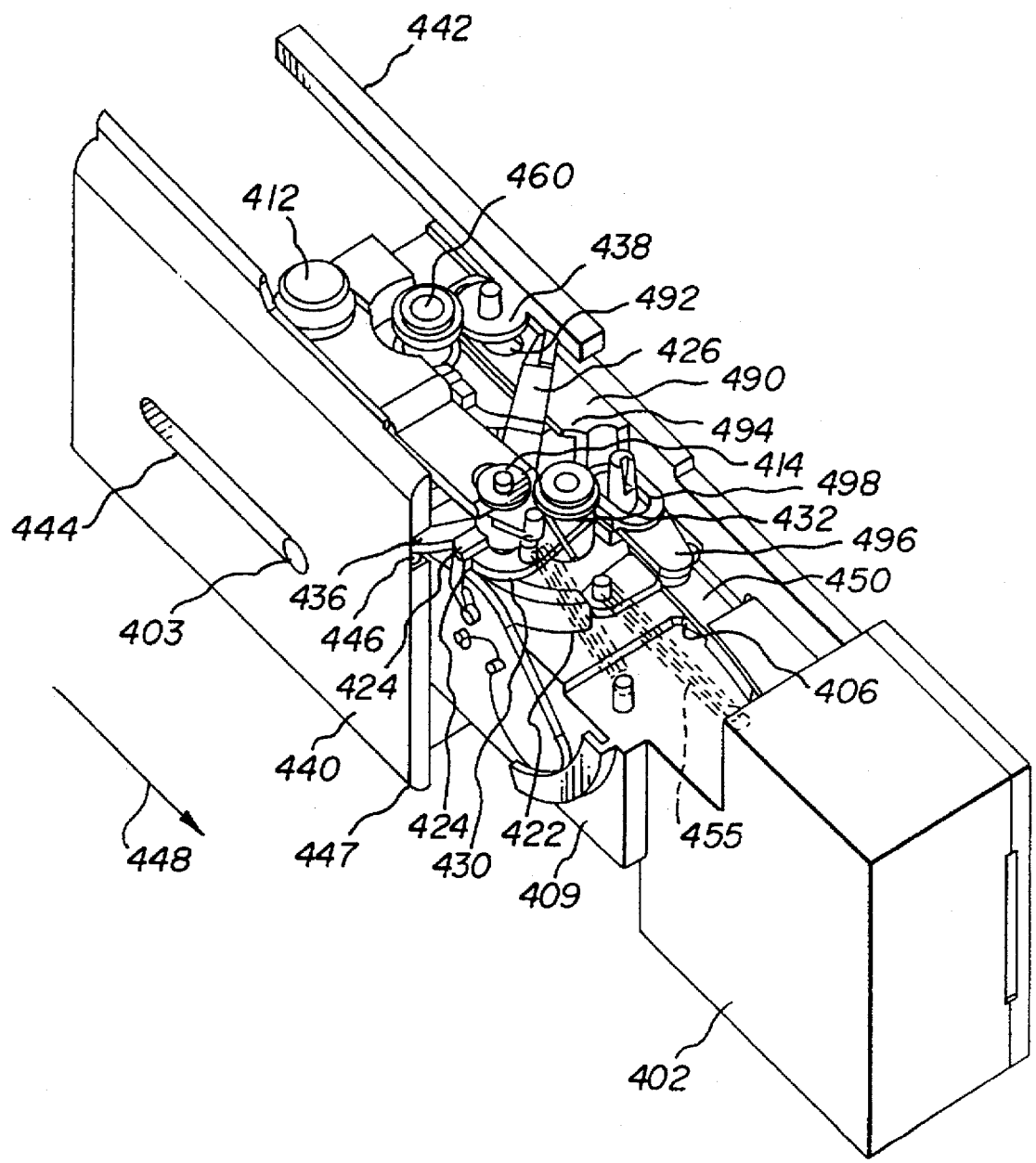
FIG. 46 is the top perspective view of FIG. 45 with a portion of the pump cover visible and translated to an engagement position with the high energy lever.
Figure 47:
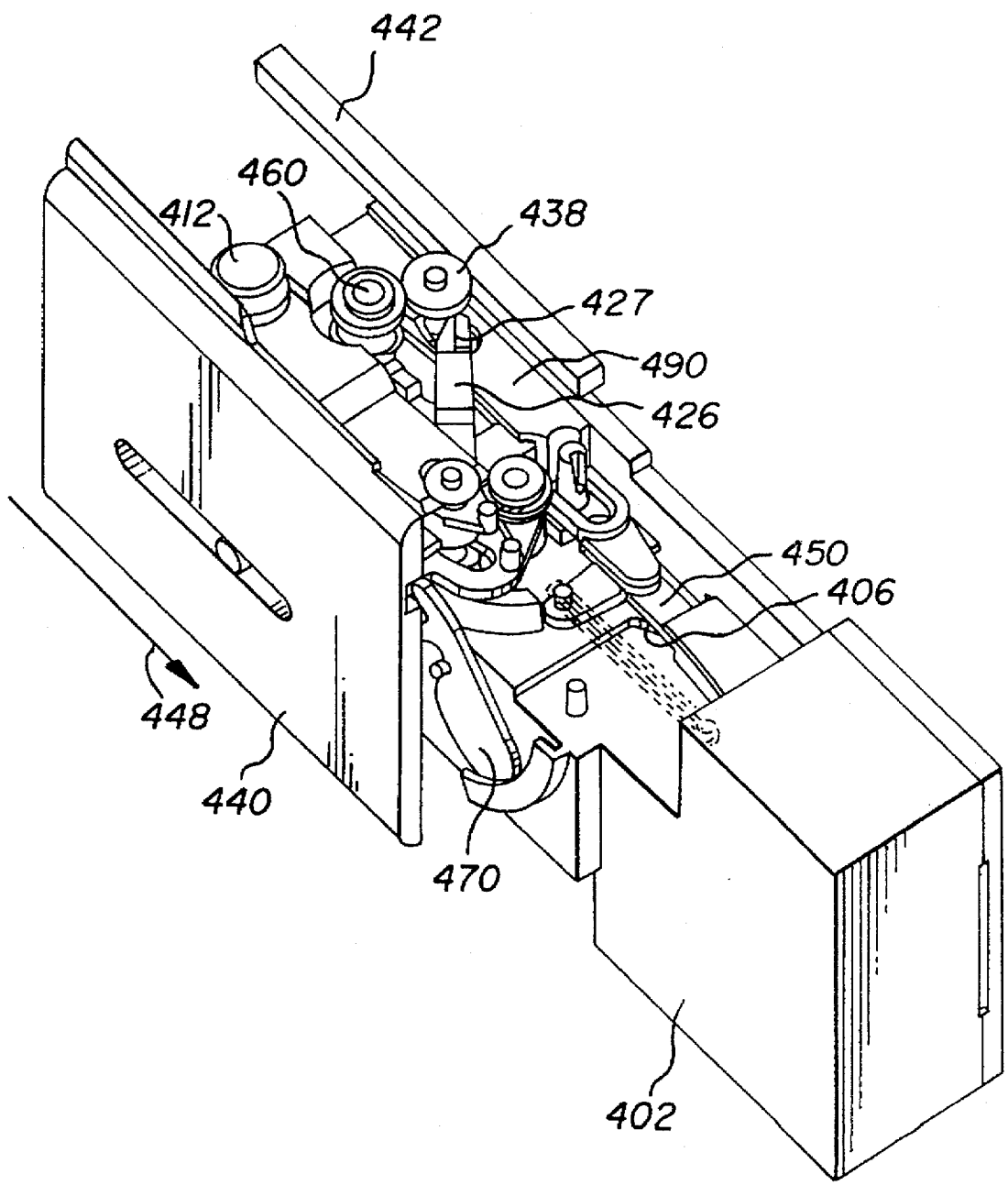
FIG. 47 is the top perspective view of FIG. 46 showing the initial pivot of the metering release element due to the closing movement of the pump cover.

Referring to FIGS. 42 and 46, the gear lifting lever 490 includes an upper portion 494 including the slotted portion 492, as well as a lower portion 496, which also includes a similarly defined slotted portion 498. A pin 499 depending from the bottom of the lower portion 496 is engageable within a hole 452 in the top surface 454 of a metering pawl member 450. The slotted portion 492 includes a cam surface 493, shown only in FIG. 42, which depends from the top of the upper portion 494, and is used for raising and lowering the idler gear 438, as is described in greater detail below. Initially, the idler gear 438 is positioned within the slotted portion 492, but beneath the cam surface 493, resting on the upper portion 494.

Referring to FIGS. 42 and 44, the metering pawl member 450 is also a plastic molded component attached to the top of the frame portion 402 and includes an outboard portion 456 which includes a post 453 to which is attached one end of a compression spring 455, shown in phantom in FIG. 44. The remaining end of the spring is attached to a frame post 459, FIG. 44, which biases the metering pawl member 450 in a first position. The hole 452 is provided on one end of the metering pawl member 450 and a metering hook 458, FIG. 42, is provided on the opposite end having a pair of pawls which extend into the film plane through a slot in the frame portion 402.

Referring to FIG. 42, a cartridge gear drive 460 is preferably a single plastic molded component having a top gear element 462 including a set of circumferential gear teeth sized to mesh with the gear teeth of the idler gear 438 and a lower depending portion 463 which extends through an opening 465 in the top of the frame portion 402 and into the cavity of the film cartridge chamber 407 for engaging the spool end of a film cartridge (not shown) in a manner commonly known. The gear drive 460 is stationarily positioned to engage the end of the cartridge spool to wind film in a film winding direction when the gear teeth are engaged in a manner commonly known.

A keeper plate 474 having a slot 342 is placed on the top of the frame portion 402 to retain the above components, including a commonly known frame counter 478, wherein the idler gear 438 is preferably biased by a spring (not shown) between the top of the gear and the keeper plate.

Operation of Third Embodiment

Figure 43:
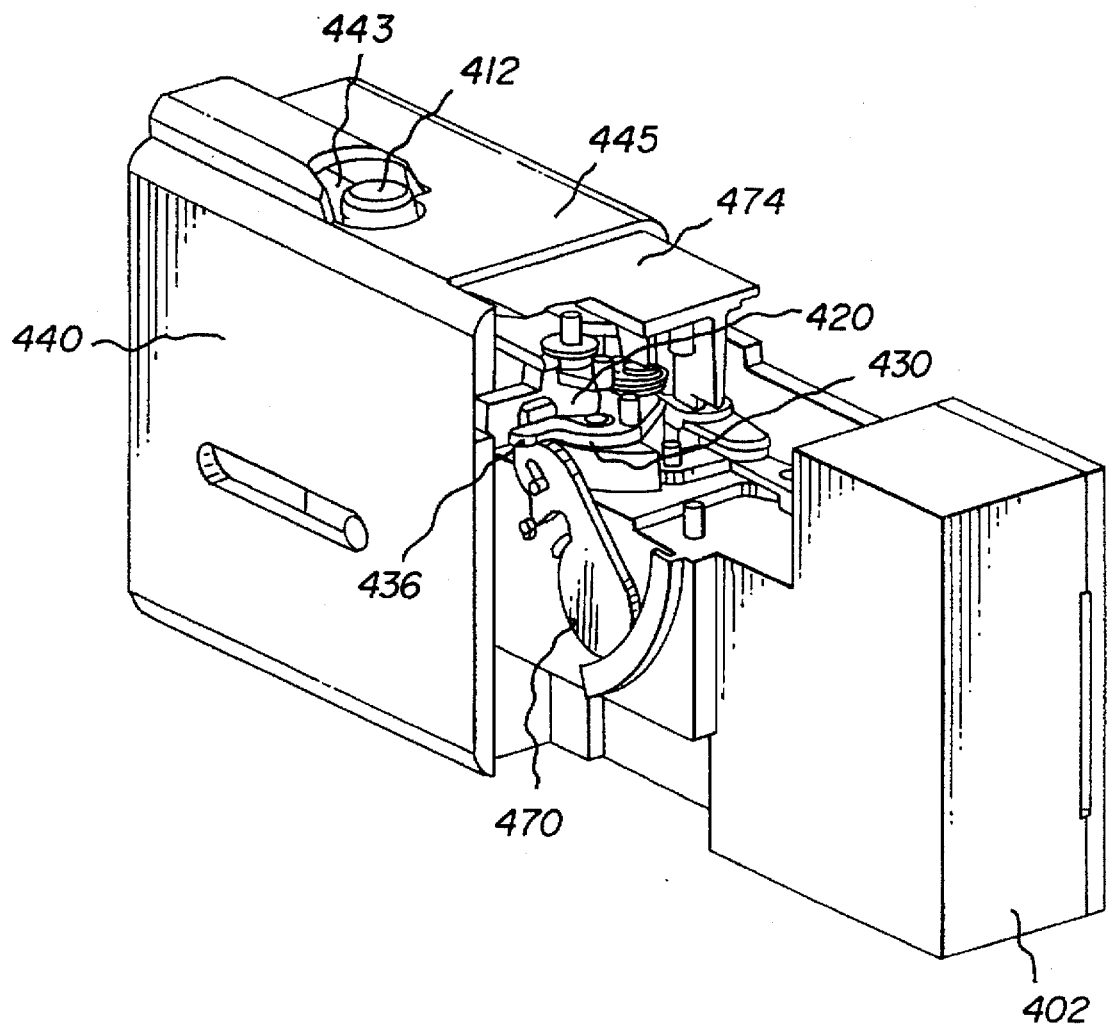
FIG. 43 is a partial front perspective view of the camera of FIG. 42, with the pump cover in the opened position.

Referring in general to FIGS. 42–49, the operation of the camera 400 according to this particular embodiment can be described beginning with the pump cover 440 being retracted in a fully opened position, as shown in FIG. 43, in which the shutter release button 412 is accessible through the opening 443, and the remaining film advance components are in the initial positions described above.

Referring to FIG. 45, the shutter release button 412 is depressed, arrow 449, FIG. 45, which pivots the trigger 410 and causes the metering release element 420 to be lifted as the slotted end 413, FIG. 44, engaged in the recess 428, FIG. 42, engages the bottom of the upper supporting portion 429, FIG. 42. The lifting movement of the metering release element 420 allows the unconstrained high energy lever 430 to fire due to the force of the torsion spring 432, actuating the shutter blade 470 in a known manner as the depending arm 436 contacts an engagement end of the shutter blade, which is preferably spring biased to allow the front opening (not shown) to be momentarily opened to allow ambient light to enter the exposure chamber 409.

The releasing movement of the high energy lever 430 holds the metering release element 420 in a raised position, and thereby also causes the trigger 410 to remain pivoted, leaving the shutter release button 412 in the depressed state and preventing the attempt of double exposures by a user of the camera. The pump cover 440, FIG. 46, is now ready to be moved to the closed position.

Figure 48:
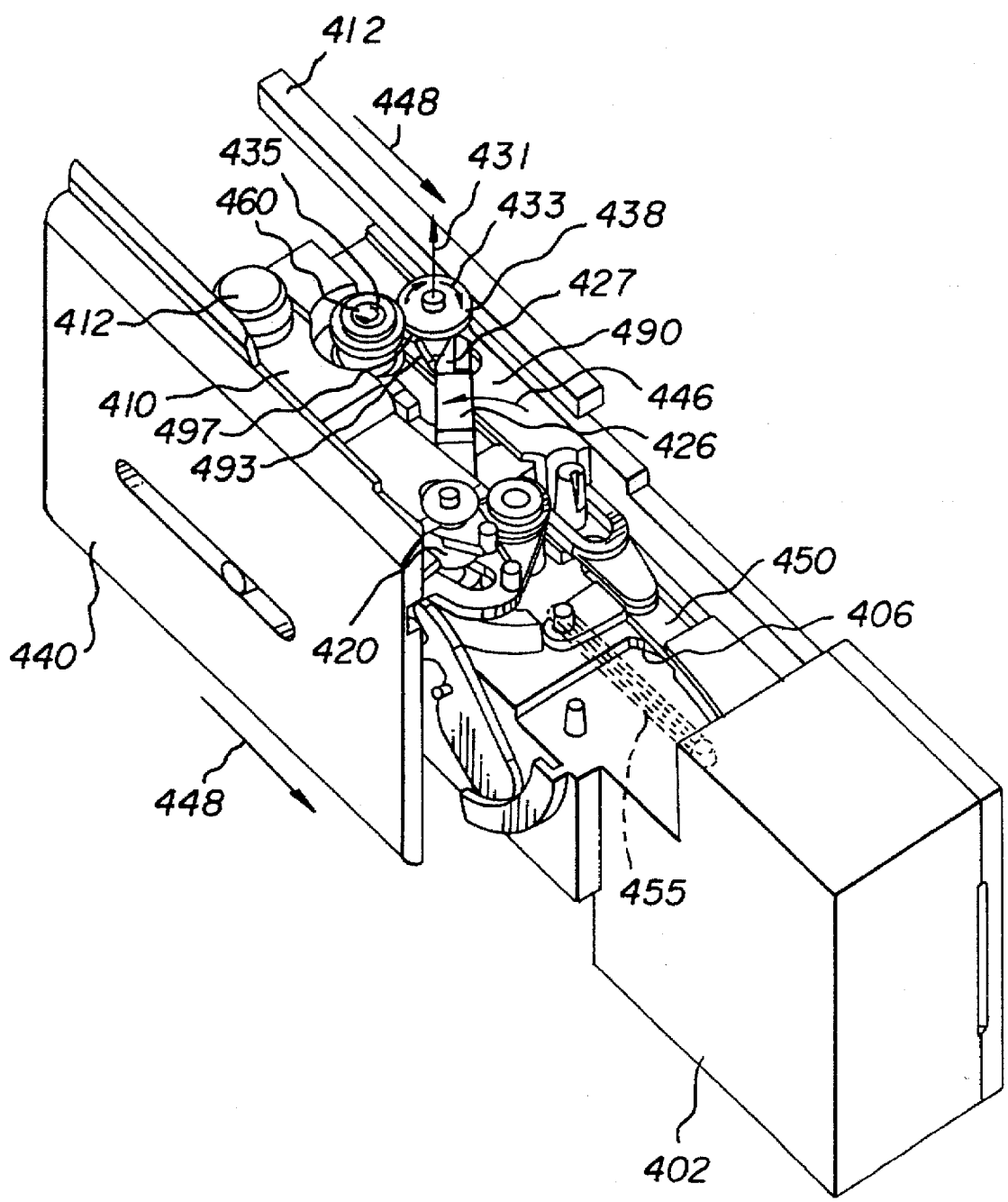
FIG. 48 is the top perspective view of FIG. 47 showing the continued pivot of the metering release element in response to the closing movement of the pump cover to cause a gear lifting arm to lift the idler gear into engagement with the remainder of the film drive system.

Referring to FIGS. 46–49, the movement of the pump cover 440 in the closing direction, shown by arrow 448 causes the following events to occur almost simultaneously: First, the leading edge 447 of the pump cover 440 engages the depending arm 436 of the high energy lever 430, thereby commencing rotation of the lever against the force of the spring 432 in a counterclockwise direction about its pivot. As noted, the raising of the metering release element 420 aligns the elongate portion 424 with the channel 446 of the pump cover 440, which is sized to allow the elongate portion 424 to enter the channel until the engagement arm (not shown) within the channel engages the elongate portion 424 and causes counterclockwise rotation of the element about the frame post 421, FIG. 42, against the bias of the spring 422. The extending gear lifting arm 426 of the metering release element 420 is also pivoted in a counterclockwise direction 446, and into contact with the bottom of the idler gear 438, as shown in FIG. 48. The ramped surface 427 of the gear lifting arm 426 engages the lower depending portion 439, FIG. 42, lifting the idler gear 438 in direction 431 against the force of the spring (not shown) and the keeper plate 474, FIG. 42, and into contact with the engagement teeth (not shown) of the linear gear rack 442, which moves integrally with the pump cover 440 in direction 448 and causes a corresponding clockwise rotation of the idler gear per arrow 433, also producing engagement with the drive gear 462 of the adjacent film cartridge gear drive 460, to create a corresponding rotation causing the film spool (not shown) within the film cartridge (not shown) to rotate in a film winding direction 435 in a manner commonly known.

The rotation of the film spool (not shown) in the film winding direction 435, FIG. 48, causes the filmstrip 24, FIG. 30, contained in the film supply chamber 405, FIG. 42, to be pulled across the film rails (not shown) bordering the exposure chamber 409, FIG. 42, which defines the film plane. The movement of the filmstrip 24, FIG. 30, causes the metering hook 458, FIG. 42, and the remainder of the metering pawl member 450 to be pulled in the direction of the film plane along with the engaged filmstrip 24 until a cammed surface (not shown, but similar to the cam surfaces 113, 295 previously described above) at the bottom of the metering pawl member contacts a corresponding cammed surface 406, FIG. 46, of the frame portion 402, pivoting the metering pawl member 450 out of engagement with the filmstrip perforations 25, FIG. 30 in the previously described manner. The biasing of the spring 455, FIG. 48, causes the metering pawl member 450 to move to a position in which the metering hook 458 reenters the film plane and into contact with the advancing filmstrip 24 until the next set of perforations 25 are available, also in a manner previously described.

Referring to FIGS. 42 and 48, and as the metering pawl member 450 is pulled by the spring force of the metering pawl spring 455 to its biased position, the gear lifting lever 490 is also moved laterally with the metering pawl member 450 due to its pinned connection with the metering pawl member. The idler gear 438 is subsequently slid up the ramped cam surface 493 of the slotted portion 492 onto a raised boss portion 497 of the gear lifting lever 490, holding the idler gear in engagement with the gear rack 442 and the cartridge gear drive 460.

The pump cover 440 continues to move in the closing direction according to arrow 448, creating engagement between the gear rack 442, the idler gear 438, and the drive gear element 462, thereby rotating the film spool (not shown) of the film cartridge (not shown) in a known manner to advance the filmstrip 24, FIG. 30, from the film supply chamber 405, FIG. 42, along the film plane until a new set of frame-defining perforations 25, FIG. 30, are presented to the metering hook 458, FIG. 42, to engage, as in the manner described in the preceding two embodiments.

Figure 49:
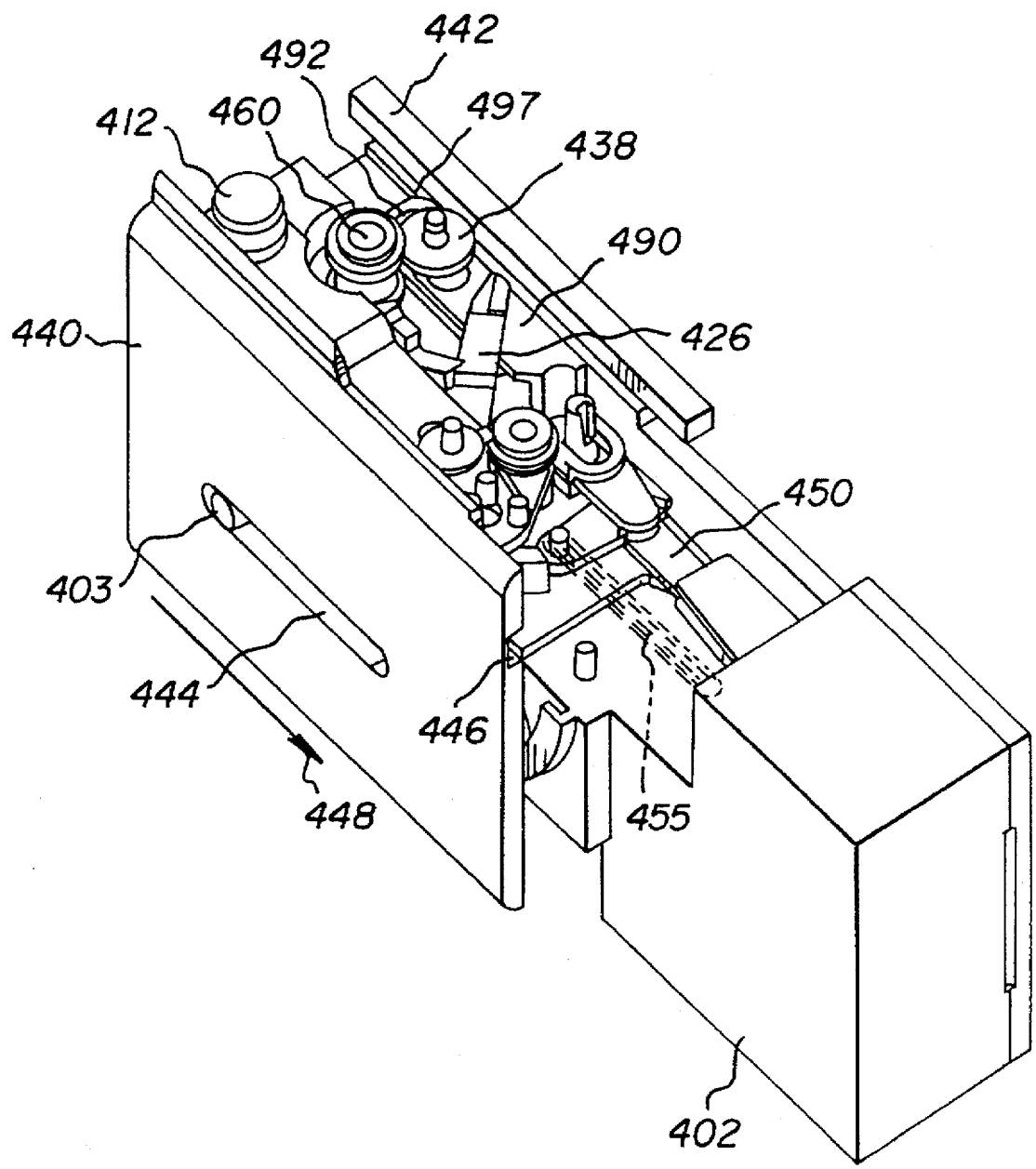
FIG. 49 is the top perspective view showing the pump cover at the end of the closing stroke.

Referring to FIG. 49, and upon engagement of the metering hook 458, shown only in FIG. 42, with a new set of perforations 25, FIG. 30, of the advancing filmstrip 24, the metering pawl member 450 again is caused to move with the filmstrip 24, FIG. 30, against the biasing force of the spring 455. This additional translation of the metering pawl member 450 causes the idler gear to be cammed down the ramped surface 493, FIG. 48, of the slotted portion 492, allowing the idler gear 438, which is preferably spring biased with the keeper plate 478, FIG. 42, to drop out of engagement with the cartridge gear drive 460, stopping further film advance, and thereby metering the filmstrip. The keeper plate 472 is not shown in FIGS. 46–49 for clarity.

Still referring to FIG. 49, and at the same time, the metering release element 420 is caused by the channel 446 to drop from a raised surface (not shown) located on the top of the frame portion 402, in that the high energy lever 430 has been rotated out from under the element, due to the closing movement of the pump cover 440.

Rather than including an engagement arm in a channel 446 of the cover 440, as described above, it should be readily apparent that other means can be used to cause the metering release element 420 to rotate as the pump cover 440 is translated between the opened and the closed positions, such as those previously described in the first embodiment above.

The invention has been described with reference to a number of specifically defined embodiments. However, it will be appreciated that variations and modifications can be effected by a person of ordinary skill in the art without departing from the scope of the invention.

| PARTS LIST for FIGS. 1–57 | |
|---|---|
| 10 | camera |
| 12 | frame portion |
| 13 | guide member |
| 14 | film supply chamber |
| 15 | slot |
| 16 | film cartridge chamber |
| 17 | slot |
| 18 | exposure chamber |
| 19 | slot |
| 20 | front opening |
| 21 | raised portion |
| 22 | cutout |
| 24 | filmstrip |
| 25 | perforations |
| 28 | film cartridge |
| 30 | pump handle |
| 32 | front half |
| 33 | interior recess |
| 34 | rear half |
| 35 | open end |
| 36 | linear gear rack |
| 37 | gear teeth |
| 38 | idler gear |
| 39 | post |
| 40 | tapered engagement arm |
| 41 | front edge |
| 42 | contacting portion |
| 43 | stepped portion |
| 44 | contoured contacting surface |
| 45 | top surface |
| 46 | top slotted portion |
| 50 | trigger |
| 52 | shutter release button |
| 54 | upper portion |
| 56 | lower portion |
| 57 | opening |
| 58 | lug pins |
| 59 | slotted portion |

-continued

| PARTS LIST for FIGS. 1–57 | |
|---|---|
| 60 | cartridge drive |
| 61 | vertical shaft |
| 62 | supporting surface |
| 63 | external driving element |
| 64 | depending portion |
| 65 | opening |
| 66 | drive gear |
| 67 | drive teeth |
| 68 | return spring |
| 69 | flange |
| 70 | drive spline |
| 71 | slotted aperture |
| 72 | engagement teeth |
| 74 | recess |
| 75 | spline spring |
| 76 | metering release element |
| 77 | recessed area |
| 78 | post |
| 79 | frame protrusion |
| 80 | bottom portion |
| 81 | contact surface |
| 82 | rest surface |
| 83 | slotted portion |
| 84 | top portion |
| 85 | elongate portion |
| 86 | cutout |
| 87 | groove |
| 88 | drive teeth |
| 89 | arrow |
| 90 | high energy lever |
| 91 | aperture mounting |
| 92 | extending portion |
| 93 | slot |
| 94 | torsion spring |
| 96 | spring arm |
| 98 | high energy lever spring |
| 99 | shutter blade striking portion |
| 100 | front lens element |
| 101 | arrow |
| 102 | lens retainer |
| 104 | end portion |
| 105 | locking pin |
| 106 | demetering lever |
| 107 | mounting aperture |
| 108 | demetering lever spring |
| 110 | metering pawl member |
| 111 | cammed surface |
| 112 | twin pawl metering hook |
| 113 | cammed surface |
| 114 | slotted portion |
| 115 | cammed surface |
| 116 | post |
| 117 | post |
| 118 | torsion spring |
| 119 | post |
| 120 | shutter blade |
| 122 | engagement end |
| 124 | masking portion |
| 126 | counter actuator |
| 127 | arrow |
| 128 | flexible contact element |
| 129 | arrow |
| 130 | keeper plate |
| 131 | arrow |
| 132 | frame counter |
| 133 | arrow |
| 135 | teeth |
| 137 | projecting portion |
| 139 | spring arm |
| 141 | contact portion |
| 143 | inwardly projecting portion |
| 145 | contoured contacting surface |
| 147 | elongate portion |
| 149 | arrow |
| 151 | arrow |
| 153 | arrow |
| 157 | arrow |
| 161 | arrow |

PARTS LIST for FIGS. 1-57

| | |
|---|---|
| 163 | arrow |
| 164 | arrow |
| 165 | arrow |
| 200 | camera |
| 203 | slots |
| 204 | film supply chamber |
| 205 | film cartridge chamber |
| 206 | pins |
| 209 | film cartridge |
| 210 | exposure chamber |
| 212 | rear cover |
| 215 | slot |
| 220 | pump cover |
| 221 | top surface |
| 222 | upper channel |
| 223 | aperture |
| 224 | lower channel |
| 225 | front edge |
| 230 | camera frame |
| 231 | post |
| 232 | top surface |
| 233 | shelved surface |
| 234 | trigger |
| 236 | slot |
| 240 | shutter release button |
| 250 | metering release element |
| 251 | top supporting portion |
| 253 | recess |
| 256 | elongate portion |
| 258 | elongate portion |
| 260 | high energy lever |
| 261 | mounting aperture |
| 264 | spring |
| 265 | spring |
| 266 | extending portion |
| 270 | locking lever |
| 271 | upper portion |
| 272 | locking pin |
| 273 | lower portion |
| 274 | spring |
| 275 | mounting aperture |
| 276 | mounting portion |
| 277 | gear engaging arm |
| 278 | locking portion |
| 279 | metering arm |
| 280 | rib |
| 282 | ramped surface |
| 283 | outboard portion |
| 284 | edge |
| 285 | post |
| 289 | arrow |
| 290 | metering pawl member |
| 291 | arrow |
| 292 | spring |
| 294 | slotted portion |
| 296 | top surface |
| 297 | post |
| 298 | cam surface |
| 299 | cam surface |
| 304 | spring |
| 306 | frame post |
| 307 | engaging end |
| 308 | cam surface |
| 310 | film advance gear |
| 311 | opening |
| 312 | gear teeth |
| 313 | recessed region |
| 315 | cartridge driving element |
| 318 | pinion gear |
| 319 | gear teeth |
| 320 | gear rack |
| 321 | sidewall |
| 322 | linear engagement teeth |
| 323 | recessed region |
| 325 | guide pin |
| 326 | compression spring |
| 327 | support post |
| 328 | curved end |
| 330 | guide pin |
| 340 | keeper plate |
| 342 | slot |
| 400 | camera |
| 402 | frame portion |
| 403 | pins |
| 405 | film supply chamber |
| 406 | camming surface |
| 407 | film cartridge chamber |
| 409 | exposure chamber |
| 410 | trigger |
| 412 | shutter release button |
| 413 | slotted end |
| 414 | slot |
| 415 | pins |
| 417 | slots |
| 420 | metering release element |
| 421 | frame post |
| 422 | spring |
| 424 | elongate portion |
| 426 | gear lifting arm |
| 427 | ramped surface |
| 429 | top supporting portion |
| 430 | high energy lever |
| 432 | torsion spring |
| 436 | extending arm |
| 438 | idler gear |
| 439 | depending portion |
| 440 | pump cover |
| 441 | recess |
| 442 | linear gear rack |
| 443 | aperture |
| 444 | slots |
| 445 | top surface |
| 446 | channel |
| 447 | leading edge of cover |
| 448 | arrow |
| 449 | arrow |
| 450 | metering pawl member |
| 451 | body section |
| 452 | hole |
| 453 | post |
| 454 | top surface |
| 455 | spring |
| 456 | outboard section |
| 458 | metering hook |
| 459 | post |
| 460 | cartridge gear drive |
| 462 | gear |
| 463 | depending portion |
| 464 | opening |
| 470 | shutter blade |
| 474 | keeper plate |
| 478 | frame counter |
| 490 | gear lifting lever |
| 492 | slotted portion |
| 493 | ramped cam surface |
| 494 | upper portion |
| 496 | lower portion |
| 497 | raised boss |
| 498 | slotted portion |
| 499 | pin |

We claim:

1. A camera, for use with a filmstrip, said camera comprising:

film metering means for metering the filmstrip in said camera, said film metering means including a metering pawl for engaging exposure-defining perforations of the filmstrip, said metering pawl being movable in engagement with the filmstrip to a film metered position;

a trigger having a fulcrum, a depressible shutter release button located on one side of said fulcrum, and a release element located on the other side of said fulcrum, said trigger being pivotable to make depression of said shutter release button raise said release element, said release element being coupled to said metering pawl to retain said shutter release button depressed and said release element in a raised position, until said metering pawl has been moved to said film metered position.

2. A camera according to claim 1, further comprising a locking lever engageable with said metering pawl when said pawl is moved to said film metered position.

3. A camera according to claim 2, wherein said locking lever is coupled to said release element to move said release element to a lowered position when said locking lever engages said metering pawl.

4. A camera according to claim 3, including a body portion having a raised surface for retaining said release element in the raised position.

5. A camera according to claim 4, wherein said release element is rotatably supported by said body portion.

6. A camera according to claim 5, wherein said locking lever includes means for rotating said release element so as to move said element from the raised position to the lowered position when said film metering pawl is moved to the film metering position.

7. A camera according to claim 4, including a cover coupled to said body portion and movable in opposite directions between an opened and a closed position, and having means for engaging said release element to cause said release element to rotate when the cover is moved in one of the opposite directions.

8. A camera, for use with a filmstrip, said camera comprising:
a body portion;
film metering means attached to said body portion for metering a filmstrip in the camera, said film metering means including a film metering pawl movable in engagement with a filmstrip to a film metered position;
a cover coupled to said body portion and movable in opposite directions between an opened position and a closed position;
a trigger having a fulcrum, a depressible shutter release button located on one side of said fulcrum, and a release element located on the other side of said fulcrum, said trigger being pivotable to make depression of said shutter release button raise said release element, said release element being coupled to said metering pawl to retain said shutter release button depressed until said film metering means has been moved to said film metered position and to move said release element to a lowered position and raise said shutter release button when said film metering pawl has been moved to said film metered position.

9. A camera according to claim 8, further comprising a locking lever coupling said metering pawl to said release element, said lever being engageable with said metering pawl when the pawl is moved to the film metered position.

10. A camera according to claim 9, wherein said release element is rotatably supported on said body portion and includes means for engaging said cover to rotate the release element when said cover is moved in one of the opposite directions.

11. A camera according to claim 10, wherein said body portion includes a raised surface for supporting said release element in the raised position after said cover has engaged and rotated said release element.

12. A camera according to claim 11, wherein said release element moves said locking lever out of engagement with said film metering pawl to demeter the filmstrip when said release element has been engaged by said cover.

13. A camera according to claim 12, including means for biasing said locking lever in engagement with said film metering pawl.

14. A camera according to claim 8, including a high energy lever movable to a fired position when said shutter release button has been depressed and said release element has been raised.

15. A camera according to claim 14, wherein said cover includes means for moving said high energy lever to a cocked position when said cover is moved in one of the opposite directions.

16. A camera, for use with a filmstrip, said camera comprising:
a metering pawl disposed to engage perforations of the filmstrip, said metering pawl being movable to a film metered position;
a trigger having a fulcrum, a depressible shutter release button located on one side of said fulcrum, and a release element located on the other side of said fulcrum, said trigger being pivotable about said fulcrum between an undepressed position of said shutter release button and a depressed position of said shutter release button, said release element being coupled to said metering pawl wherein said shutter release button is retained in said depressed position until said metering pawl has been moved to said film metered position.

17. The camera of claim 16 wherein said metering pawl is movable to said film metered position in engagement with the perforations of the filmstrip.

18. The camera of claim 16, further comprising a locking lever engageable with said metering pawl when said pawl is moved to said film metered position.

19. The camera of claim 16 further comprising a cover coupled to said body portion, said cover being movable in opposite directions between an opened position and a closed position, said cover engaging said trigger to cause said trigger to rotate when said cover is moved in one of said opposite directions.

* * * * *